United States Patent [19]

Miyauchi et al.

[11] 3,908,485

[45] Sept. 30, 1975

[54] AUTOMATIC POWER TRANSMISSION CONTROL SYSTEM FOR REDUCING SHOCKS WHEN SHIFTING FROM NEUTRAL TO REVERSE DRIVE CONDITIONS

[75] Inventors: Toshiyuki Miyauchi; Kunio Ohtsuka, both of Yokohama, Japan

[73] Assignee: Nissan Motor Company Limited, Yokohama, Japan

[22] Filed: Aug. 8, 1974

[21] Appl. No.: 495,922

[30] Foreign Application Priority Data

Aug. 17, 1973   Japan................................. 48-91778

[52] U.S. Cl. ...................... 74/867; 74/863; 74/869; 74/752 C

[51] Int. Cl.².......................................... B60K 41/06

[58] Field of Search ............ 74/863, 864, 867, 868, 74/869, 866, 752 C

[56] References Cited

UNITED STATES PATENTS

| | | | |
|---|---|---|---|
| 3,667,323 | 6/1972 | Irie................................... | 74/864 X |
| 3,685,372 | 8/1972 | Miyazaki............................ | 74/863 |
| 3,726,159 | 4/1973 | Mizote................................ | 74/866 |
| 3,859,873 | 1/1975 | Miyauchi et al..................... | 74/867 |

FOREIGN PATENTS OR APPLICATIONS 1,923,577   11/1969   Germany ............................ 74/863

*Primary Examiner*—Samuel Scott
*Assistant Examiner*—Lance W. Chandler

[57] ABSTRACT

Improvement is made in a hydraulic control system of an automatic power transmission for an automotive vehicle so as to lessen shocks which are produced during a shift from the neutral to the reverse drive condition. The line pressure in the control system is reduced in response to idling condition of the engine during the reverse drive condition of the vehicle.

6 Claims, 9 Drawing Figures

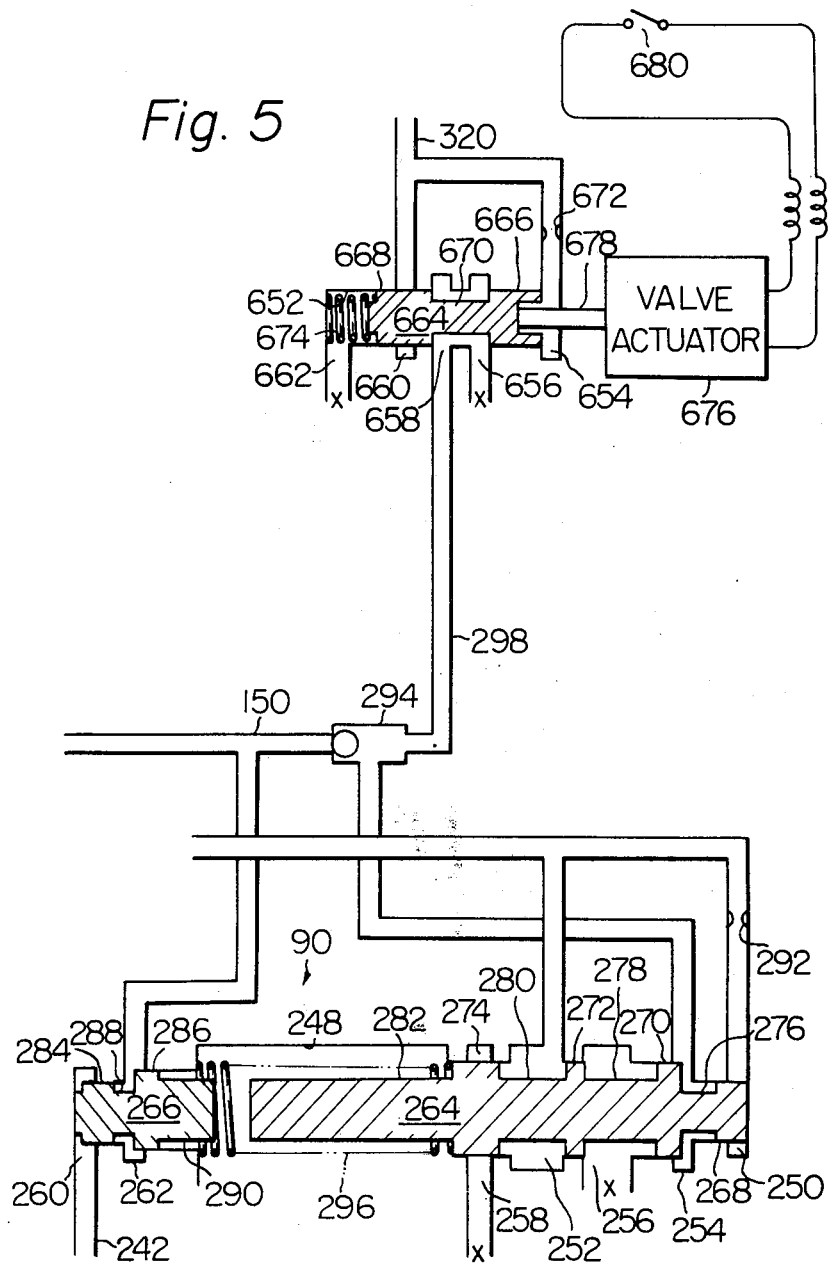

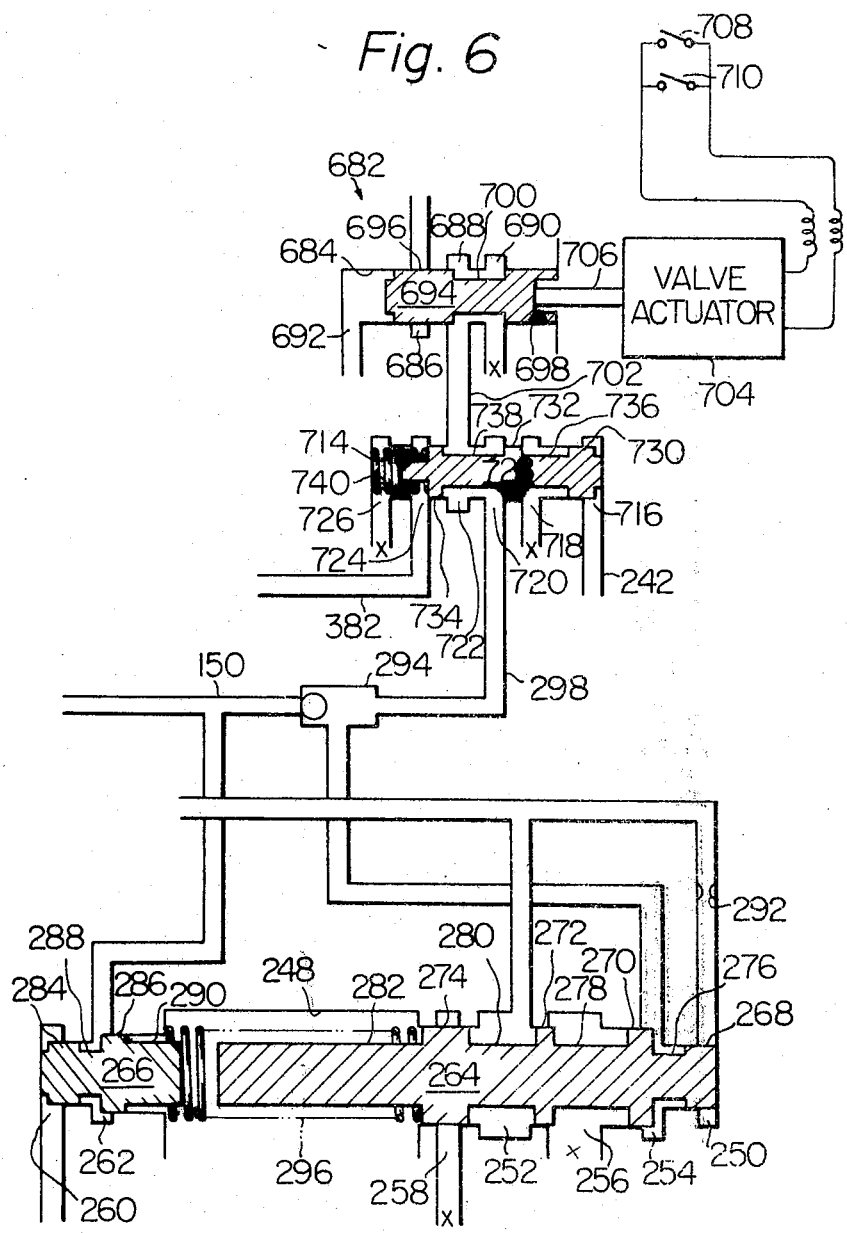

AUTOMATIC POWER TRANSMISSION CONTROL SYSTEM FOR REDUCING SHOCKS WHEN SHIFTING FROM NEUTRAL TO REVERSE DRIVE CONDITIONS

The present invention relates to automatic power transmissions of automotive vehicles.

The automatic power transmission of an automotive vehicles uses a hydraulic control system which is adapted to actuate servos of clutches and brakes incorporated into the transmission mechanism so as to provide a multiplicity of forward speed gear ratios and a reverse speed gear ratio depending upon the positions selected by the manual selector lever. The hydraulic control system is usually so arranged that the line pressure to act upon the servos of the clutches and brakes is increased during starting of the vehicle in proportion to the engine torque for the purpose of assuring the clutches and brakes to provide adequate torque transmission capacities when the vehicle is started. Shocks are thus invited and are transferred to vehicle occupants when the clutches and brakes are actuated by such an increased line pressure. In view, however, of the fact that no driving torque need be transmitted through the clutches and brakes at the moment the vehicle is started from halt, the line pressure to actuate the clutches and brakes at the start of the vehicle may be reduced to a level which will enable the clutches and brakes to transmit a torque effective to cause the vehicle to creep. A hydraulic control system for the automatic power transmission has therefore been developed to realize such a scheme. The hydraulic control system is adapted to lessen the line pressure in response to idling conditions of the engine and the stop conditions of the vehicle and to raise the line pressure to a proper level when the idling conditions are terminated and the vehicle started. The idling conditions of the engine are, in the prior art control system, detected by means responsive to the movement of the accelerator pedal while the stop conditions of the vehicle are detected from the drop of the governor pressure which varies with the vehicle speed. When, thus, the accelerator pedal is released to bring the vehicle to a stop, the line pressure is decreased and accordingly the governor pressure produced from the line pressure is decreased. The governor pressure is effective to enable the engine to act as a brake when the engine is driven by the inertia of the vehicle and, for this reason, the governor pressure should be maintained to be higher than a certain level to enable the engine as a brake. Valve arrangements are therefore necessitated in the described prior art control system for maintaining the governor pressure higher than a certain level when the vehicle is being stopped from the forward drive condition. Such a consideration need not be paid for the reverse drive condition of the vehicle because of the fact that the engine may not act as a brake and accordingly the governor pressure may be left to decrease under the above-mentioned level.

As is well known in the art, the line pressure in the existing hydraulic control systems of automatic power transmissions is higher during starting of the vehicle from the neutral condition to the reverse drive condition than during starting of the vehicle from the neutral condition to the forward drive condition. It therefore follows that greater shocks are produced during starting of the vehicle to the reverse drive condition than during starting of the vehicle to the forward drive condition. For the sake of simplicity of construction of the hydraulic control system, therefore, it will be preferable thaht the line pressure be lessened only during starting of the vehicle from the neutral condition to the reverse drive condition and left unchanged during starting to the forward drive condition so that the valve arrangements to maintain the governor pressure higher than a certain level can be dispensed with.

It is, therefore, an important object of the present invention to provide an improved automatic power transmission having a hydraulic control system which is adapted to lessen the line pressure when the vehicle is to be started from the neutral condition to the reverse drive condition so that shocks produced during shifting from the neutral to the forward driving condition are advantageously reduced.

In accordance with the present invention, such an object will be accomplished in an automatic power transmission which consists of a transmission mechanism for selectively producing any of forward-speed gear ratios and a reverse-speed gear ratio and a hydraulic control system for hydraulically controlling the transmission mechanism, the hydraulic control system comprising a source of line pressure, a throttle valve responsive to load on an engine connected to the transmission mechanism for producing from the line pressure a throttle pressure which varies with the engine load, a governor valve responsive to vehicle speed for producing from the line pressure a basic governor pressure which varies with the vehicle speed, a hysteresis valve for producing from the line pressure a substantially constant hysteresis pressure which is higher than the governor pressure, a pressure regulator valve which has a first fluid port constantly in communication with the source of the line pressure, a second fluid port for being open to communicate with the source of the line pressure during forward drive condition of the vehicle, a third fluid port which is in constant communication with the throttle valve and a fourth fluid port to selectively communicating with the source of the line pressure or the hysteresis valve over a first two-position valve which is operative to pass therethrough the line pressure in the presence of the line pressure therein during the forward drive condition or the hysteresis pressure in the absence of the line pressure therein, whereby the pressure regulator valve is acted upon by: the line pressure in the first, second and fourth fluid ports and the throttle pressure in the third fluid port for maintaining the line pressure at a first level during the forward drive condition of the vehicle; the line pressure in the first fluid port and the throttle pressure in the third fluid port during reverse drive condition of the vehicle; and the line pressure in the first fluid port, the throttle pressure in the third fluid port and the hysteresis pressure in the fourth fluid port for maintaining the line pressure at a second level lower than the first level during idling under the reverse drive condition of the vehicle.

The communication between the hysteresis valve and the fourth fluid port of the pressure regulator valve may be controlled by a solenoid-operated control valve which is closed during open-throttle condition of the engine and which is responsive to idling condition of the engine for being open to provide the communication between the hysteresis valve and the fourth fluid port of the pressure regulator valve. Such communication may otherwise be controlled by a combination of a solenoid-operated control valve and an idle valve, wherein the solenoid-operated control valve is closed during open-throttle condition excepting kick-down condition and is responsive to idling or kick-down condition of the engine for being open to provide communication between the hysteresis valve and the idle valve and wherein the idle valve is biased to open to provide communication between the solenoid-operated control valve and the fourth fluid port of the pressure regulator valve and, when the solenoid-operated control valve is open, between the hysteresis valve and the fourth fluid port of the regulator valve and is responsive to the throttle pressure for closing to block the communication between the solenoid-operated control valve and the fourth fluid port of the pressure regulator valve when the throttle pressure is higher than a predetermined level. Where the combination of the solenoid-operated control valve and the idle valve which are thus responsive to not only the idling condition but the kick-down condition of the engine, the hydraulic control system may further comprise a plurality of shift valves each of which has a first fluid port communicating with the governor valve and the idle valve over a second two-position valve which is operative to pass therethrough the governor pressure in the absence of the hysteresis pressure directed thereto or the hysteresis pressure in the presence of both the governor pressure and the hysteresis pressure therein for urging the shift valve toward its upshift position by either the governor pressure or the hysteresis pressure and a second fluid port which is in constant communication with the throttle valve for urging the shift valve toward its downshift position by the throttle pressure, whereby all the shift valves are brought into their respective upshift positions to provide direct drive condition in the transmission mechanism when the solenoid-operated control valve and the idle valve are concurrently open and the hysteresis pressure is directed through the second two-position valve to the first fluid ports of the shift valves. The direct drive conditions thus established in the transmission mechanism will contribute to preventing the vehicle from creeping forward during idling condition of the engine. For the reason to be explained later, such creep preventive valve arrangement may preferably be made inoperable when a manual forward drive condition is selected. In this instance, the hydraulic control system further comprises a throttle back-up valve having a first fluid port for being open to communicate with the source of the line pressure during the manual forward drive condition, a second fluid port which is in constant communication with the throttle valve, and a third fluid port which is in communication with the above-mentioned second fluid port and the idle valve for normally directing the throttle pressure to the idle valve, the third fluid port being brought into the first fluid port for directing the line pressure to the idle valve and thereby causing the idle valve to interrupt the communication between the idle valve and the first fluid port of each of the shift valves whereby the shift valves are brought into their respective downshift positions. When a kick-down condition is attained in the engine during the automatic forward drive condition, the shift valves may preferably be moved to their respective upshift or downshift positions at a higher vehicle velocity than usual. For this purpose, the hydraulic control system may further comprise a kick-down valve having a first fluid port communicating over the solenoid-operated control valve with the hysteresis valve, a second fluid port which is in constant communication with the throttle pressure urging the kick-down valve toward an open condition, and a third fluid port to communicate with the above-mentioned first fluid port when the kick-down valve is in the open condition for delivering the hysteresis pressure from the third fluid port when the solenoid-operated control valve is open and concurrently the throttle pressure in the second fluid port is higher than a certain level, and a downshift valve having a first fluid port for being open to communicate with the source of the line pressure, a second fluid port for being open to communicate with the governor valve, a third fluid port which is in constant communication with the third fluid port of the kick-down valve and a fourth fluid port which is in constant communication with the first fluid ports of the shift valves through the previously mentioned second two-position valve, the downshift valve being in a position to boost the governor pressure to be delivered from the fourth fluid port thereof in the absence of the hysteresis pressure in the third fluid port and a position to directly pass the governor pressure through the second and fourth fluid ports of the downshift valve in the presence of the hysteresis pressure in the third fluid port thereof.

As will be understood more clearly as the description proceeds, the hydraulic control system according to the present invention will provide the following features:

1. During idling in the reverse drive condition, viz., when the vehicle is to be driven backward from a halt, the line pressure is reduced by means of the hysteresis pressure so that shocks produced in shift from the neutral condition of the transmission mechanism are significantly lessened.

2. During idling in the automatic forward drive condition, the shift valves which are usually acted upon by the governor pressure is acted upon by the hysteresis pressure which is higher than the governor pressure so that direct drive condition is achieved in the transmission mechanism, preventing the vehicle from creeping during idling.

3. During the manual forward drive condition, the fluid pressure to urge the shift valves toward the upshift positions is cut off and accordingly all the shift valves are held in the downshift conditions so that the low or intermediate speed gear ratio is achieved in the transmission mechanism. The creep preventive arrangement is thus rendered inoperable and as a consequence the vehicle is allowed to creep forward when the manual forward drive condition is established.

4. During kick-down condition in the automatic forward drive condition, the fluid pressure to urge the shift valves toward the upshift positions is diminished so that the shift valves are moved to the upshift or downshift positions at higher vehicle speed than usual.

5. During the manual intermediate-speed range condition, in which the engine may act as a brake, the fluid pressure to actuate the transmission mechanism is lessened to a level which will be conducive to reduce the shocks resulting from the shift and which will enable the engine to properly act as a brake.

6. The shift valves are moved at a higher vehicle speed to the upshift positions than when moved to the downshift positions.

The features and advantages of the automatic power transmission according to the present invention will become more apparent from the following description taken in conjunction with the accompanying drawings in which:

FIG. 5 is a schematic view which shows a modified valve arrangement which may be incorporated into the hydraulic control system illustrated in FIG. 4; and FIG. 6 is a schematic view which shows another modified valve arrangement which may be incorporated into the hydraulic control system illustrated in FIG. 4.

Figure 1:
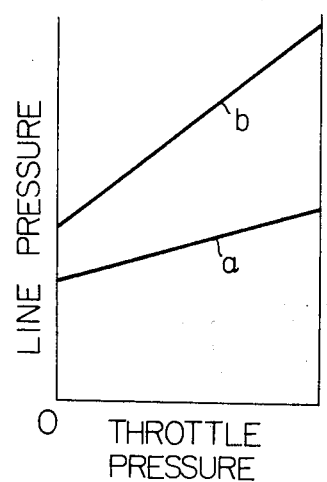
FIG. 1 is a graph which shows relations between the throttle pressure and the line pressure developed in a hydraulic control system of a prior art automatic power transmission when the vehicle is started to move forward and backward from a halt.

Reference will now be made to the drawings, first to FIG. 1. As previously noted, the line pressure of a hydraulic control system of an automatic power transmission is increased wih the increase in the throttle pressure of the control system as will be seen from curves $a$ and $b$ of FIG. 1, wherein the curve $a$ indicates the relation between the line pressure and the throttle pressure as achieved when the automatic forward drive range condition is selected from the neutral condition in the power transmission whereas the curve $b$ indicates the relation between the line and throttle pressures as achieved when the reverse drive condition is selected from the neutral condition. The increased line pressure is responsible for shocks produced in the transmission mechanism when a shift is made from the neutral to the forward or reverse drive condition. It has therefore been proposed to have the line pressure diminished when the vehicle is to be started to move from idling condition of the engine. As previously mentioned, the line pressure may be reduced when the throttle pressure is lowered to zero level with the accelerator pedal released and simultaneously the vehicle is at rest with the engine in idling condition. As will be evident from the curves $a$ and $b$ of FIG. 1, the line pressure in the hydraulic control system is higher and accordingly the shocks produced in the transmission mechanism are greater during starting from the neutral to the reverse drive condition than during starting from the neutral to the forward drive condition. From an economical point of view and for the simplicity of construction of the hydraulic control system, therefore, it is advantageous to have the line pressure decreased only during starting of the vehicle from the idling condition to the reverse drive condition and left unchanged during starting of the vehicle from the idling condition to the forward drive condition. If in this instance, arrangements are made so that the line pressure is reduced not only during starting of the vehicle from the idling condition to the reverse drive condition but during starting from the idling to the reverse drive condition, valves will be necessitated for the purpose of detecting the governor pressure indicative of the vehicle speed and maintaining above a certain level the governor pressure which is effective to enable the engine to act as a brake when the engine is to be driven from the vehicle. If, however, the line pressure is reduced only when the vehicle is to be started from the idling condition to the reverse drive condition, such valves need not be incorporated into the hydraulic control system and, on top of this, the line pressure of the control system may be varied without respect to the braking performance of the engine.

Figure 2:
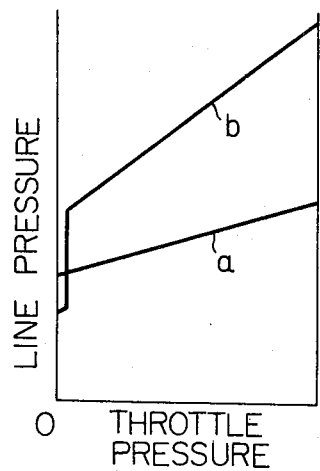
FIG. 2 is a graph similar to the graph of FIG. 1 but now shows the relations between the line pressure and the throttle pressure which are developed in the hydraulic control system of the automatic power transmission according to the present invention.

The present invention has been completed with this in mind and, thus, the line pressure developed in the hydraulic control system of the automatic power transmission according to the present invention will vary in relation to the throttle pressure of the control system as indicated by curves $a'$ and $b'$ of FIG. 2, wherein the curve $a'$ indicates the variation of the line pressure which is increased as the throttle pressure increases during starting of the vehicle from the idling condition to the forward drive condition as is usual in an ordinary power transmission and the curve $b'$ indicates the variation of the line pressure which is reduced when the throttle pressure approximates the zero level and which is increased with the throttle pressure during starting of the vehicle from the idling condition to the reverse drive condition.

Figure 3:
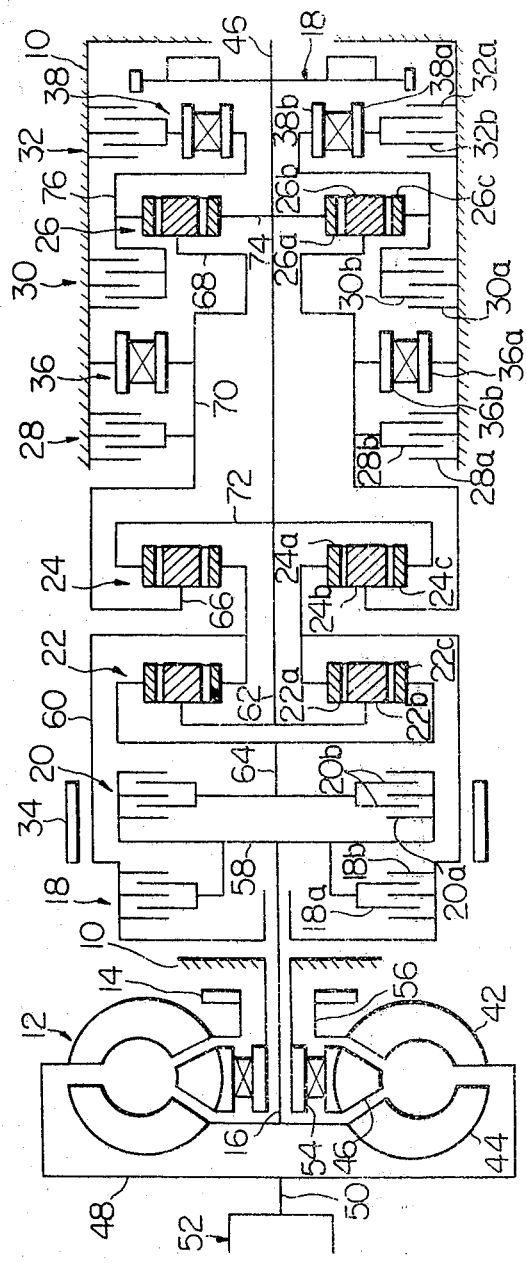
FIG. 3 is a schematic view which shows a preferred example of the transmission mechanism which may be incorporated into the automatic power transmission according to the present invention.
Figure 4A:
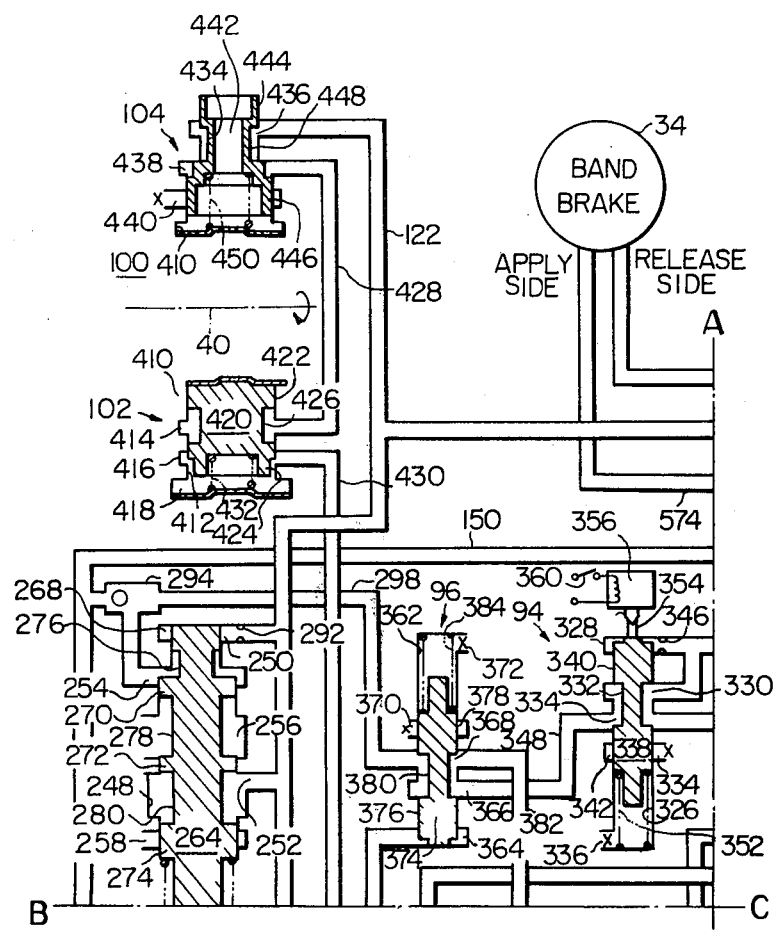
FIG. 4 is a schematic view which shows a preferred form of hydraulic control system which may be combined with the transmission mechanism illustrated in FIG. 3.
Figure 4B:
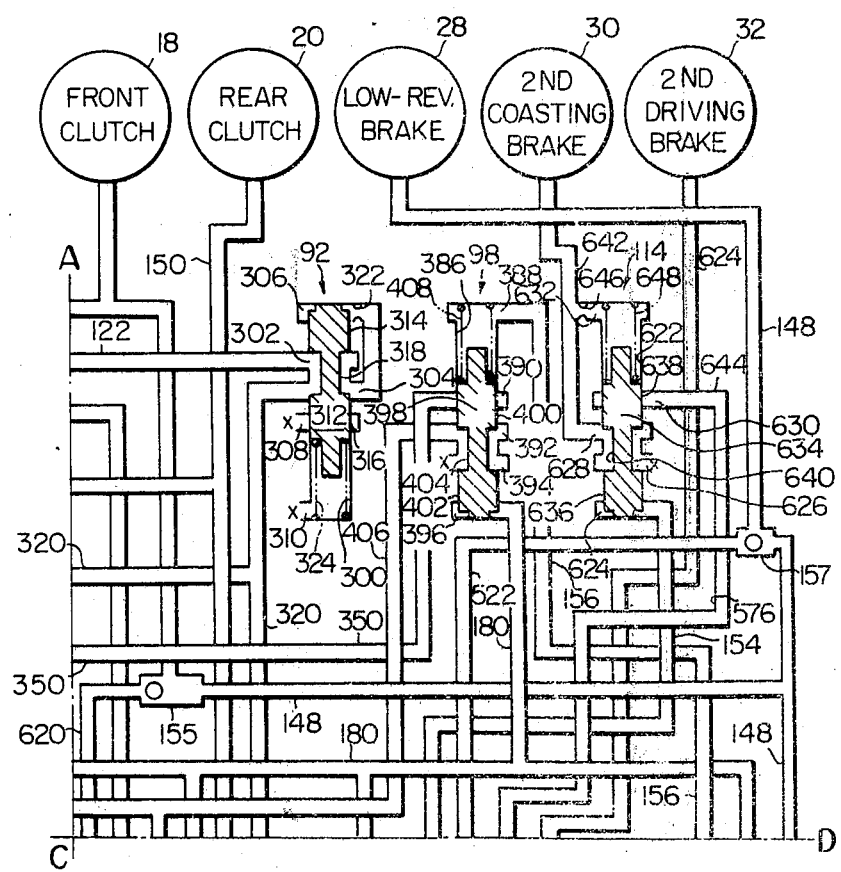
Figure 4C:
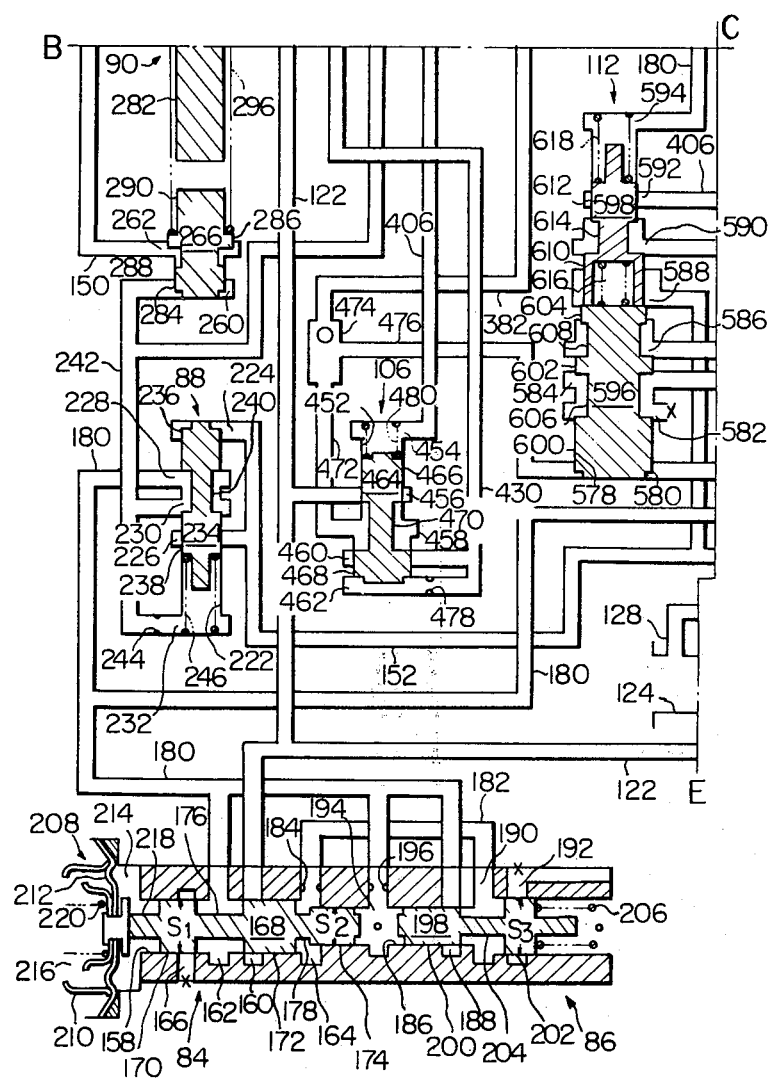
Figure 4D:
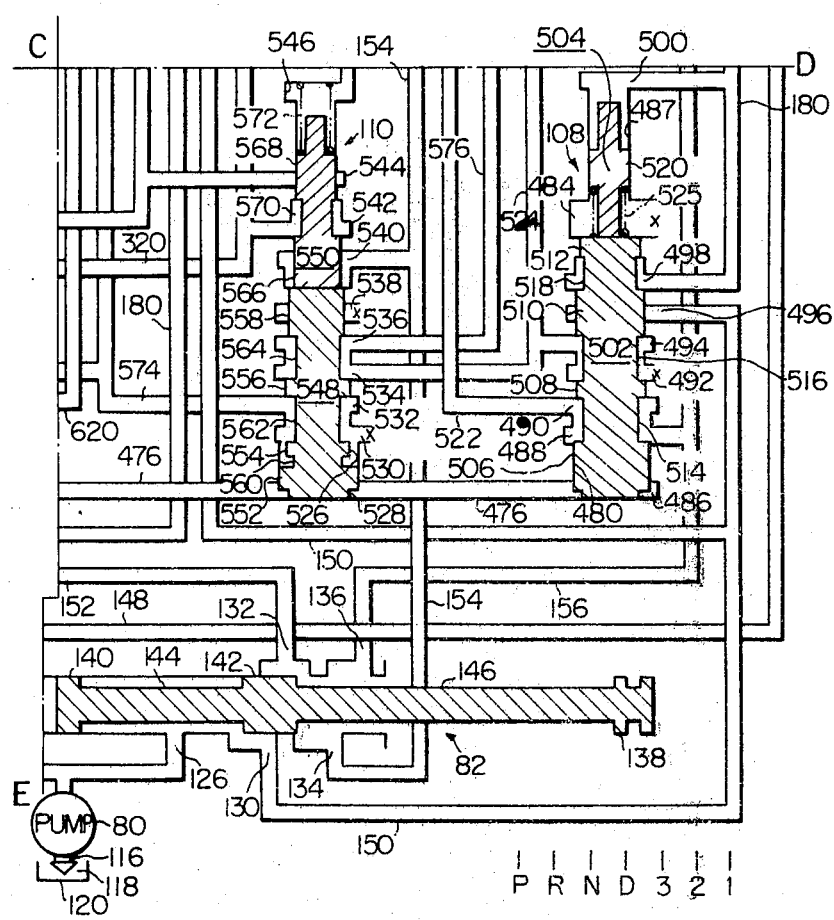

FIG. 3 illustrates an example of the automatic power transmission mechanism to which the hydraulic control system embodying the present invention is applicable. The automatic power transmission mechanism is herein shown as being of the four-forward-speed and one-reverse-speed type. This is, however, merely by way of example and, as such, the hydraulic control system according to the present invention may be incorporated into any of other types of automatic power transmission such as for example a three-forward-speed and one-reverse-speed transmission or a five-forward-speed and one-reverse-speed transmission.

Referring to FIG. 3, the automatic power transmission mechanism is shown to largely consist of a transmission case which is generally designated by reference numeral 10, a torque converter 12, an oil pump 14, a transmission input shaft 16, a first or front clutch 18, a second or rear clutch 20, first, second and third planetary gear sets 22, 24 and 26, respectively, a low-and-reverse brake 28, a second-speed-coasting brake 30, a second-speed-driving brake 32, a band brake 34, a low-one-way clutch 36, a second-speed one-way clutch 38 and a transmission output shaft 40. The torque converter 12 is assumed to be of the three-member type and thus consists of a driving member or impeller 42, a driven member or turbine 44, and a reaction member or stator 46 as is customary in the art. The impeller 42 is connected through a torque converter drive plate 48 to the crankshaft 50 of a power plant such as an internal combustion engine 52 and is thus driven to rotate at engine speed when the engine is in operation. The turbine 44 is mounted on, or usually splined to, the transmission input shaft 16 and drives the transmission input shaft 16 through speed and torque ratio changes when the impeller 42 is driven by the engine 52. The stator 46 is connected to the transmission case 10 through a one-way clutch 54. The stator 46 is thus allowed to rotate in the same direction as the impeller 42 and is prevented from being rotated in the opposite direction. The impeller 42 is further connected through an impeller shaft 56 to the oil pump 14. The oil pump 14 is thus operative to deliver a working fluid under pressure when the impeller 42 of the torque converter 12 is driven by the engine 48. The transmission input shaft 16 is connected to clutch discs 18a of the front clutch 18 and to clutch plates 20a of the rear clutch 20 through a common connecting member 58.

The first, second and third planetary gear sets 22, 24 and 26 consist respectively of externally toothed sun gears 22a, 24a and 26a rotatable about their respective axes which are in line with the transmission output shaft 40, planet pinions 22b, 24b and 26b which are respectively in mesh with the sun gears 22a, 24a and 26a and which are rotatable about their respective axes around the mating sun gears, and internally toothed ring gears 22c, 24c and 26c which are respectively in mesh with the planet pinions 22b, 24b and 26b about the axes of the associated sun gears. The sun gears 22a and 24a of the first and second planetary gear sets 22 and 24, respectively, are connected to clutch plates 18b of the front clutch 18 through a connecting drum 60. When, thus, the clutch discs 18a and the clutch plates 18b are engaged by each other, the front clutch 18 is coupled so as to transmit the driving power from the transmission input shaft 16 to the connecting drum 60 so that the sun gears 22a and 24a of the first and second planetary gear sets 22 and 24, respectively, are driven from the engine 52. The connecting drum 60 is wrapped with the band brake 34. When, thus, the brake band 34 is actuated to be tightened upon the drum 60, the drum 60 is locked and accordingly the sun gear 22a of the first planetary gear set 22 and the sun gear 24a of the second planetary gear set 24 are held stationary. The planet pinions 22b of the first planetary gear set 22 are carried by a pinion carrier 62 and are connected through the pinion carrier 62 to the transmission output shaft 40. The ring gear 22c of the first planetary gear set 22 is connected to clutch discs 20b of the rear clutch 20 through an intermediate shaft 64 which is in line with the transmission input and output shafts 16 and 40. When the clutch plates 20a and the clutch discs 20b are engaged by each other, the rear clutch 20 transmits the driving power from the transmission input shaft 16 to the intermediate shaft 64 so that the ring gear 22c of the first planetary gear set 22 is driven from the engine 52 through the torque converter 12. The planet pinions 24b of the second planetary gear set 24 are carried by a pinion carrier 66 and likewise the planet pinions 26b of the third planetary gear set 24 are carried by a pinion carrier 68. The pinion carriers 66 and 68 are connected together by a connecting drum 70 which is positioned in surrounding relation to the transmission output shaft 40. The ring gear 24c of the second planetary gear set 24 and the sun gear 26a of the third planetary gear set 26 are connected to the transmission output shaft 40 through connecting members 72 and 74, respectively.

The low-and-reverse brake 28 has stationary brake plates 28a fixed to the transmission case 10 and movable brake discs 28b connected to the connecting drum 70 which interconnects the pinion carriers 66 and 68 of the planet pinions 24b and 26b of the second and third planetary gear sets 24 and 26, respectively. When, thus, the movable brake discs 28b are actuated into engagement with the stationary brake plates 28a, the low-and-reverse brake 28 becomes operative to brake the connecting drum 70 so that the planet pinions 24b of the second planetary gear set 24 and the planet pinions 26b of the third planetary gear set 26 are held stationary. The low-and-reverse brake 28 is parallelled by the low-one-way clutch 36 which has an outer race member 36a fixed to the transmission case 10 and an inner race member 36b connected to the connecting drum 70. The low-one-way clutch 36 is coupled to transmit a driving torque from the transmission input shaft 16 to the transmission output shaft 40 and is uncoupled to idle away (with the inner race member rotating freely in the outer race member) when a driving torque is imparted to the one-way clutch 36 from the transmission output shaft 40.

The second-speed-coasting brake 30 has stationary brake plates 30a fixed to the transmission case 10 and movable brake discs 30b connected to the rear gear 26c of the third planetary gear set 26 through a connecting drum 76. When, thus, the movable brake discs 30b are actuated to be engaged by the stationary brake plates 30a, the second-speed-coasting brake 30 becomes operative to brake the connecting drum 76 so that the ring gear 26c of the third planetary gear set 26 is held stationary. The connecting drum 76 is further connected to the second-speed-driving brake 32 through the second-speed one-way clutch 38. The second-speed-driving brake 32 has stationary brake plates 32a which are fixed to the transmission case 10 and movable brake discs 32b which are connected to an outer race member 38a of the second-speed one-way clutch 38 which has an inner race member 38b connected to the connecting drum 76. The second-speed one-way clutch 38 is adapted to be coupled when driven by a driving torque transmitted thereto from the transmission input shaft 16 and is uncoupled when a driving torque is imparted thereto from the transmission output shaft 40. When, thus, a driving torque is being transmitted from the transmission input shaft 16 to the second-speed one-way clutch 38 and at the same time the movable brake discs 32b of the second-speed-driving brake 32 are engaged by the stationary brake plates 32a, both of the second-speed-driving brake 32 and the second-speed one-way clutch 38 are coupled so that the connecting drum 76 is braked upon by the second-speed-driving brake 32 and accordingly the ring gear 26c of the third planetary gear set 26 is held stationary. When a driving torque is transmitted to the second-speed one-way clutch 38 from the transmission output shaft 40, then the inner race member 38b of the one-way clutch 38 freely rotates in the outer race member 38a so that the driving torque from the output shaft 40 is not transmitted to the ring gear 26c of the third planetary gear set 26 with the second-speed one-way clutch 38 idling away. Designated by reference numeral 78 is a governor unit which is mounted on the transmission output shaft 40 for producing a fluid pressure which is related to the revolution speed of the transmission output shaft 40 as will be discussed later in greater details. The low-one-way clutch 36 and the second-speed one-way clutch 38 have been described as being of the Sprag type. This is, however, merely by way of example and as such the clutches 36 and 38 may be of the known cam and roller type where desired.

The front clutch 18, the rear clutch 20, the low-and-reverse brake 28, the second-speed-coasting brake 30, the second-speed-driving brake 32 and the band brake 34 are actuated and the low-one-way clutch 36 and the second-speed one-way clutch 38 are coupled selectively in accordance with schedules which are indicated in Table 1, wherein a symbol o is indicative of the coupled condition of each of the clutches 18 and 20 and the brakes 28, 30, 32 and 34 and a symbol x is indicative of the coupled condition of each of the one-way clutches 36 and 38. The gear ratios indicated in the rightmost column of Table 1 have been calculated on the assumption that all the planetary gear sets 22, 24 and 26 have identical configurations and that the sun gear and the ring gear of each of the planetary gear sets have 37 and 80 teeth, respectively. The gear ratios may be changed if the numbers of teeth of the sun and ring gears of the individual planetary gear sets are otherwise selected.

clutch 36 is actuated. In this instance, the motions taking place in the transmission mechanism will be easily understood if it is assumed that the driving torque originates in the transmission output shaft 40 and is transmitted from the transmission output shaft 40 to the transmission input shaft 16, the case being actually to the contrary. When, thus, the transmission output shaft 15 is rotated with the low-and-reverse brake 28 on the low-one-way clutch 36 coupled, the ring gear 24c of the second planetary gear set 24 is driven to rotate at the same speed and in the same direction as the transmission output shaft 40 through the connecting member 72 and concurrently the connecting drum 70 interconnecting the pinion carriers 66 and 68 of the second and Table 1

| Selected Speeds | | Front clutch 18 | Rear clutch 20 | Low-rev. brake 28 | 2nd-speed-coasting brake 30 | 2nd-speed-driving brake 32 | Band brake 34 | Low one-way brake 36 | 2nd-speed one-way brake 38 | Gear ratio |
|---|---|---|---|---|---|---|---|---|---|---|
| Automatic Drive Range | 1st | | o | | | | | x | | 2.46:1 |
| | 2nd | | o | | | o | | | x | 2.00:1 |
| | 3rd | | o | | | | o | | | 1.46:1 |
| | 4th | o | o | | | | | | | 1.00:1 |
| Manual Forward Speed Range | 1st | | o | o | | | | | | 2.46:1 |
| | 2nd | | o | | o | | | | | 2.00:1 |
| | 3rd | | o | | | | o | | | 1.46:1 |
| Reverse | | o | | o | | | | | | −2.16:1 |

As will be seen from Table 1, the conditions providing the first and second speeds in the automatic drive range differ from those providing the first and second speeds in the manual forward speed range in that, while the driving torque is transmitted only in one direction from the input shaft 16 to the output shaft 40 during the conditions in which the first or second speed is established in the automatic drive range, the driving torque can be transmitted either from the input shaft 16 to the output shaft 40 or from the output shaft 40 to the input shaft 16 during the conditions in which the first or second speed is selected in the manual forward-speed range. As previously mentioned, the low-one-way clutch 36 and the second-speed one-way clutch 38 are adapted to be coupled when given a driving torque from the transmission input shaft 16 and are uncoupled when subjected to a driving torque from the transmission output shaft 40. When, thus, the first or second speed is established in the automatic drive range with the low-one-way clutch 36 or the second-speed one-way clutch 38 held in a coupled condition, no driving torque can be transmitted from the transmission output shaft 40 to the transmission input shaft 16. This means that the engine 52 is unable to act as a brake when the vehicle is to be driven by an inertia of the vehicle if the first or second speed gear ratio is being attained during the automatic drive range. If it is desired to enable the engine to act as a brake as when, for example, the vehicle is descending a hill, it is thus necessary to have the low-and-reverse brake 28 actuated to attain the first-speed gear ratio and to have the second-speed-coasting brake 30 actuated to attain the second-speed gear ratio.

The operation of the automatic power transmission mechanism thus arranged will now be described.

To achieve the first-speed gear ratio in the manual forward-speed range or in the automatic drive range, the rear clutch 20 is coupled and simultaneously either the low-and-reverse brake 28 or the low-one-way clutch 36 is actuated. In this instance, the motions taking place in the transmission mechanism will be easily understood if it is assumed that the driving torque originates in the transmission output shaft 40 and is transmitted from the transmission output shaft 40 to the transmission input shaft 16, the case being actually to the contrary. When, thus, the transmission output shaft 15 is rotated with the low-and-reverse brake 28 on the low-one-way clutch 36 coupled, the ring gear 24c of the second planetary gear set 24 is driven to rotate at the same speed and in the same direction as the transmission output shaft 40 through the connecting member 72 and concurrently the connecting drum 70 interconnecting the pinion carriers 66 and 68 of the second and third planetary gear sets 24 and 26, respectively, is braked by the low-and-reverse brake 28 or the low-one-way clutch 36. The sun gear 24a of the second planetary gear set 24 is consequently driven to rotate at a certain speed and in an opposite direction to the rotation of the ring gear 24c with the planet pinions 24b of the gear set 24 held stationary. The sun gear 22a of the first planetary gear set 22 is accordingly driven to rotate at the same speed and in the same direction as the sun gear 24a of the second planetary gear set 24. The pinion carrier 62 of the first planetary gear set 22 being connected to and rotating with the transmission output shaft 40, the ring gear 22c of the first planetary gear set 22 is driven to rotate in an opposite direction to the sun gear 22a (viz., in the same direction as the ring gear 24c of the second planetary gear set 24) and at a speed which is dictated by the revolution speeds of the sun gear 22a and the pinion carrier 62 of the planetary gear set 22. A driving torque is thus transmitted from the ring gear 22c of the first planetary gear set 22 to the transmission input shaft 16 through the intermediate shaft 64 and the rear clutch 20. Actually, the driving torque is transmitted in a reverse direction from the transmission input shaft 16 to the transmission output shaft 40, but the relative motions between the mating gears and the ratio between the revolution speeds of the transmission input and output shafts 16 and 40 are virtually similar to those above described. The first-speed gear ratio is in this manner determined by the numbers of teeth of the sun and ring gears of the first and second planetary gear sets 22 and 24.

To achieve the second-speed gear ratio, the rear clutch 20 is coupled and at the same time either the second-speed-coasting brake 30 is coupled for the manual forward speed range or the second-speed-driving brake 32 is coupled for the automatic drive range. In this instance, it is also assumed for ease of understanding that the driving torque is transmitted from the transmission output shaft 40 to the transmission input shaft 16, contrary to the actual motions to take place in the tranmsission mechanism. When, thus, the transmission output shaft 40 is rotated with the connecting drum 76 braked by either the second-speed-coasting brake 30 or the second-speed-driving brake 32, the sun gear 26a of the third planetary gear set 26 is driven at the same speed and in the same direction as the transmission output shaft 40 through the connecting member 74 and concurrently the ring gear 26c of the third planetary gear set 26 is held stationary. The pinion carrier 68 carrying the planet pinions 26b of the third planetary gear set 26 is consequently driven to rotate at a certain speed. Since the pinion carrier 68 of the third planetary gear set 26 is connected through the connecting drum 70 to the pinion carrier 66 carrying the planet pinions 24b of the second planetary gear set 24 and since the ring gear 24c of the second planetary gear set 24 is connected to the transmission output shaft 40 through the connecting member 72 and is thus driven to rotate at the same speed as the transmission output shaft 40, the sun gear 24a of the second planetary gear set 24 is driven to rotate at a certain speed which is dictated by the revolution speeds of the pinion carrier 66 and the ring gear 24c of the second planetary gear set 24. Since, furthermore, the sun gear 24a of the second planetary gear set 24 is connected to the sun gear 22a of the first planetary gear set 22 and since the pinion carrier 62 carrying the planet pinions 22b of the first planetary gear set 22 is connected to the transmission output shaft 40 and is therefore driven to rotate at the same speed and in the samd direction as the transmission output shaft 40, the ring gear 22c of the first planetary gear set 22 is driven to rotate in the same direction as the pinion carrier 62 and at a certain speed which is dictated by the revolution speeds of the sun gear 22a and the pinion carrier 62 of the first planetary gear set 22. The ring gear 22c of the first planetary gear set 22 being connected to the transmission input shaft 16 through the intermediate shaft 64 and the rear clutch 20, the transmission input shaft 16 is driven to rotate at the same speed and in the same direction as the ring gear 22c of the first planetary gear set 22. Although, in this instance, the actual direction of torque transmission between the transmission input shaft 16 and the transmission output shaft 40 is opposite to that above described, the relative motions between the mating gears and the ratio between the revolution speeds of the transmission input and output shafts 16 and 40 are virtually similar to those which have been described above.

For the purpose of attaining the third-speed gear ratio in the automatic drive range or the manual forward-speed range, the rear clutch 20 is coupled and at the same time the band brake 34 is applied. The driving torque is consequently transmitted from the transmission input shaft 16 to the ring gear 22c of the first planetary gear set 22 through the rear clutch 20 and the intermediate shaft 64. Since, in this instance, the sun gear 22a of the first planetary gear set 22 is held stationary with the connecting drum 60 braked upon by the band brake 32, the pinion carrier 62 carrying the planet pinions 22b of the first planetary gear set 22 is driven to rotate at a certain speed and in the same direction as the ring gear 22c and drives the transmission output shaft 40 to rotate at the same speed as the pinion carrier 62.

The fourth-speed gear ratio of the automatic drive range can be produced when both of the front and rear clutches 18 and 20 are concurrently coupled. Under these conditions, the sun gear 22a and the ring gear 22c of the first planetary gear set 22 are driven to rotate at the same speeds as the revolution speed of the transmission input shaft 16 through the front clutch 18 and the rear clutch 20, respectively, and the first planetary gear set 22 is driven to rotate as a unit from the transmission input shaft 16 so that the transmission output shaft 40 is driven by the pinion carrier 62 of the first planetary gear set 22. Under the direct drive condition thus established, the transmission output shaft 40 is rotated at the same speed as the revolution speed of the transmission input shaft 16.

To achieve the reverse gear ratio, the front clutch 18 is coupled and the low-and-reverse brake 28 applied. The driving torque is consequently transmitted from the transmission input shaft 16 to the sun gear 24a of the second planetary gear set 24 and at the same time the planet pinions 24b of the second planetary gear set 24 is held stationary because the connecting drum 70 interconnecting the pinion carriers 66 and 68 of the second and third planetary gear sets 24 and 26 is braked upon by means of the low-and-reverse brake 28. The ring gear 24c of the second planetary gear set 24 is consequently driven to rotate at a certain speed and in a direction opposite to the direction of rotation of the sun gear 24a of the planetary gear set 24. The driving torque from the transmission input shaft 16 is thus transmitted in a reversed direction to the transmission output shaft 40 through the ring gear 24c of the second planetary gear set 24.

The front clutch 18, the rear clutch 20, the low-and-reverse brake 28, the second-speed-coasting brake 30, the second-speed-driving brake 32 and the band brake 34 are controlled in accordance with the previously described schedules by means of a hydraulic control system which is illustrated in FIG. 4. Referring to FIG. 4, the hydraulic control system comprises an oil pump 80, a manual selector valve 82, a vacuum-operated throttle valve 84 cooperating with a pressure modifier valve 86, a throttle back-up valve 88, a control pressure regulator valve 90, a hysteresis valve 92, a solenoid-operated control valve 94, an idle valve 96, a kick-down valve 98, a governor valve unit 100 which consists of a primary valve 102 and a secondary valve 104, a downshift valve 106, a first-second speed shift valve 108, a second-third speed shift valve 110, a third-fourth speed shift valve 112, and a second-speed pressure modulator valve 114, all of which valves are interconnected to one another by passageways case in the transmission case.

The pump 80 has a suction port connected through a fluid inlet passageway 116 and a strainer 118 to an oil reservoir 120. The pump 80, which is usually driven by the engine crankshaft, delivers a fluid under pressure from its delivery port which is open to a line-pressure passageway 122.

The manual selector valve 82 comprises an elongated valve chamber 124 which has first, second, third, fourth, fifth and sixth fluid ports 126, 128, 130, 132, 134 and 136, respectively, and a spool valve member 138 which is axxially movable in the valve chamber 124. The valve chamber 124 is drained at both axial ends to the oil reservoir 120. The spool valve member 138 is formed with a first land 140 which is located at one axial end of the valve member and a second land 142 which is located at an intermediate longitudinal portion of the valve member. A first circumferential groove 144 is thus formed between the axially spaced first and second lands 140 and 142 and a second circumferential groove 146 formed in the remaining longitudinal portion of the valve member 138. The first fluid port 126 of the valve chamber 124 is in communication with the pump 80 through the line-pressure passageway 122 and the second, third, fourth, fifth and sixth fluid ports 128, 130, 132, 134 and 136 of the valve chamber 124 lead to fluid passageways 148, 150, 152, 154, and 155, respectively. The spool valve member 138 is mechanically connected to a manual selector lever (not shown) which may be manually operated by a vehicle driver to move the spool valve member 138 to seven different positions which include the parking position P, the reverse position R, the neutral position N, the normal or automatic drive range position D, the manual first-forward-speed-range position 3, the manual second-forward-speed-range position 2 and the manual first-forward-speed range position 1, as indicated on a right-hand lever part of FIG. 4. The fluid ports of the valve chamber 124 are located in the following manners. When the spool valve member 138 is moved to the parking position P, the first fluid port 126 leading from the line-pressure passageway 122 is closed by the second land 142 of the spool valve member 138 so that no fluid pressure will be admitted into the valve chamber 124 and passed over to the fluid passageway 148, 150, 152, 154 and 156 through the second, third, fourth, fifth and sixth fluid ports 128, 130, 132, 134 and 136, respectively, although the second to six fluid ports are open or, more specifically, the second fluid port 128 is in communication with the first circumferential groove 144 in the valve member 138 and the third, fourth, fifth and sixth ports 130, 132, 134 and 136 are in communication with the second circumferential groove 146 in the valve member 138. The third to sixth fluid ports are drained off through one axial end of the valve chamber 124. When the spool valve member 138 is axially moved to the reverse position R, the first and second fluid ports 126 and 128 are brought into communication with the first circumferential groove 144 in the spool valve member 138 whereas the third, fourth, fifth and sixth fluid ports 130, 132, 134 and 136 are isolated from the first fluid port 126 by the second land 142 of the spool valve member 138 and are drained off. Fluid communication will thus be established between the line-pressure passageway 122 leading to the first fluid port 126 and the fluid passageway 148 leading from the second fluid port 128. When the spool valve member 138 is axially moved to the neutral position N, then the first fluid port 126 is brought into communication with the first circumferential groove 144 in the valve member 138 but the second fluid port 128 is isolated from the first fluid port 126 by the first land 140 of the valve member 138 and at the same time the third, fourth, fifth and sixth fluid ports 130, 132, 134 and 136 are isolated from the first fluid port 126 by the second land 142 of the valve member 138 and are drained off. No fluid pressure will consequently be passed from the first fluid port 126 over to the fluid passageways 148, 150, 152, 154 and 156 through the second, third, fourth, fifth and sixth fluid ports 128, 130, 132, 134 and 136, respectively, as in the case where the spool valve member 138 is moved to the parking position P. When the spool valve member 138 is axially moved to the normal or automatic drive range position D as illustrated in FIG. 4, both of the first and third fluid ports 126 and 130 are in communication with the first circumferential groove 144 of the valve member 138 whereas the second fluid port 128 is isolated from the first fluid port 126 by means of the first land 140 of the valve member 138 and at the same time the fourth, fifth and sixth fluid ports 132, 134 and 136 are isolated from both of the first and third fluid ports 126 and 130 by the second land 142 of the valve member 138 and are thus drained off. Under these conditions, the fluid pressure in the line-pressure passageway 122 is passed over to the passageway 150 through the first fluid port 126, the first circumferential groove 144 in the valve member 138 and the third fluid port 130. When the spool valve member 138 is axially moved to the manual third-forward-speed-range position 3, then the first, third and fourth fluid ports 126, 130 and 132 are in communication with the first circumferential groove 144 in the valve member 138 whereas the second fluid port 128 is isolated from the first fluid port 126 by means of the first land 140 of the valve member 138 and at the same time the fifth and sixth fluid ports 134 and 136 are isolated from the first, third and fourth fluid ports 126, 130 and 132 by the second land 142 of the valve member 138 and are drained off. The fluid pressure in the line-pressure passageway 122 is consequently passed over to the fluid passageways 150 and 152 through the third and fourth fluid ports 130 and 132, respectively. When the spool valve member 138 is axially moved to the manual second-forward-speed position 2, then the first, third, fourth and fifth fluid ports 126, 130, 132 and 134 are in communication with the first circumferential groove 144 in the valve member 138 with the second fluid port 128 kept isolated from the first fluid port 126 by the first land 140 of the valve member 138 and the sixth fluid port 136 isolated from the first, third, fourth and fifth fluid ports 126, 130, 132 and 134 by the second land 142 of the valve member 138 and is thus drained off. The fluid pressure in the line-pressure passageway 122 is thus directed to the fluid passageways 150, 152 and 154 through the third, fourth and fifth fluid ports 130, 132 and 134, respectively. When the spool valve member 138 is axially moved from the manual second-forward-speed-range position 2 to the manual first-forward-speed-range position 1, then the sixth fluid port 136 is open in addition to the first, third, fourth and fifth fluid ports 126, 130, 132 and 134 which are kept open. The fluid pressure in the line-pressure passageway 122 is consequently passed over to the passageways 150, 152, 154 and 156 through the third, fourth, fifth and sixth fluid ports 130, 132, 134 and 136, respectively.

From the above description it will be understood that the line pressure is selectively established in one or more of the five outlet ports 128, 130, 132, 134 and 136 of the manual selector valve 82 in accordance with the following schedules; in the second fluid port 128 when the manual selector valve 82 is in the reverse position R; in the third fluid port 130 when the manual selector valve 82 is in the normal or automatic drive range D or any of the third-, second- and first-forward-speed-range positions 3, 2 and 1; in the third fluid port 132 when the manual selector valve 82 is in any of the manual third-, second- and first-forward-speed-range positions 3, 2 and 1; in the firth fluid port 134 when the manual selector valve 82 is in either of the manual second- and first-forward-speed-range positions 2 and 1; and in the sixth fluid port 136 when the manual selector valve 82 is in the manual first-forward-speed range position 1. When, furthermore, the manual selector valve 82 is in any of the positions other than the manual third-, second- and first-forward-speed-range positions 3, 2 and 1, the fourth, fifth and sixth fluid ports 132, 134 and 136 are drained off, viz., in communication with the previously mentioned oil reservoir 120 so that no fluid pressure will be developed in the fluid passageways 152, 154 and 156. When the manual selector valve 82 is in the manual third-forward-speed-range position 3, the fifth and sixth fluid ports 134 and 136 are drained off so that no fluid pressure will be developed in the fluid passageways 154 and 156. When the manual selector valve 82 is in the manual second-forward-speed-range position 2, the sixth fluid port 136 is drained off so that no fluid pressure will be developed in the fluid passageway 156. When the manual selector valve 82 is in the manual first-forward-speed-range position, none of the fourth, fifth and sixth fluid ports 132, 134 and 136 is drained off.

The fluid passageway 148 leading from the second fluid port 128 is in communication through a shuttle valve 155 to the apply servo mechanism of the front clutch 18 and to the release side of the servo mechanism of the band brake 35 and through a shuttle valve 157 to the apply servo mechanism of the low-and-reverse brake 28. The fluid passageway 150 leading from the third fluid port 130 of the selector valve 82 is in communication with the apply servo mechanism of the rear clutch 20. When, thus, the manual selector valve 82 is moved to the reverse position R with the result that the second fluid port 128 is brought into communication with the line-pressure passageway 122, the line pressure is directed to the fluid passageway 148 so that the front clutch 18 is coupled, the low-and-reverse brake 28 is actuated and the band brake 34 is released. When, on the other hand, the manual selector valve 82 is moved to the normal or automatic drive range position D or any one of the manual third-, second- and first-forward-speed-range positions 3, 2 and 1 and consequently the third fluid port 130 of the manual selector valve 82 is brought into communication with the line-pressure passageway 122, then the line pressure is directed to the fluid passageway 150 so that the rear clutch 20 is coupled. Operations of the shuttle valves 155 and 157 which are disposed in the fluid passageway 148 will be described later.

The line pressure in the line-pressure passageway 122 is directed to the vacuum-operated throttle valve 84. The vacuum-operated throttle valve 84 cooperates with the pressure modifier valve 86 and is operative to regulate the line pressure to be applied to the clutches and brakes of the power transmission mechanism in relation to the vacuum in the intake manifold of the engine so as to change the gear ratio shift point in accordance with variation in the engine load. The line pressure thus regulated by the combination of the throttle valve 84 and the pressure modifier valve 86 will be herein termed a throttle pressure. The throttle valve 84 comprises an elongate valve chamber 158 which has first, second, third and fourth fluid ports 160, 162, 164 and 166 and a spool valve member 168 which is axially movable in the valve chamber 158. The spool valve member 168 is formed with first, second and third lands 170, 172 and 174 which are axially spaced apart from each other and which thus define a first circumferential groove 176 between the first and second lands 170 and 172 and a second circumferential groove 178 between the second and third lands 172 and 174, as shown. The first and second lands 170 and 172 have equal cross sectional areas $S_1$ and the third land 174 has a cross sectional area $S_2$ which is smaller than the cross sectional areas $S_1$ of the lands 170 and 172. The first fluid port 160 is in communication with the line-pressure passageway 122 and is so located as to be covered or uncovered by the second land 172 of the spool valve member 168 depending upon the axial relative position of the valve member relative to the port 160. The second fluid port 162 is in communication with a throttle-pressure passageway 180 and is kept open to the first circumferential groove 176 between the first and second lands 170 and 172 irrespective of the axial relative position of the spool valve member 168 in the valve chamber 158. The third fluid port 164 is in communication with a fluid passageway 182 through a restriction or orifice 184 and is kept open to the second circumferential groove 178 between the second and third lands 172 and 174 of the spool valve member 168. The fourth fluid port 166 is a drain port which leads to the oil reservoir 120 and which is so located as to be covered or uncovered by the first land 170 of the spool valve member 168 depending upon the axial relative position of the spool valve member 168 in the valve chamber 158.

The pressure modifier valve 86 cooperating with the throttle valve 84 above described comprises an elongated valve chamber 186 which has first, second and third fluid ports 188, 190 and 192. The valve chamber 186 of the pressure modifier valve 86 is conjoined at one end to the valve chamber 158 of the throttle valve 84 through an intermediate port 194 which is in constant communication with the throttle-pressure passageway 180 through a restriction or orifice 196. The pressure modifier valve 86 further comprises a spool valve member 198 which is formed with a first land 200 located adjacent to the intermediate port 194 between the valve chambers 158 and 186 of the throttle valve 84 and the pressure modifier valve 86, respectively, and a second land 202 which is axially spaced apart from the first land 200 for defining a circumferential groove 204 between the first and second lands 200 and 202. The first land 200 has a cross sectional area which is equal to the cross sectional area $S_2$ of the third land 174 of the spool valve member 168 of the throttle valve 84 and the second land 202 has a cross sectional area $S_3$ which is larger than the cross sectional area $S_2$ of the first land 200. The first fluid port 188 is in communication with the throttle-pressure passageway 180 and is so located as to be covered or uncovered by the first land 198 of the spool valve member 198 depending upon the axial relative position of the valve member in the valve chamber 186. The second fluid port 190 is in communication with the fluid passageway 182 leading from the third fluid port 178 of the valve chamber 158 of the throttle valve 84 and is kept open to the circumferential groove 204 between the first and second lands 200 and 202 irrespective of the axial relative position of the spool valve member 198 in the valve chamber 186. The third fluid port 192 is a drain port communicating with the oil reservoir 120 and which is so located as to be covered or uncovered by the means of the second land 202 of the valve member 198 depending upon the axial relative position of the valve member in the valve chamber 186. The spool valve member 198 is biased to axially move toward the intermediate port 194 by means of a preload spring 206 which is shown as being seated at one end on the second land 202 of the valve member. The force thus acting on the spool valve member 198 from the preload spring 206 is herein denoted by F$s$.

As previously noted, the throttle valve 84 is responsive to the vacuum which is developed in the intake manifold of the engine. The throttle valve 84 is thus provided with a vacuum-operated valve actuator which is generally designated by reference numeral 208. The vacuum-operated valve actuator 208 comprises a casing 210 which is divided by a diaphragm member 212 into an air chamber 214 and a vacuum chamber 216 which is in constant communication with the intake manifold of the engine though not shown in FIG. 4. The spool valve member 168 of the throttle valve 84 has an axial extension 218 which projects from the first land 170 of the valve member 168 into the air chamber 214 of the valve actuator 208 and which is connected to the diaphragm member 212 of the valve actuator as shown. The vacuum chamber 216 has accommodated therein a preload spring 220 which urges the diaphragm member 212 toward the valve chamber 158 of the throttle valve 84. The vacuum drawn from the intake manifold of the engine acts on the diaphragm member 212 so that the diaphragm member 212 is moved away from the valve chamber 158 if the force of the vacuum overcomes the opposing force of the preload spring 220 so that the spool valve member 168 of the throttle valve 84 is axially moved away from the intermediate port 194 between the valve chambers 158 and 186 of the throttle valve 84 and the pressure modifier valve 86. The force thus effective to move the spool valve member 168 toward the intermediate port 194 between the valve chambers 158 and 186 is herein represented by F$v$. The force F$v$ is apparently a difference between the force of the vacuum which acts on the diaphragm member 212 and the opposing force which is exerted by the preload spring 220. If the force F$v$ of the vacuum which is drawn into the vacuum chamber 216 of the valve actuator 208 yields to the opposing force F$s$ of the preload spring 220, then the diaphragm member 212 will be moved toward the valve chamber 158 of the throttle valve 84 so that the spool valve member 168 of the throttle valve 84 is moved toward the intermediate port 194 between the aligned valve chambers 158 and 186.

With the throttle valve 84 and the cooperating pressure modifier valve 86 thus constructed and arranged, the fluid pressure in the throttle-pressure passageway 180 is developed in the first port 160 and accordingly in the first circumferential groove 176 of the spool valve member 168 of the throttle valve 84 and through the orifice 196 in the intermediate port 194 between the valve chambers 158 and 186 of the throttle valve 84 and the pressure modifier valve 86. The fluid pressure thus developed in the first circumferential groove 176 of the spool valve member 168 acts on annular end faces of the first and second lands 170 and 172 of the spool valve member 168. The forces thus exerted on the annular end faces of the first and second lands 170 and 172 of the spool valve member 168 are, however, cancelled by each other because of the fact that the first and second lands 172 and 174 have the same cross sectional areas S$_1$ as previously mentioned. The fluid pressure which is developed in the intermediate port 194 between the valve chambers 158 and 186 of the throttle valve 84 and the pressure modifier valve 86 acts on an end face of the third land 174 of the spool valve member 168 of the throttle valve 84 and on an end face of the first land 200 of the spool valve member 198 of the pressure modifier valve 86. The fluid pressure thus acting on the lands 174 and 200 of the spool valve members 168 and 198 urges the spool valve members 168 and 198 axially away from the intermediate port 194 by an equal force because of the fact that the lands 174 and 200 have the same cross sectional areas S$_2$ as previously mentioned. On the other hand, the fluid pressure which obtains in the fluid passageway 182 is directed through the orifice 184 and the port 164 into the second circumferential groove 178 in the spool valve member 168 of the throttle valve 84 and through the port 190 into the circumferential groove 204 in the spool valve member 198 of the pressure modifier valve 86. The fluid pressure directed into the second circumferential groove 178 in the spool valve member 168 of the throttle valve 84 acts on annular end faces of the second and third lands 172 and 174 of the spool valve member 168 and, because of the fact that the second land 172 is large in cross sectional area than the third land 174, urges the spool valve member 168 axially away from the intermediate port 194 between the valve chambers 158 and 186 of the throttle valve 84 and the pressure modifier valve 86. The fluid pressure directed from the fluid passageway 182 into the circumferential groove 204 in the spool valve member 198 of the pressure modifier valve 86 acts on annular end faces of the first and second lands 200 and 202 of the spool valve member 198 and thus urges the spool valve member 198 axially away from the intermediate port 196 because of the larger cross sectional area S$_3$ of the second land 202 than the cross sectional area S$_2$ of the first land 200. The force thus urging the spool valve member 198 is opposed by the force of the preload spring 206 which is constantly operative to urge the spool valve member 198 axially toward the intermediate port 194.

When, now, the spool valve member 198 of the pressure modifier valve 86 is axially so positioned by means of the preload spring 206 as to have the first land 200 located to uncover the first fluid port 188 of the pressure modifier valve 86, then the throttle pressure in the passageway 180 will be directed through the fluid port 162 into the first circumferential groove 176 in the spool valve member 168 of the throttle valve 84, through the orifice 196 into the intermediate port 194 between the valve chambers 158 and 186 of the throttle valve 84 and the pressure modifier valve 86, through the fluid port 188 into the circumferential groove 204 in the spool valve member 198 of the pressure modifier valve 86, and through the fluid port 190, the passageway 182, the orifice 184 and the fluid port 164 into the second circumferential groove 178 of the spool valve member 168 of the throttle valve 84. If the throttle pressure developed in the throttle pressure passageway 180 under these conditions is denoted by P$_{t1}$, then the spool valve member 168 of the throttle valve 84 will be held in an equilibrium position when the following relation is established:

$$(S_1 - S_2)P_{t1} + S_2 \cdot P_{t1} - F_v = 0,$$

so that $$P_{t1} = F_v/S_1. \tag{1}$$

If, thus, the value of $F_v$ is increased progressively, then the value of $P_{t1}$ will increase in direct proportion to the value of $F_v$. This means that the throttle pressure $P_{t1}$ obtaining in the passageway 180 when the first fluid port 188 of the pressure modifier valve 86 is uncovered by the first land 200 of the spool valve member 198 is increased as the force $F_v$ exerted on the spool valve member 168 of the throttle valve 84 from the vacuum-operated valve actuator 208 increases. (The increase of the force $F_v$ results from a decrease in the vacuum acting on the diaphragm member 212 of the valve actuator 208 and, in turn, the decrease in the vacuum results from an increase in the engine load.) The thus increased throttle pressure acts on the differential cross sectional areas of the first and second lands 200 and 202 of the spool valve member 198 and urges the spool valve member 198 axially away from the intermediate port 194 between the valve chambers 158 and 186 of the throttle valve 84 and the pressure modifier valve 86. The spool valve member 198 of the pressure modifier valve 86 will be held in a balanced axial position when the following relation is achieved:

$$S_2 \cdot P_{t1} + (S_3 - S_2)P_{t1} - F_2 = 0,$$

so that $$P_{t1} = F_s/S_3.$$

When the throttle pressure $P_{t1}$ is increased to a certain level, then the spool valve member 198 of the pressure modifier valve 86 will be axially moved away from the intermediate port 194 and will assume such a position as to have the first land 200 located to cover the fluid port 188 and to have the second land 202 located to be on the point of uncovering the drain port 192 as illustrated in FIG. 4. Under these conditions, the spool valve member 198 of the pressure modifier valve 86 will become balanced when the combined forces of the throttle pressure acting on the first land 200 of the valve member 198 from the intermediate port 194 and the fluid pressure acting on the differential pressure-acting areas of the first and second lands 200 and 202 of the valve member 198 are equalized with the opposing force which is exerted from the preload spring 206. It therefore follows that the pressure in the circumferential groove 204 in the spool valve member 198 decreases as the throttle pressure in the intermediate port 194 increases. If, in this instance, the fluid pressures in the passageways 180 and 182 under such conditions are denoted by $P_{t2}$ and $P_m$, respectively, the spool valve member 168 of the throttle valve 84 will be held in an equilibrium position when the following relation is established:

$$(S_1 - S_2)P_m + S_2 \cdot P_{t2} - F_v = 0,$$

so that $$P_{t2} = F_v - (S_1 - S_2) \cdot P_m/S_2. \tag{2}$$

When the force $F_v$ exerted from the valve actuator 208 is further increased, the throttle pressure $P_{t2}$ acting on the spool valve members 168 and 198 of the throttle valve 84 and the pressure modifier valve 86 is also increased and reaches a certain level at which the balanced conditions of the spool valve members 168 and 198 will be destroyed. The spool valve member 198 of the pressure modifier valve 86 is consequently further axially moved away from the intermediate port 194 against the opposing force of the preload spring 206 so that the second land 202 of the spool valve 198 of the pressure modifier valve 86 overruns the drain port 192. The fluid passageway 182 is thus brought into communication with the drain port 192 through the fluid port 190 and the circumferential groove 204 in the spool valve 198 of the pressure modifier valve 198 with the result that no fluid pressure obtains in the passageway 182. Under these conditions, the spool valve member 168 of the throttle valve 86 will be held in a balanced position when the force exerted on the spool valve member 168 by the throttle pressure in the intermediate port 194 is equalized with the opposing force $F_v$ which is imparted to the spool valve member from the vacuumoperated valve actuator 208. If the throttle pressure developed in the throttle-pressure passageway 180 under these conditions is denoted by $P_{t3}$, then the following relation will be established:

$$P_{t3} = F_v/S_2. \tag{3}$$

From comparison between Eqs. 1, 2 and 3, it will be understood that the throttle pressure increases at stepwise varying rates as the force $F_v$ from the valve actuator 208 is increased at a constant rate. More specifically, Eqs. 1, 2 and 3 show that the rate of increase of the throttle pressure $P_{t2}$ given by Eq. 2 is higher than the rate of increase of the throttle pressure $P_{t1}$ given by Eq. 1 and the rate of increase of the throttle pressure $P_{t3}$ given by Eq. 3 is lower than the rate increase of the throttle pressure $P_{t2}$ and higher than the rate of increase of the throttle pressure $P_{t1}$. This will mean that, as the vacuum in the intake manifold of the engine is increased at a constant rate, the throttle pressure increases at a relatively low rate when the manifold vacuum is higher than a certain level (so that the force $F_v$ exerted by the valve actuator 208 is smaller than a certain value) and at a relatively high rate when the manifold vacuum is at relatively low levels which is higher than a certain level. When the manifold vacuum is diminished under such a certain level so that the force $F_v$ from the valve actuator 208 increases beyond a value providing the condition represented by Eq. 3, the throttle pressure increases at a reduced rate. Such a tendency of the throttle pressure may be modified through selection of the dimensional relations of the lands constituting the spool valve members 168 and 198 and the preload springs 208 and 220.

The throttle pressure thus developed by the throttle valve 84 and the pressure modifier valve 86 is passed over to the throttle back-up valve 88 through the throttle pressure passageway 180 and to the shift valves 108, 110 and 112.

The throttle back-up valve 88 is operable to vary the throttle pressure in relation to the line pressure when the manual selector valve 82 is in the manual third-, second- or first-forward-speed-range position or the position 3, 2 or 1 so that the fourth fluid port 132 of the manual selector valve 82 leading to the fluid passageway 152 is in communication with the line-pressure passageway 122. When the manual selector valve 82 is in any of the remaining positions, viz., the parking position P, the reverse position R, the neutral position N or the normal drive position D, the throttle back-up valve 88 passes the throttle pressure without modification. The throttle back-up valve 88 comprises an elongate valve chamber 222 which has first, second, third, fourth and fifth fluid ports 224, 226, 228, 230 and 232 and a spool valve member 234 which is axially movable in the valve chamber 222. The spool valve member 234 is formed with axially spaced first and second lands 236 and 238 having equal cross sectional areas and a circumferential groove 240 which is located between the first and second lands 236 and 238. The first fluid port 224 is in communication with the fluid passageway 152 leading from the fourth fluid port 132 of the manual selector valve 82 and is so located as to have the fluid pressure in the fluid passageway 152 directed onto the axial end face of the first land 236 of the spool valve member 234 so that the line pressure acts thereupon when the first fluid port 132 of the manual selector valve 82 is in communication with the line-pressure passageway 122. The second fluid port 226 is also in communication with the fluid passageway 152 and is so located as to be covered and uncovered by the second land 238 of the spool valve member 234 depending upon the axial relative position of the valve member 234 in the valve chamber 222. The third fluid port 228 is in communication with the throttle-pressure passageway 180 and is so located as to be covered by the other axial end portion of the first land 236 of the spool valve member 234 or open to the circumferential groove 240 in the valve member 234 depending upon the axial relative position of the valve member in the valve chamber 222. The fourth and fifth fluid ports 230 and 232 are in communication with a common fluid passageway 242. The fourth fluid port 230 is located to be usually open to the circumferential groove 240 in the spool valve member 234 irrespective of the axial relative position of the spool valve member 234 in the valve chamber 222. The throttle-pressure passageway 180 is thus brought into communication with the fluid passageway 242 through the third fluid port 228, the circumferential groove 240 in the spool valve member 234 and the fourth fluid port 230 when the first land 236 of the valve member 234 is in an axial position to uncover the third fluid port 228. The fifth fluid port 232 communicates with the above mentioned fluid passageway 242 through a restriction or orifice 244 and is constantly held open. The spool valve member 234 is biased by means of a preload spring 246 toward an axial position to close the second fluid port 226 by the second land 238 thereof and to have the third fluid port 228 open to the circumferential groove 240 therein. The preload spring 246 is shown to be seated on an end face of the second land 238 of the spool valve member 234. The first and second lands 236 and 238 of the spool valve member 234 have equal cross sectional areas so that the forces applied to these lands by the fluid pressure developed in the circumferential groove 240 in the valve member 234 are cancelled by each other.

When, now, the manual selector valve 82 is in a position other than the manual third-, second- and first-forward-speed-range positions 3, 2 and 1, then the fourth, fifth and sixth fluid ports 132, 134 and 136 of the manual selector valve 82 are drained off so that no fluid pressure obtains in the fluid passageway 152 leading to the first and second fluid ports 224 and 226 of the throttle back-up valve 88. The spool valve member 234 of the throttle back-up valve 88 is consequently axially moved by the force of the preload spring 246 and a fluid pressure acting on the second land 238 of the spool valve member 234 from the fifth fluid port 232 into the position to close the second fluid port 226 by the second land 238 and to open the third fluid port 228, as illustrated in FIG. 4. The throttle pressure in the throttle-pressure passageway 180 is therefore passed through the throttle back-up valve 88 without modification by the line pressure and is thus directed to the fluid pressure passageway 242 through the third fluid port 228, the circumferential groove 240 in the spool valve member 234 and the fourth fluid port 230. When, however, the manual selector valve 82 is in the third-, second- or first-forward-speed-range position 3, 2 or 1, then the fluid passageway 152 is in communication with the line-pressure passageway 122 through the fourth and first fluid ports 132 and 126 of the manual selector valve 82 so that the line pressure is directed through the passageway 152 to the first and second fluid ports 224 and 226 of the throttle back-up valve 88. The second fluid port 226 being kept closed by means of the second land 238, the spool valve member 234 is moved from the above mentioned axial position by the line pressure acting on an end face of the first land 236 of the valve member. The third fluid port 228 is consequently covered by the first land 236 of the spool valve member 234 and at the same time the second fluid port 226 is about to be uncovered by the second land 236 of the valve member. The spool valve member 234 will therefore be brought into a balanced position when the combined forces of the preload spring 246 and the fluid pressure acting on the second land 238 of the valve member are equalized with the force resulting from the line pressure which acts on the first land 236 of the valve member from the first fluid port 224. The fluid pressure in the passageway 242, which is now disconnected from the throttle-pressure passageway 180 with the third fluid port 228 kept closed by the land 236 of the spool valve member 234, is related to the line pressure and is lower than the line pressure by a value which is equal to the force of the preload spring 246. Thus, the fluid pressure in the line-pressure passageway 122 will vary without respect to the throttle pressure during the manual third-, second- or first-forward-speed-range condition and will be varied in relation to the throttle pressure during the remaining operational conditions of the transmission. The force of the preload spring 246 is usually so selected as to be of an extremely small value so that the fluid pressure developed in the passageway 242 during the manual third-, second- and first-forward-speed-range conditions is approximately equal to the line pressure. The fluid pressure thus delivered to the passageway 242 is distributed to the control pressure regulator valve 90 and the idle valve 92.

The control pressure regulator valve 90 is adapted to regulate the line pressure and comprises an elongate valve chamber 248 which has first, second, third, fourth, fifth, sixth and seventh fluid ports 250, 252, 254, 256, 258, 260 and 262, respectively, and first and second spool valve members 264 and 266 which are axially movable in the valve chamber 248. The first spool valve member 264 is formed with axially spaced first, second, third and fourth lands 268, 270, 272 and 274, a first circumferential groove 276 located between the first and second lands 268 and 270, a second circumferential groove 278 located between the second and third lands 270 and 272, a third circumferential groove 280 located between the third and fourth lands 272 and 274, and an axial extension 282 projecting from the fourth land 274. The second, third and fourth lands 270, 272 and 274 have substantially equal cross sectional areas which are larger than the cross sectional area of the first land 268. The second spool valve member 266 is formed with axially spaced first and second lands 284 and 286, a circumferential groove 288 located between the lands 284 and 286, and an axial extension 290 which projects from the second land 286 toward the axial extension 282 of the first spool valve member 264. The first land 284 of the spool valve member 266 is smaller in cross sectional area than the second land 286. Of the first to seventh fluid ports above mentioned, the first to fifth fluid ports are located in association with the first spool valve member 264 and the sixth and seventh fluid ports are located in association with the second spool valve member 266. The first fluid port 250 is in communication with the line-pressure passageway 122 through a restriction or orifice 292 and is located to have the line pressure in the passageway 122 directed onto the axial end face of the first land 268 of the first spool valve member 264. The second fluid port 252 is located to provide constant fluid communication between the line-pressure passageway 122 and the third circumferential groove 280 in the first spool valve member 264 so that the line pressure constantly acts on the confronting annular end faces of the third and fourth lands 272 and 274 of the first spool valve member 264. The forces thus exerted on the third and fourth lands 272 and 274 of the first spool valve member 264 by the line pressure directed to the third circumferential groove 280 from the second fluid port 252 are cancelled by each other because the third and fourth lands 272 and 274 have substantially equal pressure acting areas. The third fluid port 254 is in communication through a shuttle valve 294 to the fluid passageway 150 leading from the third fluid port 130 of the manual selector valve 82 and is so located as to be open to the first circumferential groove 276 in the first spool valve member 264 or closed by the second land 70 of the valve member 264 depending upon the axial relative position of the first spool valve member 264 in the valve chamber 248. The shuttle valve 290 is adapted to pass the fluid pressure from the passageway 150 to the third fluid port 254 at all times when the line pressure is developed in the passageway 150 as will be discussed again as the description proceeds. The fourth fluid port 256 is a drain port which is in communication with the oil reservoir 120 and which is constantly open to the second circumferential groove 278 in the first spool valve member 264 irrespective of the axial relative position of the first spool valve member in the valve chamber 248. The fourth fluid port 256 may be brought into communication with the second fluid port 252 when the spool valve member 264 is axially moved so that the third land 272 thereof overruns the second fluid port 252 from the shown position. The fifth fluid port 258 is in communication with the torque converter (FIG. 3) and is so located as to be covered or uncovered by the fourth land 274 of teh first spool valve member 264. When uncovered by the fourth land 274 of the spool valve member 264, the fifth fluid port 258 is in communication with the second fluid port 252 through the third circumferential groove 280 in the valve member 264 so that the line pressure is supplied to the torque converter through the fifth fluid port 258. The first spool valve member 264 is biased by a preload spring 296 to move toward an axial position closing the fifth fluid 258, opening the third fluid port 254, and blocking the fluid communication between the second and fourth fluid ports 252 and 256 by the third land 272 of the valve member 264, as shown. Of the sixth and seventh fluid ports 260 and 262 which are associated with the second spool valve member 266, the sixth fluid port 260 is in communication with the fluid passageway 242 leading from the fifth fluid port 232 of the throttle back-up valve 88 and is so located as to have the fluid pressure in the fluid passageway 242 directed onto the axial end face of the first land 284 of the second spool valve member 266, which is consequently is urged toward the first spool valve member 264. The seventh port 262 is in constant communication with the fluid passageway 150 leading from the third fluid port 130 of the manual selector valve 82 and is so located as to be covered or uncovered by the second land 286 of the second spool valve member 266 as the spool valve member 266 is axially moved in the valve chamber 248.

When the manual selector valve 82 is in any of the normal drive range position D or any one of the manual third-, second- and first-forward-speed-range positions 3, 2 and 1, the line pressure is developed in the third fluid port 130 of the manual selector valve 82. The line pressure is thus directed through the passageway 150 to the seventh fluid port 262 of the pressure regulator valve 90. The line pressure acts on the differential pressure-acting areas of the first and second lands 284 and 286 of the second spool valve member 266 and, combined with the fluid pressure acting on the end face of the first land 284 from the sixth fluid port 260 leading from the throttle back-up valve 88 through the passageway 242, causes the second spool valve member 266 to move toward the first spool valve member 264 until the axial extension 290 of the second spool valve member 266 is brought into abutting engagement with the axial extension 282 of the first spool valve member 264. When, on the other hand, the manual selector valve 82 is in any one of the positions other than the positions D, 3, 2 and 1, the third fluid port 130 of the selector valve 82 is drained off so that no fluid pressure is developed in the fluid passageway 150 (in which conditions the shuttle valve 290 is in a condition blocking the fluid communication between the passageway 150 and the third fluid port 254 as will be discussed later). Under these conditions, the fluid pressure directed to the sixth fluid port 260 from the passageway 242 acts on the end face of the first land 284 of the second spool valve member 266, which is consequently axially moved toward the first spool valve member 264 until the axial extension 290 of the second spool valve member 266 is brought into abutting engagement with the axial extension 282 of the first spool valve member 264. In whichsoever position the manual selector valve 82 may be held, the second spool valve member 266 of the pressure regulator valve 90 is thus in engagement with the first spool valve member 264 and, as a consequence, the first and second spool valve members 264 and 266 are axially movable as a unit in the valve chamber 248. The first and second spool valve members 264 and 266 will therefore be held in balanced positions when the combined forces resulting from the line pressure acting on the end face of the first land 268 of the first spool valve member 264 from the first fluid port 250 and the fluid pressure which may act on the differential working faces of the first and second lands 268 and 270 of the first spool valve member 264 from the third fluid port 254 are equalized with the combined forces resulting from the fluid pressure acting on the end face of the first land 284 of the second spool valve member 266 from the sixth fluid port 260, the line pressure which may act on the differential working faces of the first and second lands 284 and 286 of the second spool valve member 266 from the seventh fluid port 262 and the force of the preload spring 296. When the manual selector valve 82 is in any of the manual third-, second- and first-forward-speed-range positions 3, 2 and 1, the fluid pressure directed from the throttle back-up valve 88 to the sixth fluid port 260 through the passageway 242 is substantially equal to the line pressure as previously mentioned. During any of these conditions, therefore, the regulator valve 90 is operative to regulate the line pressure without respect to the vacuum in the intake manifold of the engine. When, however, the manual selector valve 82 is in any of the positions other than the manual third-, second- and first-forward-speed-range positions 3, 2 and 1, the throttle pressure delivered from the throttle valve 84 and the pressure modifier valve 86 is directed through the throttle back-up valve 88 to the sixth fluid port 260 of the regulator valve 90, which is therefore operative to regulate the line pressure in relation to the throttle pressure or, in other words, to the vacuum developed in the intake manifold of the engine. During any of the normal drive range condition or any one of the manual third-, second- and first-forward-speed-range conditions of the transmission, furthermore, the fluid pressure to act on the differential pressure-acting areas of the first and second lands 268 and 270 of the first spool valve member 264 is the line pressure which is directed from the passageway 150 to the third fluid port 254 through the shuttle valve 294. When the manual selector valve 82 is in any of the positions other than the above mentioned positions, viz., in the parking position P, the reverse position R or the neutral position N, the fluid passageway 150 is drained off so that no fluid pressure is developed in the passageway 150 as previously mentioned. If, under these condition, the engine is in an idling condition, another fluid pressure, herein called a hysteresis pressure as will be discussed later, is directed through the shuttle valve 294 to the third fluid port of the pressure regulator valve 90. For this purpose, the shuttle valve 294 is in communication with the previously mentioned idle valve 96 through a fluid passageway 298. The idle valve 96 operates on the hysteresis pressure which is supplied thereto from the hysteresis valve 92 through the solenoid-operated control valve 94.

The hysteresis valve 92 comprises an elongate valve chamber 300 which has first, second, third, fourth and fifth fluid ports 302, 304, 306, 308 and 310 and a spool valve member 312 which is axially movable in the valve chamber 300. The spool valve member 312 is formed with axially spaced first and second lands 314 and 316 and a circumferential groove 318 which is located between the lands 314 and 316. The first fluid port 302 is in communication with the line-pressure passageway 122 and is so located as to be covered by the first land 314 of the spool valve member 312 or open to the circumferential groove 318 in the valve member 312 depending upon the axial relative position of the valve member. The second fluid port 304 is in communication with a fluid passageway 320 leading to the solenoid-operated control valve 94 and is so located as to be constantly open to the circumferential groove 318 in the spool valve member 312. When the first fluid port 302 is uncovered by the first land 314 of the spool valve member 312, then the line pressure in the first fluid port 302 is thus directed to the passageway 320 through the second fluid port 304. The second fluid port 304 is further in communication through a restriction or orifice 322 with the third fluid port 306, into which does project an axial end portion of the first land 314 of the spool valve member 312. The fourth fluid port 308 is a drain port which is so located as to be covered or uncovered by the second land 316 of the spool valve member 312 as the spool valve member is axially moved in the valve chamber 300. When the spool valve member 312 is moved to have its second land 316 located to open the fourth fluid port 308, the first fluid port 302 is covered by the first land 314 and at the same time the second fluid port 304 and accordingly the third fluid port 306 are brought into communication with the drain port 308. The fifth fluid port 310 is constantly drained off. The spool valve member 312 is biased by a preload spring 324 toward an axial position opening the first and second fluid ports 302 and 304 and concurrently closing the fourth fluid port 308 by the second land 316, as illustrated. The spool valve member 312 will thus be held in a balanced position when the fluid pressure acting on the axial end face of the first land 314 of the valve member 312 from the third fluid port 306 is equalized with the opposing force of the preload spring 324. Under this balanced condition of the spool valve member 312, the first fluid port 302 is on the point of being closed by the first land 314 and the fourth or drain port 308 is on the point of being open to the circumferential groove 318 in the spool valve member 312. In the second fluid port 304 is thus developed a substantially constant fluid pressure which is determined by the force of the preload spring 324. The fluid pressure thus developed is the hysteresis pressure previously mentioned. The hysteresis pressure is fed to the solenoid-operated control valve 94 en route the fluid passageway 320.

The solenoid-operated control valve 94 comprises an elongate valve chamber 326 which has first, second, third, fourth and fifth fluid ports 328, 330, 332, 334 and 336, respectively, and a spool valve member 338 which is axially movable in the valve chamber 326. The spool valve member 338 is formed with axially spaced first and second lands 340 and 342 and a circumferential groove 344 which is located between the lands 340 and 342. The first fluid port 328 is in communication through a restriction or orifice 346 with the fluid passageway 320 leading from the second fluid port 304 of the hysteresis valve 92 and is so located as to have the fluid pressure directed from the passageway 320 onto the axial end face of the first land 340 of the spool valve member 338, which is therefore urged to axially move away from the fluid port 328. The second fluid port 330 is in communication with the fluid passageway 320 and accordingly through the restriction 346 with the first fluid port 328 and is so located as to be covered by the first land 340 of the spool valve member 338 or open to the circumferential groove 344 in the valve member 338 depending upon the axial relative position of the valve member in the valve chamber 326. The third fluid port 332 is in communication on one hand with a fluid passageway 348 leading to the idle valve 96 and on the other hand with a fluid passageway 350 leading to the kick-down valve 98. The third fluid port 332 is located to be constantly open to the circumferential groove 344 in the spool valve member 338 irrespective of the axial relative position of the valve member 338 in the valve chamber 326. The fourth fluid port 334 is a drain port which is in communication with the previously mentioned oil reservoir 120 and is so located as to be covered by the second land 342 of the spool valve member 338 or open to the circumferential groove 344 in the valve member 338 as the valve member 338 is axially moved in the valve chamber 326. The fifth fluid port 336 is constantly drained off. The spool valve member 338 is biased by a preload spring 252 toward an axial position to have the first land 340 located to uncover the second fluid port 330 and to have the second land 342 located to cover the fourth or drain port 334, as shown. The first and second lands 340 and 342 have substantially equal cross sectional areas so that the forces exerted on the opposite pressure-acting faces of the lands 340 and 342 by the fluid pressure developed in the circumferential groove 344 between the lands will be cancelled by each other. At an axial end of the valve chamber 326 adjacent the axial end face of the first land 340 of the spool valve member 338 is formed an orifice 354 which is in communication at one end with the first fluid port 328 and at the other end with the previously mentioned oil reservoir 120. A solenoid-operated valve actuator 356 has a plunger 358 which projects into the orifice 354. The solenoid-operated valve actuator 356 is electrically connected to a power source (not shown) over a switch 360 which is responsive to the movement of an accelerator pedal (not shown) of the vehicle. The switch 360 is herein assumed to be closed when the accelerator pedal is either released or depressed all the way down, viz., in response to idling or kick-down conditions of the engine. When the switch 360 is open and accordingly the solenoid-operated valve actuator 356 remains de-energized, the plunger 358 is held in a position projecting into the orifice 354. The orifice 354 is consequently closed by the plunger 358 so that a fluid pressure (which is the hysteresis pressure directed from the second fluid port 304 of the hysteresis valve 92 through the fluid passageway 320) is developed in the first fluid port 328. The spool valve member 338 is thus axially moved away from the first fluid port 328 toward a position to close the second fluid port 330 by the second land 340 of the valve member 338 and to provide communication between the third and fourth fluid ports 332 and 334 through the circumferential groove 344 in the valve member 338. Under these conditions, the fluid passageway 320 leading from the second fluid port 304 is isolated from the passageways 348 and 350 and the passageways 348 and 350 are drained off through the fourth fluid port 334. When, however, the switch 360 is closed responsive to the idling or kick-down conditions of the engine, the solenoid-operated valve actuator 356 is energized so that the plunger 358 of the valve actuator 356 is withdrawn from the position closing the orifice 354. The first fluid port 328 is consequently drained off through the orifice 354 until the spool valve member 338 is axially moved by the force of the preload spring 352 to a position closing the orifice at the axial end face of the first land 340 of the spool valve member 338 as shown. Under these conditions, fluid communication is established between the second and third fluid ports 330 and 332 through the circumferential groove 344 in the spool valve member 338 and at the time the fourth fluid port 334 is closed by the second land 342 of the spool valve member 338. The hysteresis pressure in the passageway 320 leading from the second fluid port 304 of the hysteresis valve 92 is therefore passed over to the fluid passageways 348 and 350 through the second and third fluid ports 330 and 332 of the solenoid-operated control valve 94. The hysteresis pressure developed by the hysteresis valve 92 is in this manner delivered to the idle valve 96 through the fluid passageway 348 and to the kick-down valve 98 through the passageway 350.

The idle valve 96 comprises an elongate valve chamber 362 which has first, second, third, fourth and fifth fluid ports 364, 366, 368, 370 and 372, respectively, and a spool valve member 374 which is axially movable in the valve chamber 362. The spool valve member 374 is formed with axially spaced first and second lands 376 and 378 having substantially equal cross sectional areas and a circumferential groove 380 which is located between the first and second lands 376 and 378. The first fluid port 364 is in communication with the fluid passageway 242 leading from the fifth fluid port 232 of the previously described throttle back-up valve 88 and is so located as to have the fluid pressure directed from the passageway 242 onto the axial end face of the first land 376 of the spool valve member 374 for urging the spool valve member 374 axially away from the first fluid port 364. The second fluid port 366 is in communication with the fluid passageway 348 leading from the third fluid port 332 of the solenoid-operated control valve 94 and is so located as to be covered by the first land 376 of the spool valve member 374 or open to the circumferential groove 380 in the spool valve member 374 depending the axial relative position of the valve member 374 in the valve chamber 362. The third fluid port 368 is in communication on one side with the previously mentioned fluid passageway 298 leading through the shuttle valve 294 to the third fluid port 254 of the pressure regulator valve 90 and on the other side with a fluid passageway 382 which leads to the downshift valve 106 to be described later. The third fluid port 368 is so located as to be constantly open to the circumferential groove 380 in the spool valve member 374 irrespective of the axial relative position of the spool valve member 374 in the valve chamber 262. The fourth fluid port 370 is a drain port which leads to the oil reservoir 120 and which is so located as to be covered by the second land 378 of the spool valve member 374 when the spool valve member 374 is axially moved in the valve chamber 362 away from the shown position. The fifth fluid port 372 is also a drain port which is constantly in communication with the oil reservoir 120. The spool valve member 374 is biased by means of a preload spring 384 toward an axial position in which the first land 376 of the valve member is located to uncover the second fluid port 366 and concurrently the second land 378 of the valve member is located to cover the fourth fluid port 370, as illustrated.

When, as previously discussed, the accelerator pedal is released and as a consequence the valve actuator 356 of the solenoid-operated control valve 94 is energized, the spool valve member 338 of the control valve 94 is axially moved to a position providing communication between the fluid passageways 320 and 348 through the second and third fluid ports 330 and 332 of the valve 94. The hysteresis pressure delivered from the second fluid port 304 of the hysteresis valve 92 is thus directed to the second fluid port 366 and acts on the opposite end faces of the first and second lands 376 and 378 of the spool valve member 374. The forces thus exerted on the first and second lands 376 and 378 are, however, cancelled by each other because the lands have substantially equal cross sectional areas so that the spool valve member 374 will be axially balanced when the force resulting from the throttle pressure acting on the axial end face of the first land 376 of the spool valve member 374 from the first fluid port 364 is equalized with the opposing force of the preload spring 384. Under the idling condition in which the accelerator pedal is released, however, the throttle pressure delivered from the throttle valve 86 is maintained at a relatively low level so that the force resulting from the fluid pressure acting on the first land 376 of the spool valve member 374 from the first fluid port 364 will be overcome by the force of the preload spring 384. The spool valve member 374 is therefore axially moved to the shown position in which communication is established between the second and third fluid ports 366 and 368 through the circumferential groove 380 in the spool valve member 374 and at the same time the fourth fluid port 370 is covered by the second land 378 of the spool valve member 374. The hysteresis pressure passed over to the second fluid port 366 of the idle valve 96 from the hysteresis valve 92 through the solenoid-operated control valve 338 is in this manner directed on one hand to the third fluid port 254 of the pressure regulator valve 90 through the fluid passageway 298 and the shuttle valve 294 and on the other hand to the downshift valve 106 through the fluid passageway 382.

The hysteresis pressure is passed from the solenoid-operated control valve 94 not only to the idle valve 96 through the fluid pressure passageway 348 but to the kick-down valve 98 through the fluid passageway 350 which leads from the third fluid port 332 of the control valve 94. The kick-down valve 98 comprises an elongate valve chamber 386 which has first, second, third, fourth and fifth fluid ports 388, 390, 392, 394 and 396, respectively, and a spool valve member 398 which is axially movable in the valve chamber 386. The spool valve member 398 is formed with axially spaced first and second lands 400 and 402 which have substantially equal cross sectional areas and a circumferential groove 404 which is located between the first and second lands 400 and 402. The first fluid port 388 is in communication through the fluid passageway 156 with the fifth fluid port 136 of the manual selector valve 82 and is so located as to have the line pressure in the fluid passageway 156 directed onto the fluid acting area of the first land 400 of the spool valve member 398 which is accordingly axially urged away from the first fluid port 388 when the line pressure is directed to the first fluid port 136 from the sixth fluid port 136 of the manual selector valve. The second fluid port 390 of the kick-down valve 98 is in communication with the third fluid port 332 of the solenoid-operated control valve 94 through the fluid passageway 350 so that, when the second fluid port 330 of the control valve 94 is open, the hysteresis pressure developed by the hysteresis valve 92 is directed to the second fluid port 390 of the kick-down valve 98. The second fluid port 390 of the kick-down valve 98 is so located as to be covered by the first land 400 of the spool valve member 398 or open to the circumferential groove 404 in the valve member 398 depending upon the axial relative position of the valve member 398 in the valve chamber 386. The third fluid port 392 is in communication with a fluid passageway 406 which leads to the downshift valve 106 and the second-third and third-fourth speed shift valves 110 and 112 to be described later. The third fluid port 392 is so located as to be constantly open to the circumferential groove 404 in the spool valve member 398 irrespective of the axial relative position of the spool valve member 398 in the valve chamber 386. The fourth fluid port 394 is a drain port which is in communication with the oil reservoir 120 and which is so located as to be covered by the second land 402 of the spool valve member 398 or open to the circumferential groove 404 in the spool valve member 398 depending upon the axial relative position of the spool valve member 398. The fifth fluid port 396 is in communication with the previously mentioned throttle-pressure passageway 180 which leads from the second fluid port 162 of the throttle valve 84. The fifth fluid port 396 of the kick-down valve 98 is so located as to have the throttle pressure in the passageway 180 directed onto the axial end face of the second land 402 of the spool valve member 398 so that the spool valve member is axially urged away from the fifth fluid port 396. The spool valve member 398 is biased by means of a preload spring 408 to axially move toward the fifth fluid port 396. Since the first and second lands 400 and 402 of the spool valve member 398 have substantially equal cross sectional areas as previously mentioned, the forces exerted on the opposite annular end faces of the lands 400 and 402 by the fluid pressure developed in the circumferential groove 404 between the lands 400 and 402 are cancelled by each other so that the movement of the valve member is not influenced by the fluid pressure between the lands 400 and 402. The spool valve member will, thus, be held in an equilibrium position when the combined forces resulting from the fluid pressure acting on the axial end face of the first land 400 from the first fluid port 388 and the force of the preload spring 386 are equalized with the force which results from the fluid pressure acting on the axial end face of the second land 402. If, under such a balanced condition, the spool valve member 398 is axially positioned to have the first land 400 located to cover the second fluid port 350 and the second land 402 located to uncover the fourth fluid port 394, fluid communication is established between the third and fourth fluid ports 390 and 392 through the circumferential groove 404 in the spool valve member 398 so that the fluid in the passageway 406 is drained off with the second fluid port 390 kept closed. If, however, the spool valve member 398 is held in a balanced axial position in which the first land 400 thereof is located to uncover the second fluid port 390 and the second land 402 located to cover the fourth fluid port 394, then fluid communication will be established between the second and third fluid ports 390 and 392 through the circumferential groove 404 in the spool valve member 398 so that the hysteresis pressure directed to the second fluid port 390 of the kick-down valve 98 from the fluid passageway 350 is passed over to the fluid passageway 406 through the second and third fluid ports 390 and 392 of the kick-down valve 98. From the above description it will be understood that the kick-down valve 98 is adapted to pass the hysteresis pressure therethrough only when the kick-down condition is brought about in the engine. The hysteresis pressure thus passed through the kick-down valve 98 to the fluid passageway 406 is directed to the downshift valve 102 and the second-third and third-fourth speed shift valves 110 and 112 operates on a fluid pressure delivered from the governor valve unit 100.

The governor valve unit 100 is mounted on the output shaft 40 of the transmission mechanism as schematically indicated at 78 in FIG. 3 and is thus rotatable with the transmission output shaft 40. The governor valve unit 100 is thus adapted to produce from the line pressure a fluid pressure to vary with the revolution speed of the transmission output shaft 24 for varying the gear ratio shift point in the transmission mechanism in relation to the transmission output shaft speed in cooperation with the previously described throttle valve 82, as is customary in the art. The governor valve unit 100 consists of primary and secondary governor valves 102 and 104, respectively, which are enclosed within a governor housing 410 secured to the transmission output shaft 40. As will be understood from the description to follow, the secondary governor valve 102 is operative to develop a fluid pressure varying with the revolution speed of the transmission output shaft 40, whereas the primary governor valve 104 is operative to deliver the thus produced fluid pressure when the transmission output shaft speed is higher than a predetermined level. The fluid pressure thus delivered from the governor valve unit 100 will be herein called a governor pressure.

The primary governor valve 102 comprises an elongate valve chamber 412 which is formed in the governor casing 410 and which has first, second and third fluid ports 414, 416 and 418. In the valve chamber 412 is axially movable a spool valve member 420 which is formed with axially spaced first and second lands 422 and 424 which have substantially equal cross sectional areas and a circumferential groove 426 which is located between the first and second lands 422 and 424. The first fluid port 414 is in communication with a fluid passageway 428 leading to the secondary governor valve 104 and is so located as to be constantly open to the circumferential groove 426 in the spool valve member 420 irrespective of the axial relative position of the spool valve member 420 in the valve chamber 412. The second fluid port 416 is in communication with a fluid passageway 430 leading to the downshift valve 102 and is so located as to communicate with either the circumferential groove 426 in the spool valve member 420 or the third fluid port 418 depending upon the axial relative position of the second land 424 of the valve member 420 in the valve chamber 412, the spool valve member 420 being shown to be in a position to provide the latter condition. The third fluid port 418 is a drain port which is constantly in communication with the previously mentioned oil reservoir 120. The primary governor valve 102 further comprises a preload spring 432 which is adapted to bias the spool valve member 420 to move toward an axial position in which the second fluid port 416 is in communication with the third or drain port 418 and is isolated from the circumferential groove 426 in the spool valve member 420 by the second land 424 of the valve member 420, as shown. The forces which will be exerted on the first and second lands 422 and 424 of the spool valve member 420 when a fluid pressure is directed through the first fluid port 414 into the circumferential groove 426 between the lands 422 and 424 are cancelled by each other because of the equal fluid working areas of the lands. When, thus, the primary governor valve 102 is rotated with the transmission output shaft 40, the spool valve member 420 will be urged radially outwardly from the transmission output shaft 40 or, in other words, axially toward the third fluid port 418 due to a centrifugal force developed therein and will therefore be held in a balanced position when the centrifugal force exerted on the spool valve member 420 is equalized with the opposing force of the preload spring 432. The weight of the spool valve member 420 and the spring constant of the preload spring 432 may be selected in such a manner that the spool valve member 420 is moved to have its first and second lands 422 and 424 concurrently located to provide communication between the first and second fluid ports 414 and 416 through the circumferential groove 426 in the spool valve member 420 when the revolution speed of the transmission output shaft 40 is higher than a predetermined level of, for example, 500 r.p.m.

On the other hand, the secondary governor valve 104 comprises an elongate valve chamber 434 which is formed in the previously mentioned governor casing 410 and which has first, second and third ports 436, 438 and 440, respectively. In the valve chamber 434 is axially movable a spool valve member 442 which is formed with axially spaced first and second lands 444 and 446 and a circumferential groove 448 which is located between these lands 444 and 446, the first lead 444 being smaller in cross sectional area than the second land 446. The first fluid port 436 is in communication with the line-pressure passageway 122 and is so located as to provide communication between the line-pressure passageway 122 and the circumferential groove 448 in the spool valve member 442 so that the line pressure acts on differential pressure acting-areas of the first and second lands 444 and 446 and thus urges the spool valve member 442 toward an axial position to close the first fluid port 436 by the first land 444 of the valve member 442. The second fluid port 438 is in communication with the fluid passageway 428 leading from the first fluid port 414 of the primary governor valve 102. The second fluid port 438 of the secondary governor valve 102 is so located as to be covered by the second land 446 of the spool valve member 442 or open to the circumferential groove 448 in the spool valve member 442 depending upon the axial relative position of the valve member 442 in the valve chamber 434. The third fluid port 440 is a drain port which is in communication with the previously mentioned oil reservoir 120 and is so located as to be normally closed by means of the second land 446 of the spool valve member 442. The spool valve member 442 is biased by a preload spring 450 to axially move toward a position having the first land 444 located to uncover the first fluid port 436 and the second land 446 located to cover the second land 446.

When the transmission output shaft 40 is driven from the engine through the clutches and planetary gear train previously described, the primary and secondary governors 102 and 104 are rotated with the shaft 40 so that centrifugal forces proportional to the revolution speed of the shaft 40 are produced in the spool valve members 420 and 442 of the valves. The spool valve member 442 of the secondary governor valve 104 will therefore be urged to axially move in the valve chamber 434 away from the shaft 40 and will be held in an equilibrium position when the force resulting from the line pressure acting on the differential pressure-acting areas of the first and second lands 444 and 446 of the spool valve member 442 from the first fluid port 436 is equalized with the sum of the centrifugal force produced in the spool valve member 442 and the force of the preload spring 450. The fluid pressure in the second fluid port 438 of the secondary governor valve 104 is thus increased as the revolution speed of the transmission output shaft 40 and accordingly the centrifugal force in the spool valve member 442 are increased. The secondary governor valve 104 thus produces from the line pressure a fluid pressure which varies with the transmission output shaft speed, the fluid pressure being the governor pressure previously mentioned. The governor pressure is passed through the fluid passageway 428 to the first fluid port 414 of the primary governor valve 102 which is also being rotated with the transmission output shaft 40. The governor pressure is thus directed into the circumferential groove 426 in the spool valve member 420 and acts on the annular end faces of the first and second lands 422 and 424 of the spool valve member 420. Since, in this instance, the first and second lands 422 and 424 have the same cross sectional areas as previously mentioned, no driving effort will be imparted to the spool valve member 420 from the governor pressure in the circumferential groove 426. The spool valve member 420 is thus subjected only to the force of the preload spring 432 and the centrifugal force produced in the valve member 420. When the revolution speed of the transmission output shaft 40 is lower than a predetermined level of, for example, 500 r.p.m. as previously mentioned, the centrifugal force produced in the spool valve member 420 is overcome by the force of the preload spring 432 so that the spool valve member 420 is maintained in an axial position having its second land 424 located to isolate the second fluid port 416 from the circumferential groove 426 in the valve member 420 and allow the fluid port 416 to communicate with the fluid port 418. The governor pressure is consequently entrapped in the circumferential groove 426 of the spool valve member 420 and at the same time the fluid in the second fluid port 416 is drained off through the third fluid port 418. No fluid pressure will therefore be developed in the fluid passageway 430 when the transmission output shaft speed is lower than the predetermined level. When, however, the transmission output shaft speed is increased beyond the predetermined level, then the spool valve member 420 will be axially moved away from the transmission output shaft 40 under the influence of an increased centrifugal force produced in the valve member 420 and will be held in an equilibrium position when the centrifugal force in the spool valve member 420 is equalized with the opposing force of the preload spring 432. With the spool valve member 420 held in the equilibrium position, the second fluid port 416 is isolated from the third fluid port 418 by means of the second land 424 of the spool valve member 420 and is brought into communication with the circumferential groove 426 in the spool valve member 420, providing communication between the fluid passages 428 and 430 through the first and second fluid ports 414 and 416. The governor pressure developed by the secondary governor valve 104 is in this manner passed over to the fluid passageway 430 through the primary governor valve 102. The primary governor valve 102 is thus adapted to pass therethrough the governor pressure when the transmission output shaft 40 is being rotated at a speed which is higher than a prescribed level. The governor pressure delivered to the fluid passageway 430 is directed to the downshift valve 106.

The downshift valve 106 comprises an elongate valve chamber 452 which has first, second, third, fourth and fifth fluid ports 454, 456, 458, 460 and 462 and a spool valve member 464 which is axially movable in the valve chamber 452. The spool valve member 464 is formed with axially spaced first and second lands 466 and 468 and a circumferential groove 470 which is located between the first and second lands 466 and 468, the first land 466 being smaller in cross sectional area than the second land 468. The first fluid port 454 is in communication with the fluid passageway 406 leading from the fourth fluid port 392 of the kick-down valve 98 and is so located as to have the fluid pressure in the passageway 406 directed onto the axial end face of the first land 466 of the spool valve member 464 when a fluid pressure obtains in the fluid passageway 406. When the third fluid port 392 of the kick-down valve 98 is uncovered by the first land 400 of the spool valve member 398, the fluid passageway 406 is in communication with the fourth or drain port 394 of the kick-down valve 98 so that the fluid in the first port 454 of the downshift valve 106 is drained off. The second fluid port 456 of the downshift valve 106 is in communication with the line-pressure passageway 122 and is so located as to be covered by the first land 466 of the spool valve member 464 or open to the circumferential groove 470 in the spool valve member 464 depending upon the axial relative position of the valve member 464 in the valve chamber 452. The third fluid port 458 is so located as to be constantly open to the circumferential groove 470 in the spool valve member 464 irrespective of the axial relative position of the valve member 464 in the valve chamber 452 and is in communication through a shuttle valve 474 with a fluid passageway 476 which leads to the first-second, second-third and third-fourth speed shift valves 108, 110 and 112. The previously mentioned fluid passageway 382 leading from the third fluid port 368 of the idle valve 96 is also in communication through the shuttle valve 494 with the fluid passageway 476. The hysteresis pressure developed by the hysteresis valve 92 is set to be at all times higher than the fluid pressure to be developed in the fluid passageway 472. When, thus, the hysteresis pressure is directed to the fluid passageway 382 through the solenoid-operated control valve 94 and the idle valve 96, the shuttle valve 474 will pass the hysteresis pressure to the fluid passageway 476 and block the fluid communication between the passageways 472 and 476 as will be described later. The fourth fluid port 460 of the downshift valve 106 communicates with the fluid passageway 430 leading from the second fluid port 416 of the primary governor valve 102 and is so located as to be closed by the second land 468 of the spool valve member 464 or open to the circumferential groove 470 in the valve member 464 depending upon the axial relative position of the valve member in the valve chamber 452. The fifth fluid port 462 is in communication through a restriction or orifice 478 with the fourth fluid port 460 and accordingly with the fluid passageway 430 and is so located as to have the governor pressure in the passageway 430 directed onto the axial end face of the land 468 of the spool valve member 464.

During kick-down condition in which the spool valve member of the kick-down valve 98 is in an axial position closing the fourth drain port 394, the hysteresis pressure in the passageway 350 is passed through the kick-down valve 98 and the passageway 406 to the first fluid port 454 of the downshift valve 106 and acts on the axial end face of the first land 466 of the spool valve member 464. The spool valve member 464 of the downshift valve 106 is consequently moved to an axial position to provide communication between the third and fourth fluid ports 458 and 460 through the circumferential groove 470 of the spool valve member 464 by the combined forces resulting from the hysteresis pressure acting on the axial end face of the first land 464 and the fluid pressure acting on the differential pressure-acting areas of the first and seecond lands 466 and 468 from the third port 458 and the force of the preload spring 480. The governor pressure which has been directed to the fourth fluid port 460 of the downshift valve 106 is therefore passed over to the fluid passageway 472. When, however, the spool valve member 398 of the kick-down valve 98 is in an axial position providing communication between the third and fourth fluid ports 392 and 394, the fluid in the passageway 406 is drained off through the fourth or drain port 394 of the kick-down valve 98 so that no fluid pressure is developed in the first fluid port 454 of the downshift valve 106. Under these conditions, the spool valve member 464 of the downshift valve 106 will be held in an equilibrium position when the sum of the force of the preload spring 480 and the force resulting from the fluid pressure acting on the differential pressure working faces of the first and second lands 466 and 468 of the spool valve member 464 is equalized with the force resulting from the governor pressure acting on the end face of the second land 468 of the spool valve member 464. In the third fluid port 458 of the downshift valve 106 is thus developed a fluid pressure which is related to and higher than the governor pressure. The fluid pressure which is thus delivered from the third fluid port 458 of the downshift valve 106 will be herein called a booster governor pressure and, in this context, the governor pressure delivered from the governor valve unit 100 may be called a "basic" governor pressure. The fluid pressure passed from the passageway 430 to the passageway 472 during the kick-down condition is, thus, the basic governor pressure. Either the basic governor pressure or the boosted governor pressure delivered to the fluid passageway 472 is directed through the fluid passageway 476 to the first-second, second-third and third-fourth speed shift valves 108, 110 and 112, respectively.

The first-second speed shift valve 108 comprises axially aligned first and second elongate valve chambers 480 and 482 which conjoin each other through a drain port 484. The first valve chamber 480 has first, second, third, fourth, fifth, sixth and seventh fluid ports 486, 488, 490, 492, 494, 496 and 498, respectively, and the second valve chamber 482 has a fluid port 500 which is located opposite to the drain port 484. In the first and second valve chambers 480 and 482 are axially movable first and second spool valve members 502 and 504, respectively. The first spool valve member 502 is formed with axially spaced first, second, third and fourth lands 506, 508, 510 and 512, a first circumferential groove 514 located between the first and second lands 506 and 508, a second circumferential groove 516 located between the second and third lands 508 and 510, and a third circumferential groove 518 located between the third and fourth lands 510 and 512. The second and third lands 508 and 510 have substantially equal cross sectional areas which are appreciably smaller than the cross sectional area of the first land 506 and appreciably larger than the cross sectional area of the fourth land 512 so that the fluid pressure directed into the first circumferential groove 514 acts on the differential pressure-acting areas of the first and second lands 506 and 508 while the fluid pressure directed into the third circumferential groove 518 acts on the differential pressure-acting areas of the third and fourth lands 510 and 512 of the spool valve member 502. The second spool valve member 500 is formed with a land 520. The first fluid port 486 of the first valve chamber 480 is in communication with the fluid passageway 476 leading from the third fluid port 458 of the downshift valve 106 through the passageway 472 and is so located as to have the fluid pressure in the passageway 476 directed onto the axial end face of the first land 506 of the spool valve member 502. The second fluid port 488 is in communication with the fluid passageway 156 leading from the sixth fluid port 136 of the manual selector valve 82 and is so located as to be covered by the first land 506 of the spool valve member 502 or open to the first circumferential groove 514 depending upon the axial relative position of the spool valve member 502 in the valve chamber 480. The third fluid port 490 is in communication with a fluid passageway 522 which in turn communicates through the previously mentioned shuttle valve 157 to the apply servo mechanism of the low-and-reverse brake 28. The fluid port 490 is so located as to be constantly open to the first circumferential groove 514 in the spool valve member 502 irrespective of the axial relative position of the valve member 502 in the valve chamber 480. The fourth fluid port 492 is a drain port which is in communication with the previously mentioned oil reservoir 120 and which is so located as to be covered by the second land 508 of the spool valve member 502 or open to the second circumferential groove 516 in the spool valve member 502 depending upon the axial relative position of the spool valve member 502 in the valve chamber 480. The fifth fluid port 494 is in communication with a fluid passageway 524 and is so located as to be constantly open to the second circumferential groove 516 in the spool valve member 502 irrespective of the axial relative position of the spool valve member 502 in the valve chamber 480. The fluid passageway 524 leading from the fifth fluid port 494 is in communication with the apply servo of the second-driving brake 32. The sixth fluid 496 is in communication with the previously mentioned fluid passageway 150 leading from the third fluid port 130 of the manual selector valve 82 and is so located as to be closed by the third land 510 of the spool valve member 502 or open to the second circumferential groove 516 in the spool valve member 502 depending upon the axial relative position of the spool valve member 502 in the valve chamber 480. The seventh fluid port 498 is in communication with the previously mentioned throttle-pressure passageway 180 leading from the throttle valve 84 and is so located as to be covered by the fourth land 512 of the spool valve member 502 or open to the third circumferential groove 518 in the spool valve member 502 depending upon the axial relative position of the spool valve member 502 in the valve chamber 480. The fluid passageway 180 also communicates with the fluid port 500 of the second valve chamber 482. A preload spring 526 is seated between the first and second spool valve members 502 and 504 so that the valve members 502 and 504 are axially urged away from each other. The throttle pressure delivered from the throttle valve 84 to the fluid passageway 180 is thus directed to the seventh fluid port 498 of the first valve chamber 480 and the fluid port 500 of the second valve chamber 482. The first spool valve member 502 is therefore axially urged away from the drain port 484 by the combined forces resulting from the throttle pressure acting on the differential pressure-acting areas of the third and fourth lands 510 and 512 of the first spool valve member 502 from the seventh fluid port 498 of the first valve chamber 480 and on the land 520 of the second spool valve member 504 from the fluid port 500 of the second valve chamber 482. Under these conditions, the first spool valve member 502 is urged in an opposite direction, viz., away from the first fluid port 486 of the chamber 480 by the fluid pressure acting on the axial end face of the first land 506 of the spool valve member 502 from the port 486. If the revolution speed of the transmission output shaft 40 and accordingly the boosted governor pressure developed in the third fluid port 458 of the downshift valve 106 are lower than certain levels, then the force resulting from the boosted governor pressure acting on the first land 506 of the spool valve member 502 of the first-second speed shift valve 108 is overcome by the combined forces resulting from the throttle pressure acting on the differential pressure-acting areas of the third and fourth lands 510 and 512 of the first spool valve member 502 and the pressure-acting area of the land 520 of the second spool valve member 504 so that the first spool valve member 502 is moved to an axial position providing communication between the second and third fluid ports 488 and 490 and between the fourth and fifth fluid ports 492 and 494 and closing the sixth fluid port 496 by the third land 510, as shown. The fluid in the passageway 524 leading from the fifth fluid port 494 to the second-speed-driving brake 32 is consequently drained off through the fourth fluid port 492. The position thus assumed by the first-second speed shift valve 108 is the downshift position of the valve. When the revolution speed of the transmission output shaft 40 is increased and accordingly the boosted governor pressure directed to the first fluid port 486 is increased to a certain level, then the force exerted on the first land 506 by the boosted governor pressure will overcome the opposing forces resulting from the line pressure acting on the differential pressure-acting areas of the first and second lands 506 and 508 of the first spool valve member 502, the throttle pressure acting on the differential pressure-acting areas of the third and fourth lands 510 and 512 of the first spool valve member 502 and the pressure-acting area of the land 520 of the second spool valve member 504. The first spool valve member 502 is consequently axially moved toward the second valve chamber 482 with its fourth land 512 projecting into the drain port 484, thereby closing the fifth fluid port 498 of the first valve chamber 480 by the third land 510 of the spool valve member 502. The throttle pressure which has thus far been present in the third circumferential groove 518 in the spool valve member 502 is discharged through the drain port 484 so that the throttle pressure in the fluid passageway 180 acts only upon the land 520 of the second spool valve member 504 from the port 500 of the second valve chamber 482. As a consequence, the first spool valve member 502 is rapidly moved toward the second valve chamber 482 and is balanced in an axial position providing communication between the third and fourth fluid ports 490 and 492 first circumferential groove 514 in the spool valve member 502 and between the fifth and sixth fluid ports 494 and 496 through the second circumferential groove 516 and closing the second fluid port 488 by the first land 506 of the spool valve member 502. The first-second speed shift valve 108 thus assumes the upshift position thereof. The line pressure passed from the third fluid port 130 to the sixth fluid port 496 through the fluid passageway 150 is thus directed to the servo mechanism of the second-speed-driving brake 32 through the fluid passageway 524 and, at the same time, the fluid pressure in the passageway 522 leading to the servo mechanism of the low-and-reverse brake 28 is drained off through the fourth fluid port 492 of the valve chamber 480 of the first-second speed shift valve 108. When the communication is thus established between the fluid passageways 150 and 524 through the fifth and sixth fluid ports 494 and 496, the line pressure is also directed to the second-third speed shift valve 110 through the passageway 524.

The second-third speed shift valve 110 comprises an elongate valve chamber 526 which has first, second, third, fourth, fifth, sixth, seventh, eighth, ninth and tenth fluid ports, 528, 530, 532, 534, 536, 538, 540, 542, 544 and 546, respectively, and first and second spool valve members 548 and 550 which are axially movable in the valve chamber 526. The first spool valve member 548 is formed with axially spaced first, second, third and fourth axially spaced lands 552, 554, 556 and 558, a first circumferential groove 560 located between the first and second lands 552 and 544, a second circumferential groove 562 located between the second and third lands 554 and 556, and a third circumferential groove 564 located between the third and fourth lands 556 and 558. The second and third lands 554 and 556 have substantially equal cross sectional areas which are smaller than the cross sectional area of the first land 552 and appreciably larger than the cross sectional area of the fourth lands 558. Forces resulting from the fluid pressure to act on opposite annular end faces of the second and third lands will therefore be cancelled by each other whereas the fluid pressure (which is the line pressure) directed into the third circumferential groove 564 in the spool valve member 548 acts on the differential pressure acting faces of the third and fourth lands 556 and 558 is thus effective to urge the spool valve member 548 toward the first fluid port 528. On the other hand, the second spool valve member 550 is formed with axially spaced first and second lands 566 and 568 and a circumferential groove 570 which is located between the lands 566 and 568. The first land 566 has a cross sectional area which is appreciably larger than the cross sectional area of the second land 568 and smaller than the cross sectional area of the fourth land 588 of the first spool valve member 548. The fluid pressure (which is the hysteresis pressure) directed into the circumferential groove of the second spool valve member 550 thus acts on the differential pressure-acting areas of the first and second lands 566 and 568 of the valve member 550 and is effective to urge the valve member 550 away from the tenth fluid port 546 of the valve chamber 526. The second spool valve member 550 is biased by means of a preload spring 572 toward an axial position in which the first land 566 of the second spool valve member 550 is pressed upon the fourth land 558 of the first spool valve member 548 as shown. The first fluid port 528 is in communication with the fluid passageway 476 leading from the third fluid port 458 of the downshift valve 106 through the fluid passageway 472 and the shuttle valve 474 and is so located as to have the fluid in the passageway 476 directed onto the axial end face of the first land 552 of the first spool valve member 548. The second fluid port 530 of the second-third speed shift valve 110 is a drain port which is in communication with the previously mentioned oil reservoir 120 and which is so located as to be closed by the second land 554 of the first spool valve member 548 or open to the second circumferential groove 562 in the spool valve member 548 depending upon the axial relative position of the valve member 548 in the valve chamber 526. The third fluid port 532 is in communication with a fluid passageway 574 which leads on one hand to the apply side of the servo mechanism of the third-band brake 34 and on the other hand to the third-fourth speed shift valve 112 as will be described later. The third fluid port 532 is so located as to be constantly open to the second circumferential groove 562 in the first spool valve member 548 irrespective of the axial relative position of the valve member 548 in the valve chamber 526. The fourth fluid port 534 is in communication with the previously mentioned fluid passageway 524 which leads to the servo mechanism of the second-speed-driving brake 32. The fourth fluid port 534 is so located as to be covered by the third land 556 of the first spool valve member 548 or open to the second or third circumferential groove 562 or 564 in the spool valve member 548 depending upon the axial relative position of the valve member 548 in the valve chamber 526. The fifth fluid port 546 is in communication with a fluid passageway 576 which in turn communicates with the previously mentioned fluid passageway 522 leading from the third fluid port 499 of the first-second speed shift valve 108. The fifth fluid port 546 of the second-third speed shift valve 110 is so located as to be constantly open to the third circumferential groove 564 in the first spool valve member 548 irrespective of the axial position of the valve member 548 in the valve chamber 526. The sixth fluid port 538 is a drain port communicating with the oil reservoir 120. The sixth fluid port 538 is so located as to be covered by the fourth land 558 of the second spool valve member 548 or open to the third circumferential groove 564 in the spool valve member 548 depending upon the axial relative position of the valve member 548 in the valve chamber 526. The seventh fluid port 540 is in communication with the previously mentioned fluid passageway 154 leading from the fifth fluid port 134 of the manual selector valve 82. The seventh fluid port 540 is so located as to have the fluid pressure in the passageway 154 directed onto the axial end face of the fourth land 558 of the first spool valve member 548. The eighth fluid port 542 is in communication with the previously mentioned fluid passageway 320 leading from the second fluid port 304 of the hysteresis valve 92. The eighth fluid port 542 is so located as to be covered by the first land 566 of the second spool valve member 550 or open to the circumferential groove 570 in the spool valve member 550 depending upon the axial relative position of the valve member 550 in the valve chamber 526. The ninth fluid port 544 is in communication with the previously mentioned fluid passageway 406 leading from the third fluid port 392 of the kickdown valve 98. The ninth fluid port 544 is so located as to be either closed by the land 568 of the second spool valve 550 or open to the circumferential groove 570 in the valve member 550. The tenth fluid port 546 of the second-third speed shift valve 110 is in communication with the throttle pressure passageway 180 leading from the second fluid port 162 of the throttle valve 84 and is so located as to have the throttle pressure directed onto the axial end of the second land 568 of the second spool valve member 550. The first and second spool valve members 548 and 550 are urged by the preload spring 572 to axial positions providing communication between the second and third fluid ports 530 and 532 through the second circumferential groove 562 in the first spool valve member 548 and between the fourth and fifth fluid ports 534 and 536 through the third circumferential groove 564 in the first spool valve member 548 and allowing the eighth fluid port 542 to open to the circumferential groove 570 in the second spool valve member 550. When, thus, the boosted governor pressure is directed to the first fluid port 528, the hysteresis pressure directed into the circumferential groove 570 in the second spool valve member 550 through the eighth or ninth fluid port 542 or 544 and the throttle pressure directed to the tenth fluid port 546 and if a fluid pressure obtains in the third circumferential groove 564 in the first spool valve member 548, then the first and second spool valve members 548 and 550 is axially urged toward the first fluid port 528 by the combined forces resulting from the fluid pressure (which is the line pressure) acting on the differential pressure-acting areas of the third and fourth lands 556 and 558 of the first spool valve member 548, the hysteresis pressure acting on the differential pressure-acting areas of the first and second lands 566 and 568 of the second spool valve member 550, the throttle pressure acting on the pressure-acting area of the second land 568 of the second spool valve member 550 and the force of the preload spring 572. The combined forces thus urging the first and second spool valve members 548 and 550 toward the first fluid port 528 are opposed by the force resulting from the governor pressure acting on the axial end face of the first land 552 of the first spool valve member 548 from the first fluid port 528.

When the transmission output shaft 40 is being driven to rotate at a speed lower than a certain level, the boosted governor pressure acting on the first land 552 of the first spool valve member 548 also lower than a certain level so that the forces urging the spool valve members 548 and 550 toward the first fluid port 528 overcome the opposing force of the governor pressure and, as a consequence, the first spool valve member 548 is moved to an axial position providing communication between the second and third fluid ports 530 and 532 through the second circumferential groove 562 in the valve member 548 and between the fourth and fifth fluid ports 534 and 536 and closing the sixth fluid port 538 through the third circumferential groove 564 in the valve member 548 and at the same time the second spool valve member 550 is moved to an axial position closing the ninth fluid port 544 by the land 568 of the second spool valve member 550. The position thus assumed by the second-third speed shift valve 110 is the downshift position of the valve 110. When, however, the revolution speed of the transmission output shaft 40 is increased with a resultant increase in the governor pressure acting on the axial end face of the first land 528 of the first spool valve member 548, the forces urging the spool valve members 548 and 550 toward the first fluid port 528 are overcome by the opposing force of the governor pressure acting on the first land 552 of the first spool valve member 548. The first spool valve member 548 is consequently moved to an axial position providing communication between the third and fourth fluid ports 532 and 534 through the second circumferential groove 562 in the valve member 548 and between the fifth and sixth fluid ports 536 and 538 through the third circumferential groove 564 in the valve member 548 whereas the second spool valve member 550 is moved to an axial position closing the eighth fluid port 542 and providing communication between the ninth fluid port 544 and the circumferential groove 570 in the second spool valve member 550. The position thus assumed by the second-third speed shift valve 110 is the upshift position of the valve 110.

The line pressure directed to the fourth fluid port 534 from the fluid passageway 150 through the fifth and sixth fluid ports 494 and 496 of the first-second speed shift valve 108 and the fluid passageway 524 leading from the above mentioned port 494 is, in this manner, passed from the third fluid port 532 of the second-third speed shift valve 110 to the apply side of the servo mechanism of the band brake 34 through the fluid passageway 574. The fluid pressure in the passageway 574 is also directed to the third-fourth speed shift valve 112.

The third-fourth speed shift valve 112 comprises an elongate valve chamber 578 which has first, second, third, fourth, fifth, sixth, seventh and eighth fluid ports 580, 582, 584, 586, 588, 590, 592 and 594 and first and second spool valve members 596 and 598 which are axially movable in the valve chamber 578. The first spool valve member 596 is formed with axially spaced first, second and third lands 600, 602 and 604, a first circumferential groove 606 located between the first and second lands 600 and 602 and a second circumferential groove 608 located between the second and third lands 602 and 604. The second spool valve member 598 is formed with axially spaced first and second lands 610 and 612 and a circumferential groove 614 which is located between the first and second lands 610 and 612. The first and second spool valve members 596 and 598 are axially urged away from each either by a preload spring 616 and toward the first fluid port 580 by a preload spring 618 which is shown to be seated at one end on an axial end face of the second land 612 of the second spool valve member 598. The first and second lands 600 and 602 of the first spool valve member 596 have substantially equal cross sectional areas which are appreciably larger than the cross sectional area of the third land 604 of the spool valve member 596 so that the fluid pressure (which is the line pressure), directed into the second circumferential groove 608 in the spool valve member 596 acts upon the differential pressure-acting areas of the second and third lands 602 and 604 and thus urges the spool valve member 596 toward the first fluid port 580. The first land 610 of the second spool valve member 598 has a cross sectional area which is appreciably smaller than the cross sectional area of the third land 604 of the first spool valve member 596 and larger than the cross sectional area of the second land 612 of the second spool valve member 598. The fluid pressure (which is the hysteresis pressure) directed into the circumferential groove 614 of the second spool valve member 598 thus acts on the differential pressure-acting areas of the lands 610 and 612 and is effective to urge the spool valve member 598 away from the eighth fluid port 594. The first fluid port 580 is in communication with the fluid passageway 476 which leads from the third fluid port 458 of the downshift valve 106 through the fluid passageway 472 and the shuttle valve 474. The first fluid port 580 is so located as to have the fluid pressure in the passageway 476 directed onto the axial end face of the first land 600 of the first spool valve member 596. The second fluid port 582 of the third-fourth speed shift valve 112 is a drain port which is in communication with the previously mentioned oil reservoir 120 and which is so located as to be covered by the first land 600 of the first spool valve member 596 or open to the first circumferential groove 606 in the spool valve member 596 depending upon the axial relative position of the spool valve member 596 in the valve chamber 578. The third fluid port 584 is in communication with a fluid passageway 620 which communicates through the previously mentioned shuttle valve 155 with the fluid passageway 148 leading on one hand to the servo mechanism of the front clutch 18 and the release side of the servo mechanism of the band brake 34 and on the other hand to the apply servo mechanism of the second-speed-driving brake 32. The third fluid port 584 of the third-fourth speed shift valve 112 is so located as to be constantly open to the first circumferential groove 606 in the first spool valve member 596 irrespective of the axial relative position of the valve member 596 in the valve chamber 578. The fourth fluid port 586 is in communication with the fluid passageway 574 which leads from the third fluid port 532 of the second-third speed shift valve 110. The fourth fluid port 586 of the third-fourth speed shift valve 112 is so located as to be covered by the second land 602 of the first spool valve member 596 or open to the first or second circumferential groove 606 or 608 in the spool valve member 596 depending upon the axial relative position of the spool valve member 596 in the valve chamber 578. The fifth fluid port 590 is in communication with the fluid passageway 152 which leads from the fourth fluid port 132 of the manual selector valve 82. The fluid port 590 is so located as to have the line pressure in the fluid passageway 152 directed onto the axial end faces of the third land 604 of the first spool valve member 596 and the first land 610 of the second spool valve member 598. The sixth fluid port 582 is in communication with the previously mentioned fluid passageway 320 which leads from the second fluid port 304 of the hysteresis valve 92. The sixth fluid port 592 of the third-fourth speed shift valve 112 is so located as to be covered by the first land 610 of the second spool valve member 596 or open to the circumferential groove 614 in the second spool valve member 598 depending upon the axial relative position of the valve member 598 in the valve chamber 578. The seventh fluid port 592 is in communication with the previously mentioned fluid passageway 406 which leads from the third fluid port 392 of the kick-down valve 98. The seventh fluid port 592 of the third-fourth speed shift valve 112 is so located as to be covered by the second land 612 of the second spool valve member 598 or open to the circumferential groove 614 in the second spool valve member 598 depending upon the axial relative position of the second spool valve member 598 in the valve chamber 578. The eighth fluid port 594 is in communication with the previously mentioned fluid passageway 180 which leads from the second fluid port 162 of the throttle valve 84. The eighth fluid port 594 of the third-fourth speed shift valve 112 is so located as to have the throttle pressure in the passageway 180 directed onto the second land 612 of the second spool valve member 598. The first and second spool valve members 596 and 598 are biased by the preload spring 618 to axial positions providing communication between the second and third fluid ports 582 and 584 through the first circumferential groove 606 in the first spool valve member 596 so that the fluid in the third fluid port 584 is drained off through the second fluid port 582. When the first and second spool valve members 596 and 598 are in these axial positions, the spool valves 596 and 598 are subjected to combined forces urging the valve members toward the first fluid port 580 by the fluid pressure (line pressure) acting on the differential pressure-acting areas of the second and third lands 602 and 604 of the first spool valve member 596 from the fourth fluid port 586, the hysteresis pressure acting on the differential pressure-acting areas of the first and second lands 610 and 612 of the second spool valve member 596 from the sixth fluid port 590, the throttle pressure acting on the second land 612 of the second spool valve member 598 from the eighth fluid port 594 and the force of the preload spring 618 so that the first and second spool valve members 596 and 598 are axially urged toward the first fluid port 580. The forces thus urging the spool valve members 596 and 598 toward the first fluid port 580 are opposed by a force resulting from the boosted governor pressure which acts on the axial end face of the first land 600 of the first spool valve member 596 from the first fluid port 580. When the boosted governor pressure in the first fluid port 580 is lower than a certain level with the transmission output shaft 40 being driven to rotate at a speed lower than a certain level, the combined forces urging the spool valve members 596 and 598 toward the first fluid port 580 overcome the opposing force resulting from the governor pressure acting on the first land 600 of the first spool valve member 596, which is consequently moved to an axial position providing communication between the second and third fluid ports 582 and 584 through the first circumferential groove 606 in the valve member 596 whereas the second spool valve member 598 is held in an axial position closing the seventh fluid port 592 by the second land 612 thereof. The position thus assumed by the third-fourth speed shift valve 112 is the downshift position thereof. When, however, the revolution speed of the transmission output shaft 40 is increased so that the boosted governor pressure directed to the first fluid port 580 is increased beyond a certain level, then the forming resulting from the pressure acting on the end face of the first land 600 of the first spool valve member 596 overcomes the opposing forces. The first spool valve member 596 is consequently moved to an axial position closing the second or drain port 582 by the first land 600 thereof and providing communication between the third and fourth fluid ports 584 and 586 through the first circumferential groove 606 in the valve member 596 whereas the second spool valve member 598 is moved to an axial position closing the sixth fluid port 590 by the first land 610 thereof and providing communication between the seventh fluid port 592 and the circumferential groove 614 in the valve member 598. The position thus assumed by the third-fourth speed shift valve 112 is the upshift position of the valve. When the third-fourth speed shift valve 112 is held in the upshift position, the line pressure which has been directed to the fluid passageway 572 through the first-second and second-third speed shift valves 108 and 110 from the third fluid port 150 of the manual selector valve 82 is passed to the fluid passageway 620 through the fourth and third fluid ports 586 and 584, respectively, of the third-fourth speed shift valve 112. The line pressure is then fed through teh shuttle valve 155 to the servo mechanism of the front clutch 18 and the release side of the servo mechanism of the band brake 34 of the transmission mechanism.

The second-speed pressure modulator valve 114 comprises an elongated valve chamber 622 which has first, second, third, fourth and fifth fluid ports 624, 626, 628, 630 and 632 and a spool valve member 634 which is axially movable in the valve chamber 622. The spool valve member 634 is formed with axially spaced first and second lands 636 and 638 and a circumferential groove 640 which is located between the lands 636 and 638. The first fluid port 624 is in communication with the previously mentioned fluid passageway 154 which leads from the fifth fluid port 134 of the manual selector valve 82. The fluid port 624 is so located as to have the line pressure in the fluid passageway 154 directed onto the axial end face of the first land 636 of the spool valve member 534. The second fluid port 626 is a drain port which is in communication with the oil reservoir 120 and which is so located as to be covered by the first land 636 of the spool valve member 634 or open to the circumferential groove 640 in the valve member 634 depending upon the axial relative position of the valve member in the valve chamber 622. The third fluid port 628 is in communication with a fluid passageway 642 which leads to the servo mechanism (not shown) of the second-speed-coasting brake 30. The third fluid port 628 is so located as to be constantly open to the circumferential groove 640 in the spool valve member 634 irrespective of the axial relative position of the spool valve member in the valve chamber 622. The fourth fluid port 630 is in communication through a fluid passageway 644 with the previously mentioned fluid passageway 522 leading from the third fluid port 490 of the first-second speed shift valve 108. The fourth fluid port 630 of the modulator valve 114 is so located as to be covered by the second land 638 of the spool valve member 634 or open to the circumferential groove 640 in the spool valve member 634 depending upon the axial relative position of the valve member 634 in the valve chamber 622. The fifth fluid port 632 is in communication with the above mentioned fluid passageway 642 through a restriction or orifice 646 and is so located as to have the fluid pressure in the passageway 642 directed onto the second land 646 of the spool valve member 634. The spool valve member 634 is biased by means of a preload spring 648 to move toward an axial position providing communication between the second and third fluid ports 642 and 644 through the circumferential groove 640 in the spool valve member 634 and simultaneously closing the fourth fluid port 630 by the second land 638 of the valve member 634 as shown. When the spool valve member 634 is held in this axial position, the third and fifth fluid ports 628 and 632 are drained off through the second or drain port 626 so that no fluid pressure is developed in the fluid passageway 642 leading to the servo mechanism of the second-speed-coasting brake 30. Such a position of the spool valve member 634 is achieved in the absence of the line pressure in the first fluid port 624. When, however, the line pressure is directed to the first fluid port 524 through the passageway 154, the force resulting from the line pressure acting on the axial end face of the first land 636 of the spool valve member 634 causes the spool valve member 634 to axially move away from the first fluid port 624 against the opposing force of the preload spring 648 until the first land 636 of the spool valve member 634 covers the second or drain port 626 and the second land 638 of the valve member uncovers the fourth fluid port 630. Fluid communication is consequently provided between the third and fourth fluid ports 628 and 630 so that the fluid pressure in the passageway 644 is directed to the circumferential groove 640 in the spool valve member 534 and through the fluid passageway 642 and the orifice 646 to the fifth fluid port 632. The fluid pressure directed into the circumferential groove 640 acts upon the opposite end faces of the first and second lands 636 and 638 of the spool valve member 634 but is ineffective to urge the valve member in either direction because the lands 636 and 638 have substantially equal cross sectional areas. The spool valve member 634 will therefore be moved to an equilibrium position when the force resulting from the line pressure acting on the axial end face of the first land 636 of the spool valve member 634 from the first fluid port 624 is equalized with the combined forces resulting from the fluid pressure acting on the axial end face of the second land 638 from the fifth fluid port 632 and the force of the preload spring 648. Under this balanced condition of the spool valve member 634, the first land 636 of the valve member 634 is on the point of uncovering the second or drain port 626 and providing communication between the first and second fluid ports 624 and 626. The fluid pressure in the fifth fluid port 632 is thus modulated to a level which is lower than the line pressure by a fixed value which is determined by the force of the preload spring 648. The fluid pressure thus delivered from the second-speed pressure modulator valve 114 is directed to the servo mechanism of the second-speed-coasting brake 30.

The operation of the hydraulic control system thus constructed and arranged will now be described in relation to the various positions selected in the manual selector valve 82. Table 2 shows the conditions of the fluid ports 126, 128, 130, 132, 134 and 136 of the manual selector valve 82 as achieved when the selector valve is in the various positions, wherein a symbol *o* indicates the open condition of the first fluid port 126 or the condition in which the fluid port other than the first port is in communication with the first port and a symbol *x* indicates the closed condition of the first fluid port or the condition in which the fluid port other than the first port is isolated from the first port.

Table 2

| Selected Position | P | R | N | D | 3 | 2 | 1 |
|---|---|---|---|---|---|---|---|
| 1st port, 126 | x | o | o | o | o | o | o |
| 2nd port, 128 | x | o | x | x | x | x | x |
| 3rd port, 130 | x | x | x | o | o | o | o |
| 4th port, 132 | x | x | x | x | o | o | o |
| 5th port, 134 | x | x | x | x | x | o | o |
| 6th port, 136 | x | x | x | x | x | x | o |

When, now, the spool valve member 138 of the manual selector valve 82 is moved to the parking position P, the second land 142 of the valve member is located to cover the first fluid port 126 leading from the line-pressure passageway 122. The line pressure is therefore passed to none of the second, third, fourth, fifth and sixth fluid ports 128, 130, 132, 134 and 136 and is thus directed to none of the shift valves. None of the clutches and brakes are accordingly operative.

When, on the other hand, the spool valve member 138 of the manual selector valve 82 is axially moved to the reverse position R, then the first fluid port 126 is uncovered by the second land 142 of the valve member 138. Under this condition, the second fluid port 128 is in communication with the first fluid port 126 through the circumferential groove 144 in the spool valve member 138 so that the line pressure is passed from the passageway 122 to the passageway 148 through the first and second fluid ports 126 and 128 and is directed through the passageway 148 to the shuttle valves 155 and 157. The fluid pressure directed to the shuttle valve 155 is passed over to the servo mechanism of the front clutch 18 and to the release side of the servo mechanism of the band brake 34. Thus, the front clutch 18 is coupled and simultaneously the band brake 34 is kept released. The fluid pressure directed to the shuttle valve 157 is passed through the fluid passageway 148 to the servo mechanism of the low-and-reverse brake 28, which is consequently actuated. The transmission mechanism shown in FIG. 3 is therefore brought into the reverse driving condition as will be understood from Table 1. The line pressure is also directed through the line-pressure passageway 122 to the first fluid port 250 of the pressure regulator valve 90 and acts on the axial end face of the first land 268 of the first spool valve member 264 thereof. The first and second spool valve members 264 and 266 of the pressure regulator valve 90 are thus held in balanced axial positions when the force resulting from the line pressure which acts on the first land 268 of the spool valve member 264 is equalized with the combined forces resulting from the throttle pressure acting on the axial end face of the first land 284 of the second spool valve member 266 and the force of the preload spring 296 in the absence of the hysteresis pressure in the second fluid port 254. The line pressure is thus adjusted to a level which is dictated by the throttle pressure delivered from the second fluid port 162 of the throttle valve 84 and the force of the preload spring 296 of the pressure regulator valve 90. If, however, the accelerator pedal is being released so that the engine is at idle, the hysteresis pressure developed by the hysteresis valve 92 is directed to the second fluid port 254 of the pressure regulator valve 90 through the solenoid-operated control valve 94, the idle valve 96 and the shuttle valve 294. The hysteresis pressure acts on the differential pressure-acting areas of the first and second lands 268 and 270 of the first spool valve member 264 of the regulator valve 90 so that the spool valve members 264 and 266 are brought into equilibrium positions when the combined forces resulting from the throttle pressure acting on the first land 284 of the second spool valve member 266 and the force of the preload spring 296 are equalized with the force resulting from the line pressure acting on the first land 268 of the spool valve member 264 plus the force resulting from the hysteresis pressure acting on the differential pressure-acting areas of the first and second lands 268 and 270 of the spool valve member 264. The line pressure is consequently maintained at a lower level during idling condition than a level which will be achieved when the accelerator pedal is being depressed. As a consequence, the shocks that will be invited in the transmission mechanism during shifting to the reverse position can be alleviated.

When the spool valve member 138 of the manual selector valve 82 is moved to the neutral position N, the first fluid port 126 remains uncovered by the second land 142 of the valve member 138 but the second fluid port 128 is isolated from the first fluid port 136 by the first land 140 of the spool valve member 138. The third fluid port 130 is covered by the second land 142 of the spool valve member 138 and the fourth, fifth and sixth fluid ports 132, 134 and 136 are drained off. The line pressure is thus entrapped in the circumferential groove 144 of the spool valve member 138 and is therefore passed to none of the fluid ports 128, 130, 132, 134 and 136. None of the clutches and brakes of the transmission mechanism are thus operative during the neutral condition, as in the case of the parking condition.

When the spool valve member 138 of the manual selector valve 82 is moved to the automatic drive range position D, then communication is established between the first and third fluid ports 126 and 130 with the second fluid port 128 kept isolated from the first fluid port 126 by the first land 140 of the spool valve member 138 and with the fourth, fifth and sixth fluid ports 132, 134 and 136 drained off. The line pressure in the line-pressure passageway 122 is consequently passed through the first and third fluid ports 126 and 130 to the fluid passageway 150 and then through the passageway 150 to the servo mechanism of the rear clutch 20, which is thus actuated into coupled condition. The line pressure is also directed through the passageway 150 to the sixth fluid port 496 of the first-second speed shift valve 108. Under these conditions, the first-second speed shift valve 108 is acted upon by the boosted governor pressure at the axial end face of the first land 506 of the first spool valve member 502 and the throttle pressure at the axial end face of the land 520 of the second spool valve member 504 and at the differential pressure-acting areas of the third and fourth lands 510 and 512 of the first spool valve member 502. When, thus, the transmission output shaft 40 is being driven to rotate at such a speed as to maintain the boosted governor pressure lower than a certain level so that the force resulting from the boosted governor pressure acting on the first land 506 of the first spool valve member 502 is overcome by the combined forces resulting from the throttle pressure acting on the differential pressure-acting areas of the third and fourth lands 510 and 512 of the first spool valve member 502 and on the axial end face of the land 520 of the second spool valve member 504. The first and second spool valve members 502 and 504 are therefore held in axial positions in which the sixth fluid port 496 leading from the fluid passageway 150 is closed by the third land 510 of the first spool valve member 502. Only the rear clutch 20 is thus held in coupled condition and consequently the first-speed gear ratio is achieved in the transmission mechanism when the vehicle is being driven at a relatively low speed with the manual selector valve 82 held in the automatic drive range position D. When the revolution speed of the transmission output shaft 40 is increased and accordingly the boosted governor pressure becomes higher than the certain level, the force resulting from the boosted governor pressure acting on the axial end face of the first land 506 of the first spool valve member 502 of the first-second speed shift valve 108 overcomes the opposing forces and as the consequence the first and second spool valve members 502 and 504 are axially moved away from the first fluid port 486. When the first spool valve member 502 is thus moved to an axial position having its third land 510 located to cover the seventh fluid port 498, the fluid pressure which is directed to the seventh fluid port 498 no longer acts upon the differential pressure-acting areas of the third and fourth lands 510 and 512 of the first spool valve member 502. As a consequence, the boosted governor pressure acting on the first land 506 of the first spool valve member 502 is opposed only by the throttle pressure acting on the axial end face of the land 520 of the second spool valve member 504 and the force of the preload spring 525 so that the first and second spool valve members 502 and 504 are rapidly moved away from the first fluid port 486 of the first valve chamber 480, providing communication between the third and fourth fluid ports 490 and 492 through the first circumferential groove 514 in the valve member 502 and between the fifth and sixth fluid ports 494 and 496 through the second circumferential groove 516 in the valve member 502. The fluid in the passageway 522 is consequently drained off through the third and fourth fluid ports 490 and 492 and simultaneously the line pressure is passed from the passageway 150 to the passageway 524 through the fifth and sixth fluid ports 494 and 496 so that the second-speed-driving brake 32 is actuated. The second-speed gear ratio is therefore achieved in the transmission mechanism with the rear clutch 20 held in the coupled condition. When the first and second spool valve members 502 and 504 of the first-second speed shift valve 108 are thus moved to axial positions remote from the first fluid port 486 of the first valve chamber 480, only the force resulting from the throttle pressure acting on the land 520 of the second spool valve 504 and the force of the preload spring 525 are operative to urge the spool valve members 502 and 504 toward the first fluid port 486 of the first valve chamber 480. The boosted governor pressure acting on the spool valve members 502 and 504 of the first-second speed shift valve 108 are, thus, opposed by a smaller force during downshift from the second to first speed gear ratio than during upshift from the first to second speed gear ratio in which the boosted governor pressure is resisted not only by the throttle pressure acting on the axial end face of the land 520 of the second spool valve member 504 and the force of the preload spring 525 but by the throttle pressure which acts on the differential pressure-acting areas of the third and fourth lands 510 and 512 of the first spool valve member 502. This means that the downshift from the second to first speed gear ratio is achieved at a lower vehicle speed than during the upshift from the first to second speed gear ratio.

When the first-second speed shift valve 108 is thus held in the upshift position providing the second-speed gear ratio in the transmission mechanism, the line pressure delivered from the fifth fluid port 494 of the valve 108 is also directed through the fluid passageway 524 to the fourth fluid port 534 of the second-third speed shift valve 110. If, under these conditions, the transmission output shaft 40 is being driven to rotate at a speed lower than a certain level and as a consequence the boosted governor pressure is lower than a certain valve, the force resulting from the governor pressure acting on the axial end face of the first land 552 of the first spool valve member 548 of the second-third speed shift valve 110 is overcome by the opposing forces urging the first and second spool valve members 548 and 550 toward the first fluid port 528. The second-third speed shift valve 110 is therefore held in the downshift position thereof so that the first spool valve member 548 is held in an axial position providing communication between the second and third fluid ports 530 and 532 through the second circumferential groove 562 in the valve member 548 and between the fourth and fifth fluid ports 534 and 536 through the third circumferential groove 564 in the valve member 548 and closing the sixth fluid port 538 by the fourth land 558 of the valve member 548 whereas the second spool valve member 550 is held in an axial position providing communication between the eighth fluid port 542 and the circumferential groove 570 in the valve member 550 and closing the ninth fluid port 544 by the second land 568 of the valve member 550. The fluid passageway 574 is thus drained off through the second and third fluid ports 530 and 532 and the line pressure directed to the fourth fluid port 534 from the first-second speed shift valve 108 is passed over to the fluid passageway 576 through the fifth fluid port 536. The line pressure in the passageway 576 is directed through the passageway 644 to the fourth fluid port 630 of the second-speed pressure modulator valve 114. During the automatic drive range condition in which the fifth fluid port 134 of the manual selector valve 82 is drained off, no fluid pressure is developed in the first fluid port 624 of the second-speed pressure modulator valve 114 and, as a consequence, the spool valve member 634 of the modulator valve 114 is held in an axial position closest to the first fluid port 624 by the force of the preload spring 648. The fourth fluid port 630 of the modulator valve 114 is therefore kept closed by the second land 638 of the spool valve member 534 as shown. The line pressure which has been directed to the fourth fluid port 630 of the modulator valve 114 is, thus, not passed to the fluid passageway 642 leading to the servo mechanism of the low-and-reverse speed brake 28. Reverting to the second-third speed shift valve 110 which is held in the downshift position, the line pressure developed in the third circumferential groove 564 acts upon the differential pressure-acting areas of the third and fourth lands 556 and 558 and urge the first spool valve member 548 downwardly of the drawing, viz., toward the first fluid port 528. On the other hand, the hysteresis pressure directed to the circumferential groove 570 in the second spool valve member 550 through the eighth fluid port 542 acts upon the differential pressure-acting areas of the first and second lands 566 and 568 of the second spool valve member 550 and urges the first and second spool valve members 548 and 550 downwardly of the drawing. The second-third speed shift valve 110 is thus held in the downshift position thereof.

When the revolution speed of the transmission output shaft 40 is increased so that the governor pressure rises beyond the certain level, then the force resulting from the governor pressure acting upon the axial end face of the first land 552 of the first spool valve member 548 of the second-third speed shift valve 110 overcomes the opposing forces urging the valve members 548 and 550 downwardly of the drawing so that the first spool valve member 548 will be moved to an axial position isolating the third fluid port 532 from the second or drain port 530 and providing communication between the third and fourth fluid ports 532 and 534 through the second circumferential groove 562 in the valve member 548 and between the fifth and sixth fluid ports 536 and 538 through the third circumferential groove 564 in the valve member 548 whereas the second spool valve member 550 is moved to an axial position closing the eighth fluid port 542 by the first land 566 thereof and providing communication between the ninth fluid port 544 and the circumferential groove 570 in the valve member 550. The line pressure which has been directed from the first-second speed shift valve 108 to the fourth fluid port 534 of the second-third speed shift valve 110 is passed through the third fluid port 532 of the valve 110 to the fluid passageway 574 leading to the apply-side of the band brake 34. The third-speed gear ratio in the automatic drive range condition is consequently achieved with the rear clutch 20 kept coupled and the band brake 34 actuated. Since, in this instance, the second and third lands 554 and 556 of the first spool valve member 548 of the second-third speed shift valve 548 has equal cross sectional areas, the forces exerted on the opposite annular end faces of the second and third lands 554 and 556 of the spool valve member 548 by the line pressure developed in the second circumferential groove 564 are cancelled by each other and are thus ineffective to urge the valve member 548 in either direction. The fifth fluid port 536 of the second-third speed shift valve 110 is, on the other hand, drained off through the sixth fluid port 538 so that no fluid pressure acts on the differential pressure-acting areas of the third and fourth lands 556 and 558 of the first spool valve member 548. The circumferential groove 570 in the second spool valve member 550 is in communication with the ninth fluid port 544 as previously mentioned. Since, however, the kick-down valve 98 has its spool valve member 398 held in an axial position providing communication between the second and third fluid ports 392 and 394 thereof during non-kickdown condition, the passageway leading from the second fluid port 392 of the kick-down valve 114 is drained off through the third fluid port 394 of the valve 114 so that no fluid pressure is developed in the ninth fluid port 544 of the second-third speed shift valve 110 and accordingly in the circumferential groove 570 in the second spool valve member 550 of the valve 110. The second-third speed shift valve 110 is thus held in the upshift position thereof.

The line pressure which has been delivered from the third fluid port 532 of the second-third speed shift valve 110 is also directed through the passageway 574 to the fourth fluid port 586 of the third-fourth shift valve 112. When, under these conditions, the revolution speed of the transmission output shaft 40 is lower than a certain level so that the governor pressure is also lower than a certain value, the governor pressure acting on the axial end face of the first land 600 of the first spool valve member 596 of the third-fourth speed shift valve 112 is overcome by the opposing forces which are effective to urge the first and second spool valve members 596 and 598 downwardly of the drawing, viz., toward the first fluid port 580 of the valve 112. The third-fourth speed shift valve 112 is consequently held in the downshift position thereof so that the first spool valve member 596 is in an axial position providing communication between the second and third fluid ports 582 and 584 through the first circumferential groove 606 in the valve member 596 and between the fourth fluid port 586 and the second circumferential groove 608 in the valve member 596 whereas the second spool valve member 598 is in an axial position providing communication between the sixth fluid port 590 and the circumferential groove 614 in the valve member 598 and closing the seventh fluid port 592 by the second land 612 of the valve member 598, as shown. The fluid passageway 620 leading from the third fluid port 584 is therefore drained off through the second or drain port 582. The third-fourth speed shift valve 112 is consequently maintained in the downshift position by the force resulting from the line pressure acting on the differential pressure-acting areas of the second and third lands 602 and 604 of the first spool valve member 596 from the fourth fluid port 586, the force resulting from the hysteresis pressure acting on the differential pressure-acting areas of the first and second lands 610 and 612 of the second spool valve member 598 from the sixth fluid port 590, the force resulting from the throttle pressure acting on the end face of the second land 612 of the second spool valve member 598 and the force of the preload spring 618. The third-fourth speed shift valve 112 is consequently held in the downshift position thereof.

When the revolution speed of the transmission output shaft 40 is increased so that the governor pressure exceeds the certain level, then the force resulting from the governor pressure acting on the axial end face of the first land 600 of the first spool valve member 596 of the third-fourth speed shift valve 112 overcomes the opposing forces which urge the valve members 596 and 598 downwardly of the drawing. The first and second spool valves 596 and 598 are consequently moved upwardly of the drawing, viz., away from the first fluid port 580 into axially balanced positions establishing the upshift position of the third-fourth speed shift valve 112. When the upshift position of the third-fourth speed shift valve 112 is achieved, then the first spool valve member 596 is held in an axial position closing the second fluid port 582 by the first land 600 thereof and providing communication between the third and fourth fluid ports 584 and 586 through the first circumferential groove 606 in the valve member 596, whereas the second spool valve member 598 is held in an axial position closing the sixth or drain port 590 by the first land 610 thereof and providing communication between the seventh fluid port 592 and the circumferential groove 614 in the valve member 598. The line pressure which has been directed from the second-third speed shift valve 110 to the fourth fluid port 586 is consequently passed through the third fluid port 584 over to the fluid passageway 620 and, through the fluid passageway 620 and the shuttle valve 155 to the servo mechanism of the front clutch 18 and the release-side of the servo mechanism of the band brake 34. The third-speed gear ratio is consequently achieved in the transmission mechanism with the front and rear clutches 18 and 20 coupled and the band brake 34 released. Since, under these conditions, no fluid pressure is developed in the fifth fluid port 588 and since the forces exerted on the first and second lands 600 and 602 of the first spool valve member 596 of the third-fourth speed shift valve 112 by the line pressure developed in the first circumferential groove 606 in the valve member 596 are cancelled by each other because of the equal cross sectional areas of the first and second lands 600 and 602 of the valve member 596, the governor pressure acting on the axial end face of the first land 600 of the first spool valve member 596 is opposed only by the throttle pressure acting on the axial end face of the second land 612 of the second spool valve member 598 and the force of the preload spring 618, provided the hysteresis pressure is passed through the kick-down valve 114 to the seventh fluid port 592 of the third-fourth speed shift valve 112. The third-fourth speed shift valve 112 is now held in the upshift position thereof.

If a kick-down condition is brought about in the engine with the accelerator pedal depressed throughout its full stroke when the manual selector valve 82 is held in the automatic drive range position D, the gear ratio shift point is varied by the action of the solenoid-operated control valve 94 and the kick-down valve 98. During normal condition, viz., when the kick-down condition is not being produced, the switch 360 of the solenoid-operated valve actuator 356 of the control valve 94 is kept open so that the plunger 358 of the valve actuator 356 projects into the orifice 354 leading from the first fluid port 328 of the valve 94. The orifice 354 is therefore closed by the plunger 358 so that a fluid pressure is developed in the first fluid port 328 and causes the spool valve member 338 of the valve 94 to axially move away from the first fluid port 328 against the opposing force of the preload spring 352. The second fluid port 330 leading from the second fluid port 304 of the hysteresis valve 92 through the fluid passageway 320 is thus closed by the first land 340 of the spool valve member 338 of the control valve 92 and at the same time the third fluid port 332 of the valve 94 is in communication with the fourth fluid port 334 so that the fluid in the passageways 348 and 350 leading from the port 332 is drained off through the port 334. When, however, the accelerator pedal is depressed all the way down by the vehicle driver with the manual selector valve 82 held in the automatic drive range position D, then the switch 360 of the solenoid-operated valve actuator 356 closes to energize the valve actuator 356 from an external power source (not shown). The plunger 358 of the valve actuator 356 is consequently withdrawn from the orifice 354, allowing the fluid in the first fluid port 328 of the solenoid-operated control valve 94 to be drained through the orifice 354. The spool valve member 338 of the control valve 94 is thus axially moved toward the first fluid port 328 by the force of the preload spring 352, closing the fourth or drain port 334 and simultaneously providing communication between the second and third fluid ports 330 and 332 through the circumferential groove 344 in the spool valve member 338. The hysteresis pressure which has been delivered from the second fluid port 304 of the hysteresis valve 92 to the fluid passageway 320 is therefore passed through the second and third fluid ports 330 and 332 of the solenoid-operated control valve 94 to the fluid passageway 350 and is directed through the passageway 350 to the second fluid port 390 of the kick-down valve 98. Because, in this instance, the sixth fluid port 136 of the manual selector valve 82 is drained off and accordingly no fluid pressure is developed in the fluid passageway 156 leading to the first fluid port 388 of the kick-down valve 98, the spool valve member 398 of the kick-down valve 98 is acted upon only by the throttle pressure at the axial end face of the second land 402 of the spool valve member 398 and the force of the preload spring 408 which biases the spool valve member 398 away from the first fluid port 388. When the accelerator pedal is depressed to such an extent as to cause the switch 360 of the solenoid-operated control valve 94 to close, the throttle pressure is increased to a relatively high level and, as a consequence, the force resulting from the throttle pressure acting on the second land 402 of the spool valve member 398 of the kick-down valve 98 overcomes the opposing force of the preload spring 408 so that the spool valve member 398 is axially moved toward the first fluid port 388 against the force of the preload spring 408. The spool valve member 398 is therefore held in an axial position providing communication between the second and third fluid ports 390 and 392 through the circumferential groove 404 in the valve member 398 and closing the fourth or drain port 394 by the second land 402 of the valve member 398. The hysteresis pressure which has been directed to the fluid passageway 350 from the solenoid-operated control valve 94 is consequently passed through the second and third fluid ports 390 and 392 of the kick-down valve 98 to the fluid passageway 406 and is then directed through the passageway 406 to the first fluid port 454 of the downshift valve 106. The hysteresis pressure thus directed to the first fluid port 454 of the downshift valve 106 acts upon the axial end face of the first spool valve member 464 of the downshift valve 106 and, combined with the force of the preload spring 452 and the boosted governor pressure acting on the differential pressure-acting areas of the first and second lands 466 and 468 of the spool valve member 464, causes the spool valve member 464 to axially move away from the first fluid port 454. Communication is now provided between the third and fourth fluid ports 458 and 460 so that the governor pressure in the fluid passageway 430 leading from the fluid outlet port 416 of the governor valve unit 100 is passed through the third and fourth fluid ports 458 and 460 of the downshift valve 106 to the fluid passageway 472 and is directed through the shuttle valve 474 to the fluid passageway 476. The governor pressure acting on the first-second, second-third and third-fourth speed shift valves 108, 110 and 112 is thus shifted from the boosted governor pressure to the basic governor pressure during the kick-down condition. The basic governor pressure being lower than the boosted governor pressure for the same transmission output shaft speed, the shift valves 108, 110 and 112 are actuated into the upshift or downshift conditions at a higher vehicle speed than during the non-kickdown condition. During the kick-down condition, the line pressure is maintained at the same level as that is achieved during the normal drive range condition.

The fluid passageway 348 leading from the third fluid port 332 of the solenoid-operated control valve 94 is in communication with the second fluid port 366 of the idle valve 96. Since, however, the spool valve member 374 of the idle valve 96 is held in an axial position remote from the first fluid port 364 by the force resulting from the throttle pressure acting on the axial end face of the first land 376 of the spool valve member 374 against the opposing force of the preload spring 384, the second fluid port 366 of the idle valve 96 is closed by the first land 376 of the spool valve member 374 so that the hysteresis pressure in the fluid passageway 348 leading from the solenoid-operated control valve 94 is not passed over to the fluid passageway 382 leading to the downshift valve 106 through the shuttle valve 474. The downshift valve 106 is thus uninfluenced by the hysteresis pressure during the kick-down condition.

The switch 360 of the valve actuator 356 of the solenoid-operated control valve 94 is operative to be closed not only in response to the kick-down condition but when the engine is in idling condition. When, thus, the accelerator pedal is released with the manual selector valve 82 in the automatic drive range position D, the switch 360 is closed and accordingly the solenoid-operated valve actuator 356 is energized. The plunger 358 of the valve actuator 356 therefore retracts from the orifice 354 so that the spool valve member 338 of the solenoid-operated control valve 94 is moved to an axial position providing communication between the second and third fluid ports 330 and 332, as in the case of the kick-down condition. As is well known in the art, the vacuum in the intake manifold is increased with light engine load and, as a consequence, the throttle pressure delivered from the throttle valve 84 is reduced during the idling condition of the engine. During idling, therefore, the force resulting from the throttle pressure acting on the axial end face of the first land 376 of the spool valve member 374 of the idle valve 96 is overcome by the force of the preload spring 384 so that the spool valve member 374 is moved toward the first fluid port 364 of the idle valve 96. Communication is thus provided between the second and third fluid ports 366 and 368 of the idle valve 96 and accordingly between the fluid passageways 348 and 382. The hysteresis pressure in the fluid passageway 348 is therefore passed through the fluid ports 366 and 368 of the idle valve 96 to the fluid passageway 382 leading to the shuttle valve 474. Since, in this instance, the hysteresis pressure is set at a level which is at all times higher than the governor pressure (which may be basic or boosted), the shuttle valve 474 passes the hysteresis pressure from the passageway 382 to the passageway 476 leading to the fluid port 486 of the first-second speed shift valve 108, the fluid port 528 of the second-third speed shift valve 110 and the fluid port 580 of the third-fourth speed shift valve 112. The spool valve members of all the shift valves 108, 110 and 112 are consequently moved to the upshift positions so that the fourth-speed gear ratio is achieved with the front and rear clutches 18 and 20 in coupled conditions. During idling in the automatic drive range condition, the hydraulic control system embodying the present invention is thus conditioned to provide the fourth-speed gear ratio in the transmission mechanism by means of the hysteresis pressure commonly applied to the first-second, second-third and third-fourth shift valves 108, 110 and 112. When the fourth-speed gear ratio is thus achieved, the transmission output shaft 40 is driven directly from the crankshaft of the engine so that creeping of the vehicle during idling of the engine can be prevented. When the accelerator pedal is depressed to start the vehicle from the idling condition of the engine, the switch 360 of the solenoid-operated control valve 94 is made open and accordingly the solenoid-operated valve actuator 356 is de-energized. The plunger 358 of the valve actuator 356 projects into the orifice 354 so that a fluid pressure is developed in the first fluid port 328 of the control valve 94. The spool valve member 338 of the control valve 94 is consequently moved to an axial position closing the second fluid port 330 and providing communication between the third and fourth fluid ports 332 and 334. The hysteresis pressure in the fluid passageway 320 is therefore isolated from the fluid passageway 348 and at the same time the fluid in the passageway 348 is drained off through the fourth or drain port 334 of the control valve 94. The spool valve members of the first-second, second-third and third-fourth speed shift valves 108, 110 and 112 are thus moved back to the respective downshift positions by the forces of the preload springs 525, 572 and 618 of the shift valves 108, 110 and 112, respectively. The first-speed gear ratio is consequently achieved with the rear clutch 20 in coupled condition so that the vehicle will be started with an increased driving torque.

When the manual selector valve 82 is maintained in the automatic drive range D, the line pressure is regulated by means of the pressure regulator valve 90 in such a manner that the forces effective to urge the spool valve members 264 and 266 of the respective valve 90 by the line pressure acting on the axial end face of the first land 268 of the valve member 264 from the first fluid port 250 and the fluid pressure acting on the differential pressure-acting areas of the first and second lands 268 and 270 of the valve member 264 from the third fluid port 254 are equalized with the opposing forces resulting from the throttle pressure acting on the axial end face of the first land 284 of the valve member 266 from the sixth fluid port 260, the line pressure acting on the differential pressure-acting areas of the first and second lands 284 and 286 of the valve member 266 from the seventh fluid port 262 and the force of the preload spring 292. The fluid pressure acting on the differential pressure-acting areas of the first and second lands 268 and 270 of the spool valve member 264 from the third fluid port 254 is directed from the shuttle valve 290. The shuttle valve 290 is operative to pass to the third fluid port 254 of the regulator valve 90 the higher one of the fluid pressures developed in the fluid passageways 150 and 294. During the automatic drive range condition, the line pressure obtains in the fluid passageway 150 and, thus, it is the line pressure which is passed through the shuttle valve 290 to the third fluid port 254 of the regulator valve 90. When, therefore, the hysteresis pressure is developed in the fluid passageway 294 during idling in the automatic drive range condition, the hysteresis pressure which is at all times lower than the line pressure is not passed through the shuttle valve 290 so that the line pressure remains uninfluenced by the hysteresis pressure. The hysteresis pressure will be also developed in the fluid passageway 298 during the reverse driving condition. During the reverse driving condition, however, the fluid passageway 150 is drained off through the third fluid port 130 of the manual selector valve 82 and, as a consequence, the shuttle valve 290 is operative to pass the hysteresis pressure from the passageway 298 to the third fluid port 254 of the regulator valve 90. The hysteresis pressure thus acts on the differential pressure-acting areas of the first and second lands 250 and 252 of the spool valve member 264 of the regulator valve so that the line pressure is diminished during idling in the reverse driving condition.

When the spool valve member 138 of the manual selector valve 82 is moved to the manual third-forward-speed range position 3, not only the first and third fluid ports 126 and 130 but the fourth fluid port 132 is uncovered by the second land 142 of the spool valve member 138 with the second fluid port 128 kept isolated from the first fluid port 126 by the first land 140 of the spool valve member 138 and with the fifth and sixth fluid ports 134 and 136 drained off. Communication is therefore established from the first fluid port 126 to the third and fourth fluid ports 130 and 132 as will be seen from Table 2 and FIG. 4. The line pressure in the fluid passageway 122 is thus passed through the third and fourth fluid ports 130 and 132 of the manual selector valve 82 to the fluid passageways 150 and 152, respectively. The line pressure in the passageway 150 is directed to the servo mechanism of the rear clutch 20 of the transmission mechanism so that the rear clutch 20 is brought into the coupled condition. The line pressure in the passageway 152 is directed to the first and second fluid ports 224 and 226 of the throttle back-up valve 88 and to the fifth fluid port 588 of the third-fourth speed shift valve 112. The line pressure directed to the first fluid port 224 of the throttle back-up valve 88 acts upon the axial end face of the first land 236 of the spool valve member 234, which is consequently axially moved away from the first fluid port 224 against the force of the preload spring 246 and the fluid pressure acting upon the axial end face of the second land 238 of the valve member 234 from the fifth fluid port 232. The fluid pressure in the fifth fluid port 232 and accordingly in the fluid passageway 242 leading from the port 232 is thus controlled to a level which is lower than the line pressure by a value which is determined by the force of the preload spring 246. The force of the spring 246 is, however, so selected as to be practically negligible as previously mentioned and, for this reason, the fluid pressure developed in the passageway 242 is substantially equal to the line pressure in the passageway 150. On the other hand, the line pressure directed to the fifth fluid port 588 of the third-fourth speed shift valve 112 acts on the land 604 of the first spool valve member 596 and the land 610 of the second spool valve member 598 so that the first and second spool valve members 596 and 598 are axially moved away from each other irrespective of the boosted governor pressure acting on the land 600 of the first spool valve 596 from the first fluid port 580 and the throttle pressure acting on the land 612 of the second spool valve member 598. The third fluid port 584 leading to the fluid passageway 620 is consequently brought into communication with the second or drain port 582 through the first circumferential groove 606 in the first spool valve member 596 so that no fluid pressure is developed in the fluid passageway 620. Since, under these conditions, the fluid passageway 148 is also drained off through the second fluid port 128 of the manual selector valve 82, no fluid pressure is developed in the servo mechanism on the front clutch 18 and the release side of the servo mechanism of the band brake 34. This means that, when the manual selector valve 82 is shifted to the manual third-forward-speed range position from the condition in which the fourth-speed gear ratio is achieved in the automatic drive range condition, the third, second or first speed gear ratio will be obtained in the transmission mechanism. During the manual third-forward-speed range condition, the first-second and second-third speed shift valves 108 and 110 will behave as they do during the automatic drive range condition except that the line pressure will be changed from the level achieved during the automatic drive range condition. During the automatic drive range condition, the throttle pressure acts on the axial end face of the land 284 of the second spool valve member 266 of the regulator valve 90 from the fluid port 260 leading from the passageway 242 whereas, during the manual third-forward-speed-range condition, the fluid pressure acting on the land 284 of the spool valve member 266 approximates the line pressure. It therefore follows that the line pressure is regulated in relation to the throttle pressure during the automatic drive range condition but, during the manual third-forward-speed-range condition, the line pressure remains unrelated to the throttle pressure. During kick-down, the valves of the hydraulic control system will operate as they do during the automatic drive range condition.

When the manual third-forward-speed-range condition is established, it is preferable that the arrangements to prevent the creeping of the vehicle be rendered inoperative when the accelerator pedal is released. This is achieved in the hydraulic control system according to the present invention in the following manner. When the manual selector valve 82 is shifted to the manual third-forward-speed-range condition 3, the fluid pressure in the passageway 242 leading from the fourth and fifth fluid ports 230 and 232 of the throttle back-up valve 88 is changed from the throttle pressure to a level which is appreciably lower than the line pressure by the action of the throttle back-up valve 88, as previously mentioned. The fluid in the passageway 242 is directed to the first fluid port 364 of the idle valve 96 and acts on the axial end face of the first land 376 of the spool valve member 374 of the idle valve 96. The spool valve member 374 is accordingly axially moved away from the first fluid port 364 against the opposing force of the preload spring 384 so that the second fluid port 366 is covered by the first land 376 of the spool valve member 374 and at the same time the third fluid port 368 is brought into communication with the fourth or drain port 370 through the circumferential groove 380 in the spool valve member 374. No fluid pressure is therefore developed in the passageway 382 leading from the third fluid port 368 of the idle valve 96 irrespective of the presence or absence of the fluid pressure in the second fluid port 366 leading from the third fluid port 332 of the solenoid-operated control valve 94. Since, moreover, the passageway 430 leading to the downshift valve 106 is drained off through the third fluid port 418 of the primary governor valve 102, no fluid pressure is transmitted from either the fluid passageway 382 or the fluid passageway 472 to the fluid passageway 476 through the shuttle valve 474. The spool valve members of the first-second, second-third and third-fourth speed shift valves 108, 110 and 112 are therefore held in their respective downshift positions in the absence of the fluid pressure acting on the lands 506, 552 and 600 of the spool valve members from the fluid passageway 476. The third-, second- or first-speed-gear ratio is thus achieved in the transmission mechanism so that the arrangements to prevent the creeping of the vehicle is made inoperable. Such functions will also be achieved when the manual second-forward-speed-range position 2 or the manual first-forward-speed-range position 1 is selected in the manual selector valve 82. This is desirable for the purpose of enabling the engine to act as a brake during the manual third-, second- or first-forward-speed-range condition. If, thus, the creep preventive arrangements are maintained operative during such a condition, the fourth-speed gear ratio would be attained when the accelerator pedal is released and, as a consequence, the engine becomes unable to properly apply a braking force on the vehicle. If, moreover, it is desired by a vehicle driver to purposely make the vehicle creep as in a congested street, the driver may select the manual third-, second- or first-forward speed range condition for driving the vehicle at a creeping speed.

When, now, the spool valve member 138 of the manual selector valve 82 is moved to the manual second-forward-speed-range position 2, not only the first, third and fourth fluid ports 126, 130 and 132 but the fifth fluid port 134 of the selector valve 82 is uncovered by the second land 142 of the spool valve member 138 with the second fluid port 128 kept isolated from the first fluid port 126 by the first land 140 of the valve member 138 and with the sixth fluid port 136 drained off. Communication is therefore provided from the first fluid port 126 to the third, fourth and fifth fluid ports 130, 132 and 134 through the circumferential groove 146 in the valve member 138. The line pressure in the fluid passageway 122 is thus directed through the third, fourth and fifth fluid ports 130, 132 and 134 of the manual selector valve 82 to the fluid passageways 150, 152 and 154, respectively. The line pressure in the fluid passageway 150 leading from the third fluid port 130 is directed to the servo mechanism of the rear clutch 20, which thus remains coupled. The line pressure in the fluid passageway 152 leading from the fourth fluid port 132 is directed to the throttle back-up valve 88 and the third-fourth speed shift valve 112 as previously described. The line pressure in the fluid passageway 154 is directed on one hand to the seventh fluid port 540 of the second-third shift valve 110 and on the other hand to the first fluid port 624 of the second-speed pressure modulator valve 114. Assuming that the manual second-forward-speed-range condition is selected from the manual third-forward-speed-range condition, the spool valve members 548 and 550 of the second-third speed shift valve 110 will be in axial positions remote from the first fluid port 528 of the valve 110 so that the line pressure entering the seventh fluid port 540 from passageway 154 acts upon the axial end face of the fourth land 558 of the first spool valve member 548. The first spool valve member 548 is consequently axially moved toward the first fluid port 528 against the opposing force resulting from the fluid pressure acting on the axial end face of the first land 552 of the first spool valve member 548. Such a movement of the spool valve member 548 is effected at an extremely high vehicle speed without respect to the throttle pressure acting on the axial end face of the second land 568 of the spool valve member 550, in contrast to the downshift operation during the automatic drive range condition in which the spool valve members 548 and 550 are axially moved to the downshift positions by the throttle pressure acting on the second land 568 of the second spool valve member 550. When the first spool valve member 548 is thus moved to the axial position closest to the first fluid port 528, the line pressure which has been directed to the fluid passageway 524 through the sixth and fifth fluid ports 496 and 494 of the first-second speed shift valve 108 is passed to the fourth and fifth fluid ports 534 and 536 of the second-third speed shift valve 110. The line pressure thus developed in the third circumferential groove 564 in the spool valve member 548 acts on the differential pressure-acting areas of the third and fourth lands 556 and 558 of the valve member 548 and, for this reason, the first spool valve member 548 cannot be moved to the upshift position unless the boosted governor pressure acting on the axial end face of the first land 552 of the valve member 548 reaches a level which is higher than the level of the boosted governor pressure allowing the valve member 548 to move to the downshift position. When the first spool valve member 548 of the second-third speed shift valve 510 is in the downshift position, communication is established from the fluid passageway 524 to the fluid passageway 576 through the fourth and fifth fluid ports 534 and 536 and at the same time the fluid passageway 574 is drained off through the third and second fluid ports 532 and 530. The line pressure is thus passed from the passageway 524 to the passageway 576 and from the passageway 576 to the passageway 644 leading to the fourth fluid port 630 of the second-speed pressure modulator valve 114. The spool valve member 634 of the second-speed pressure modulator valve 114 is therefore subjected to the force urging the valve member away from the first fluid port 624 by the line pressure acting upon the axial end face of the first land 636 of the valve member 634 and to the opposing force of the preload spring 648 and the force of the fluid pressure acting on the axial end face of the second land 638 of the valve member 634 from the fifth fluid port 632 which is now in communication through the passageway 642 with the fourth fluid port 630. The fluid pressure in the fifth fluid port 632 of the modulator valve 114 is therefore regulated to a level which is lower than the line pressure by a value which is determined by the force of the preload spring 648. The fluid pressure developed in the fifth fluid port 632 in this manner is directed through the passageway 642 to the servo mechanism of the second-speed-coasting brake 30. The second-speed-coasting brake 30 is subsequently actuated with the rear clutch 20 kept coupled and thus the second-speed-gear ratio is achieved while permitting the engine to act as a brake when the engine is to be driven by the inertia of the vehicle. If, in this instance, an excessively high fluid pressure is applied to the apply servo mechanism of the second-speed-coasting brake 30, then shocks would be invited as a result of the sudden actuation of the second-speed-coasting brake 30. If, conversely, the fluid pressure applied to the servo mechanism of the second-speed-coasting brake 30 is short of a proper level, then the second-speed-coasting brake 30 would be actuated at a delayed timing so that the engine would be unable to apply a braking force on the transmission mechanism at a proper timing. In the hydraulic control system according to the present invention, however, such problems can be eliminated because of the fact that the fluid pressure to be applied to the second-speed-coasting brake 30 can be adjusted to an optimum level through selection of the force of the preload spring 648 which is predominant over the fluid pressure to be developed in the fifth fluid port 632 of the second-speed pressure modulator valve 114. The automatized gear shift between the first and second-speed gear ratio in the manual second-forward-speed-range condition is effected in similar manners to that achieved during the automatic drive range condition. The creep preventive arrangements are made inoperative during the manual second-forward-speed-range condition, as in the case of the manual third-forward-speed-range condition. The line pressure is maintained at the same level during the manual second-forward-speed-range condition as the level which is established during the manual third-forward-speed-range condition.

When the manual second-forward-speed-range position is selected from the fourth-speed-gear ratio and if, in this instance, the vehicle is being driven at an extremely high speed, the first spool valve member 548 of the second-third speed shift valve 110 will be moved to the downshift position at a slowed rate because of the fact that the movement of the spool valve member 548 to such a position is resisted by the boosted governor pressure which is increased to a considerably high level. The spool valve member 548 will consequently be moved to the downshift position when the gear ratio is shifted down to the third-speed-gear ratio and the vehicle speed and accordingly the boosted governor pressure are reduced to certain levels. The engine is in this manner prevented from overrunning when the manual second-forward-speed-range condition is selected at a relatively high vehicle speed.

When the spool valve member 138 of the manual selector valve 82 is moved from the manual second-forward-speed-range position 2 to the manual first-forward-speed-range position 1, not only the first, third, fourth and fifth fluid ports 126, 130, 132 and 134 but the sixth fluid port 136 of the manual selector valve 82 is uncovered by the second land 142 of the spool valve member 138 with the second fluid port 128 kept isolated from the first fluid port 126 by the first land 140 of the valve member 138. The first fluid port 126 of the manual selector valve 82 is therefore brought into communication with the third, fourth, fifth and sixth fluid ports 130, 132, 134 and 136 so that the line pressure in the line-pressure passageway 122 is passed to the fluid passageways 150, 152, 154 and 156 through the ports 130, 132, 134 and 136, respectively. The line pressure in the fluid passageway 150 is directed to the sixth fluid port 496 of the first-second speed shift valve 108 and to the servo mechanism of the rear clutch 20 which thus remains in the coupled condition. The line pressure in the fluid passageway 152 is directed to the throttle back-up valve 88 and the third-fourth speed shift valve 112, as previously mentioned. The line pressure in the fluid passageway 154 is directed to the second-third speed shift valve 110 and the second-speed pressure modulator valve 114 as also previously mentioned. The line pressure now passed to the fluid passageway 156 leading from the sixth fluid port 136 of the manual selector valve 82 is directed on one hand to the second fluid port 488 of the first-second shift valve 108 and on the other hand to the first fluid port 388 of the kick-down valve 98. If, in this instance, the manual first-forward-speed-range condition is selected when the vehicle is being driven at the second-speed-gear ratio, the spool valves 502 and 504 of the first-second speed shift valve 108 will be moved to the downshift positions at the same vehicle speed and accordingly at the same boosted governor pressure as those at which the spool valve members 502 and 504 are moved to the downshift positions during the automatic drive range condition, because of the fact that the first and third circumferential grooves 514 and 518 are in communication with the drain ports 492 and 484, respectively. Once, however, the spool valve members 502 and 504 of the first-second speed shift valve 108 are moved to the downshift positions which are shown in FIG. 4, the second and third fluid ports 488 and 490 of the first valve chamber 480 communicate with each other through the first circumferential groove 514 in the valve member 502 and simultaneously the seventh fluid port 498 communicates with the third circumferential groove 518 in the valve member 502 with the result that the line pressure entering the second fluid port 488 of the valve chamber 480 from the passageway 156 acts on the differential pressure-acting areas of the first and second lands 506 and 508 of the first spool valve member 502 and at the same time the throttle pressure entering the seventh fluid port 498 of the valve chamber 480 from the fluid passageway 180 acts on the differential pressure-acting areas of the third and fourth lands 510 and 512 of the spool valve member 502 in addition to the throttle pressure acting on the axial end face of the land 520 of the second spool valve member 504 and the force of the preload spring 526. The spool valve members 502 and 504 are therefore maintained in the positions closest to the first fluid port 486 of the first valve chamber 480 and will not be moved to the upshift positions unless the vehicle speed and accordingly the boosted governor pressure acting on the first land 506 of the first spool valve member 502 is increased to considerably high levels.

In order that the engine be prevented from overrunning when the manual first-forward-speed-range condition is selected while the vehicle is being driven at the fourth-speed-gear ratio, arrangements are made in the hydraulic control system according to the present invention so as to provide the first-speed-gear ratio at a certain retarded timing after the manual first-forward-speed-range position has been selected in the manual selector valve 82. When, thus, the manual first-forward-speed-range condition is selected from the fourth-speed-gear ratio, the gear ratio is first shifted to the third-speed-gear ratio by the action of the third-fourth speed shift valve 112 and, as the vehicle speed drops, shifted to the second-speed-gear ratio by the action of the second-third speed shift valve 110. As the vehicle is further slowed down, the first-speed-gear ratio is achieved by the action of the first-second speed shift valve 108 in such a manner as has been described. It may be mentioned that the creep preventive arrangements of the previously described nature are held inoperable during the manual first-forward-speed-range condition as in the case of the manual third- or second-forward-speed-range condition and that the line pressure is maintained during the manual first-forward-speed-range condition at the same level as achieved during the manual third- or second-forward-speed-range condition.

FIG. 5 illustrates another preferred example of the valve arrangement which may be incorporated into the hydraulic control system according to the present invention for the purpose of lessening the line pressure during idling of the engine under conditions other than the forward drive condition. The valve arrangement is characterized in that such a function is achieved without use of the idle valve through modification of the solenoid-operated control valve. The solenoid-operated control valve, which is now designated generally by reference numeral 650, comprises an elongate valve chamber 652 which has first, second, third, fourth and fifth fluid ports 654, 656, 658, 660 and 662, respectively, and a spool valve member 664 which is axially movable in the valve chamber 652. The spool valve member 664 is formed with axially spaced first and second lands 666 and 668 which have substantially equal cross sectional areas and a circumferential groove 670 which is located between the lands 666 and 668. The first fluid port 654 is in communication through a restriction or orifice 672 with the previously mentioned fluid passageway 320 leading from the second fluid port 304 of the hysteresis valve 92 (FIG. 4) and is so located as to have the hyesteresis pressure in the fluid passageway 320 directed onto the axial end face of the first land 666 of the spool valve member 664 for urging the spool valve member 664 axially away from the first fluid port 654. The second fluid port 656 is a drain port which is so located as to be either covered by the first land 666 of the spool valve member 664 or open to the circumferential groove 670 in the valve member 664 depending upon the axial relative position of the valve member 664 in the valve chamber 652. The third fluid port 658 is in communication with the previously mentioned fluid passageway 294 leading through the shuttle valve 294 to the third fluid port 254 of the pressure regulator valve 90 (FIG. 4). The third fluid port 658 of the solenoid-operated control valve 650 is so located as to be constantly open to the circumferential groove 670 in the spool valve member 664 irrespective of the axial relative position of the valve member 664 in the valve chamber 652. The fourth fluid port 660 is in communication with the above mentioned fluid passageway 320 and accordingly through the orifice 672 to the first fluid port 654 and is so located as to be covered by the second land 668 of the spool valve member 664 or open to the circumferential groove 670 in the spool valve member 664 depending upon the axial relative position of the valve member 664 in the valve chamber 652. The third fluid port 658 is thus brought into communication with either the second fluid port 656 or the fourth fluid port 660 through the circumferential groove 670 in the spool valve member 664 depending upon the axial relative position of the valve member 664. The fifth fluid port 662 is a drain port so that no fluid pressure acts upon the axial end face of the second land 668 of the spool valve member 664. The spool valve member 664 is biased by means of a preload spring 674 to axially move toward the first fluid port 654, viz., toward the shown axial position in which communication is provided between the second and third fluid ports 656 and 658 through the circumferential groove 670 and closing the fourth fluid port 660 by the second land 668 of the spool valve member 664. The control valve 650 further comprises a solenoid-operated valve actuator 676 which has a plunger 678 extending through the first fluid port 654 into the valve chamber 652. The solenoid-operated valve actuator 676 is operative in such a manner that the plunger 678 projects into the valve chamber 652 and presses the spool valve member 664 away from the first fluid port 654 against the opposing force of the preload spring 674 when the valve actuator is electrically energized from an external power source (not shown). When de-energized, the solenoid-operated valve actuator 676 has its plunger 678 held in a position withdrawn from the valve chamber 652 so that the spool valve member 664 is moved to the shown axial position. The valve actuator 676 is connected to the power source across a switch 680 which is adapted to be closed in response to an idling condition of the engine, viz., when the accelerator pedal is released. The operation of the valve arrangement above described will be described with concurrent reference to FIGS. 4 and 5.

When the manual selector valve 82 is in the automatic drive range position "D" or in any of the first-, second- and third-forward-speed-range position 1, 2 and 3, the line pressure is developed in the fluid passageway 150 leading from the third fluid port 130 of the manual selector valve 82 to the shuttle valve 294. The shuttle valve 294 thus passes the line pressure to the third fluid port 254 of the pressure regulator valve 90 irrespective of the fluid pressure which may obtain in the fluid passageway leading to the shuttle valve 294 from the third fluid port 658 of the solenoid-operated control valve 650. The line pressure thus entering the third fluid port 254 of the regulator valve 90 acts on the differential pressure-acting areas of the first and third lands 268 and 270 of the first spool valve member 264, urging the spool valve member 264 axially away from the first fluid port 250. The line pressure in the fluid passageway 150 is also directed into the seventh fluid port 262 of the regulator valve 90 and acts upon the differential pressure-acting areas of the first and second lands 260 and 262 of the second spool valve member 266. When, on the other hand, the manual selector valve 82 is in a position other than the above mentioned positions providing the forward drive conditions of the vehicle, the fluid passageway 150 is drained off through the third fluid port 130 of the selector valve 82. If, under this condition, the accelerator pedal is released and accordingly the switch 680 is closed, the solenoid-operated valve actuator 676 is energized so that the plunger 678 of the actuator projects into the valve chamber 652 of the solenoid-operated control valve 650. The spool valve member 664 of the control valve 650 is therefore axially moved against the force of the preload spring 674 to the position closing the second or drain port 656 and providing communication between the third and fourth fluid ports 658 and 660. The hysteresis pressure which has been developed in the fluid passageway 320 is thus passed through the third and fourth fluid ports 658 and 660 to the fluid passageway 294 and is directed from the fluid passageway 294 to the third fluid port 254 of the pressure regulator valve 90 through the shuttle valve 294, acting upon the differential pressure-acting areas of the first and second lands 268 and 270 of the first spool valve member 264 of the regulator valve 90. Since the hysteresis pressure is at all times lower than the line pressure and since no fluid pressure is acting on the first and second lands 284 and 286 of the second spool valve member 266 of the regulator valve 90 in the absence of the fluid pressure in the passageway 150, the line pressure in the passageway 122 is rendered lower than the level which is achieved during the forward drive conditions. The line pressure is in this manner reduced when the accelerator pedal is released during the conditions other than the forward drive conditions.

FIG. 6 illustrates still another preferred example of the valve arrangement which is adapted to achieve the functions similar to those above described. The valve arrangement herein shown is, however, characterized in that the solenoid-operated control valve is used in combination with the idle valve so as to lessen the line pressure during idling or kick-down condition when the manual selector valve is in a position excepting the forward drive positions. Referring to FIG. 6, the solenoid-operated valve, now designated by reference numeral 682, comprises an elongate valve chamber 684 which has first, second, third and fourth fluid ports 686, 688, 690 and 692, respectively, and a spool valve member 694 which is axially movable in the valve chamber 684. The spool valve member 694 is formed with axially spaced first and second lands 696 and 698 which have substantially equal cross sectional areas, and a circumferential groove 700 which is located between the lands 696 and 698. The first fluid port 686 is in communication with the previously mentioned fluid passageway 320 leading from the second fluid port 304 of the hysteresis valve 92 and is so located as to be closed by the first land 696 of the spool valve member 694 or open to the circumferential groove 700 in the valve member 694 depending upon the axial relative position of the valve member 694 in the valve chamber 684. The second fluid port 688 is in communication with a fluid passageway which leads to the idle valve to be described later. The second fluid port 688 is so located as to be constantly open to the circumferential groove 700 in the spool valve member 694 irrespective of the axial relative position of the valve member 694 in the valve chamber 684. The third fluid port 690 is a drain port which is so located as to be covered by the second land 698 of the spool valve member 694 or open to the circumferential groove 700 in the valve member 694 depending upon the axial relative position of the valve member in the valve chamber 684. The fourth fluid port 692 is also a drain port which is so located as to discharge a fluid which may act on the axial end face of the first land 696 of the spool valve member 694. The solenoid-operated control valve 682 further comprises a solenoid-operated valve actuator 704 having a plunger 706 connected to the second land 698 of the spool valve member 694. The function of the solenoid-operated valve actuator 704 is such that the plunger 706 projects forward when the valve actuator is energized and is held in a retracted position when the valve actuator is de-energized. When held in the retracted position, the plunger 706 causes the spool valve member 694 to move to an axial position closing the first fluid port 686 and providing communication between the second and third fluid ports 688 and 690 through the circumferential groove 700 in the spool valve member 694. When moved to the extended position, the plunger 706 causes the spool valve member 694 to move to an axial position closing the third or drain port 690 by the second land 698 of the valve member 694 and providing communication between the first and second fluid ports 686 and 688 through the circumferential groove 700 in the valve member. The solenoid-operated valve actuator 704 thus arranged is electrically connected to an external power source (not shown) across a parallel combination of a first switch 708 responsive to idling condition of the engine and a second switch 710 responsive to kick-down condition of the accelerator pedal. Theh first switch 708 is operative to be closed when the accelerator pedal is released and the second switch 710 operative to be closed when the accelerator pedal is depressed over a distance which is larger than a predetermined valve. The valve actuator 704 is thus energized either when the accelerator pedal is released, viz., during idling condition of the engine or when the accelerator pedal is depressed all the way down, viz., during kick-down condition.

On the other hand, the idle valve which is now generally designated by reference numeral 712 comprises an elongate valve chamber 714 having first, second, third, fourth, fifth and sixth fluid ports 716, 718, 720, 722, 724 and 726, respectively, and a spool valve member 728 which is axially movable in the valve chamber 714. The spool valve member 728 is formed with axially spaced first, second and third lands 730, 732 and 734 having substantially equal cross sectional areas and first and second circumferential grooves 736 and 738 which are respectively located between the first and second lands 730 and 732 and between the second and third lands 732 and 734. The first fluid port 716 is in communication with the previously mentioned fluid passageway 242 leading to the fourth and fifth fluid ports 230 and 232 of the throttle back-up valve 88 (see FIG. 4) and is so located as to have the throttle pressure in the passageway 242 directed onto the axial end face of the first land 730 of the spool valve member 728. The second fluid port 718 of the idle valve 712 is a drain port which is so located as to be constantly open to the first circumferential groove 736 in the spool valve member 728 irrespective of the axial relative position of the valve member 728 in the valve chamber 714. The third fluid port 720 is in communication with the previously mentioned passageway 298 which leads through the shuttle valve 294 to the third fluid port 254 of the pressure regulator valve 90 (FIG. 4). The third fluid port 720 of the idle valve 712 is so located as to be covered by the second land 732 of the spool valve member 728 or open to the second circumferential groove 738 in the valve member 728 depending upon the axial relative position of the valve member in the valve chamber 714. The fourth fluid port 722 is in communication with the previously mentioned fluid passageway 702 leading from the second fluid port 688 of the solenoid-operated control valve 682 and is so located as to be constantly open to the second circumferential groove 738 in the spool valve member 728 irrespective of the axial relative position of the valve member 728 in the valve chamber 714. The fifth fluid port 724 is in communication with the previously mentioned fluid passageway 382 which communicates through the shuttle valve 474 with the fluid passageway 476 leading to the first-second, second-third and third-fourth speed shift valves 108, 110 and 112 (FIG. 4). The fifth fluid port 724 of the idle valve 712 is so located as to be covered or uncovered by the third land 734 of the spool valve member 728 depending upon the axial relative position of the valve member 728 in the valve chamber 714. The sixth fluid port 726 is a drain port which is so located as to be brought into communication with the fifth fluid port 724 when the latter is uncovered by the third land 734 of the spool valve member 728. The spool valve member 728 is biased by means of a preload spring to axially move toward the first fluid port 716, viz., to a position providing communication between the third and fourth fluid ports 720 and 722 and between the fifth and sixth fluid ports 724 and 726 as shown.

The operation of the valve arrangement above set forth will be described with concurrent reference to FIGS. 4 and 6.

When the manual selector valve 82 is in the automatic drive range position D or in any of the manual first-, second- and third-forward-speed-range positions 1, 2 and 3 so that the vehicle is being driven forward, the line pressure is directed through the fluid passageway 150 to the third and seventh fluid ports 254 and 622 of the pressure regulator valve 90 and thus acts upon the differential pressure-acting areas of the first and second lands 268 and 270 of the first spool valve member 264 and the differential pressure-acting areas of the first and second lands 284 and 286 of the second spool valve member 266. When, on the other hand, the manual selector valve 82 is in any of the positions other than the forward drive positions, the fluid passageway 150 is drained off and accordingly no fluid pressure is developed in the fluid passageway 150. If, under these conditions, the accelerator pedal is released so that the engine idles, the first switch 708 of the solenoid-operated valve actuator 704 of the control valve 682 closes and the valve actuator 704 is energized. The plunger 706 of the valve actuator 704 then projects forward and causes the spool valve member 694 to move to an axial position providing communication between the first and second fluid ports 686 and 688 through the circumferential groove 700 in the valve member 694. The hysteresis pressure in the fluid passageway 320 is consequently passed through the first and second fluid ports 686 and 688 of the control valve 682 to the fluid passageway 702 and is directed through the fluid passageway 702 to the fourth fluid port 722 of the idle valve 712. During the idling condition, the throttle pressure acting on the axial end face of the first land 730 of the spool valve member 728 of the idle valve 712 from the fluid passageway 242 is maintained at a relatively low level and, as a consequence, the spool valve member 728 is held in an axial position closest to the first fluid port 716 by the force of the preload spring 740. Communication is therefore established between the third and fourth fluid ports 720 and 722 and between the fifth and sixth fluid ports 724 and 726. The hysteresis pressure passed through the first and second fluid ports 686 and 688 of the solenoid-operated control valve 682 to the fluid passageway 702 is thus passed through the fourth and third fluid ports 722 and 720 of the idle valve 712 to the fluid passageway 298. In the absence of the line pressure in the fluid passageway 150, the hysteresis pressure in the fluid passageway 298 is directed through the shuttle valve 294 to the third fluid port 254 of the pressure regulator valve 90 and acts on the differential pressure-acting areas of the first and second lands 268 and 270 of the first spool valve member 264 of the pressure regulator valve 90. The line pressure is in this manner reduced during idling if the transmission is in the condition other than the forward drive condition, for the reasons previously explained in connection with the valve arrangement illustrated in FIG. 5. When the spool valve member 728 of the idle valve 712 is in the axial position providing the communication between the third and fourth fluid ports 720 and 722, the fifth fluid port 724 is in communication with the sixth fluid port 726 so that the fluid pressure in the passageway 382 leading through the shuttle valve 474 is drained off through the sixth fluid port 726 of the idle valve 712. The basic governor pressure is thus directed from the fluid passageway 472 to the fluid passageway 476 through the shuttle valve 474.

When, on the other hand, the accelrator pedal is depressed throughout its full stroke so that the kick-down condition is produced in the engine, the second switch 710 of the solenoid-operated control valve 682 closes so that the spool valve member 694 of the control valve 682 is also axially moved to the position providing the communication between the first and second fluid ports 686 and 688 of the control valve 682. The hysteresis pressure is thus passed from the passageway 320 to the passageway 702 leading to the fourth fluid port 722 of the idle valve 712 as in the case of the idling condition. During the kick-down condition, however, the vehicle speed and accordingly the throttle pressure are maintained at relatively high levels so that the throttle pressure acting on the first land 730 of the spool valve member 728 of the idle valve 712 is axially moved away from the first fluid port 716 against the force of the preload spring 740 and is thus held in a balanced axial position providing communication between the second and third fluid ports 718 and 720 and between the fourth and fifth fluid ports 722 and 724. As a consequence, the fluid pressure in the passageway 298 leading to the shuttle valve 294 is drained off and at the same time the hysteresis pressure in the fluid passageway 702 is directed through the fourth and fifth fluid ports 722 and 724 of the idle valve 712 to the passageway 382 leading to the shuttle valve 474. The hysteresis pressure is passed through the shuttle valve 474 to the fluid pressure 476 and acts on the spool valve member 502 of the first-second speed shift valve 108, the spool valve member 548 of the second-third speed shift valve 110 and the spool valve member 596 of the third-fourth speed shift valve member 112. The upshift or downshift of the gear ratio is in this manner effected at an increased vehicle speed during the kick-down condition.

What is claimed is:

1. An automatic power transmission which consists of a transmission mechanism for selectively producing any of a multiplicity of forward-speed gear ratios and a reverse-speed gear ratio and a hydraulic control system for hydraulically controlling the transmission mechanism, the hydraulic control system comprising a source of line pressure, a throttle valve responsive to load on an engine connected to the transmission mechanism for producing from the line pressure a throttle pressure which varies with the engine load, a governor valve responsive to vehicle speed for producing from the line pressure a basic governor pressure which varies with the vehicle speed, a hysteresis valve for producing from the line pressure a substantially constant hysteresis pressure which is higher than the governor pressure, a pressure regulator valve which has a first fluid port constantly in communication with the source of the line pressure, a second fluid port for being open to communicate with the source of the line pressure during forward drive condition of the vehicle, a third fluid port which is in constant communication with the throttle valve and a fourth fluid port to selectively communicating with the source of the line pressure or the hysteresis valve over a first tow-position valve which is operative to pass therethrough the line pressure in the presence of the line pressure therein during the forward drive condition or the hysteresis pressure in the absence of the line pressure therein, whereby the pressure regulator valve is acted upon by: the line pressure in the first, second and fourth fluid ports and the throttle pressure in the third fluid port for maintaining the line pressure at a first level during the forward drive condition of the vehicle; the line pressure in the first fluid port and the throttle pressure in the third fluid port during reverse drive condition of the vehicle; and the line pressure in the first fluid port, the throttle pressure in the third fluid port and the hysteresis pressure in the fourth fluid port for maintaining the line pressure at a second level lower than the first level during idling under the reverse drive condition of the vehicle.

2. An automatic power transmission as set forth in claim 1, in which said hydraulic control system further comprises a solenoid-operated control valve which is closed during open-throttle condition of the engine and which is responsive to idling condition of the engine for being open to provide the communication between the hysteresis valve and the fourth fluid port of the pressure regulator valve.

3. An automatic power transmission as set forth in claim 1, in which said hydraulic control system further comprises a solenoid-operated control valve and an idle valve, wherein the solenoid-operated control valve is operative to be closed during open-throttle condition excepting kick-down condition and is responsive to idling or kick-down condition of the engine for being open to provide communication between the hysteresis valve and the idle valve and wherein the idle valve is biased to open to provide communication between the solenoid-operated control valve and the fourth fluid port of the pressure regulator valve and, when the solenoid-operated control valve is open, between the hysteresis valve and the fourth fluid port of the regulator valve and is responsive to the throttle pressure for closing to block the communication between the solenoid-operated control valve and the fourth fluid port of the pressure regulator valve when the throttle pressure is higher than a predetermined level.

4. An automatic power transmission as set forth in claim 3, in which said hydraulic control system further comprises a plurality of shift valves each of which has a first fluid port communicating with the governor valve and the idle valve over a second two-position valve which is operative to pass therethrough the governor pressure in the absence of the hysteresis pressure directed thereto or the hysteresis pressure in the presence of both the governor pressure and the hysteresis pressure therein for urging the shift valve toward its upshift position by either the governor pressure or the hysteresis pressure and a second fluid port which is in constant communication with the throttle valve for urging the shift valve toward its downshift position by the throttle pressure, whereby all the shift valves are brought into their respective upshift positions to provide direct drive condition in the transmission mechanism when the solenoid-operated control valve and the idle valve are concurrently open and the hysteresis pressure is directed through the second two-position valve to the first fluid ports of the shift valves.

5. An automatic power transmission as set forth in claim 4, in which said hydraulic control system further comprises a throttle back-up valve having a first fluid port for being open to communicate with the source of the line pressure during the manual forward drive condition, a second fluid port which is in constant communication with the throttle valve, and a third fluid port which is in communication with the above-mentioned second fluid port and the idle valve for normally directing the throttle pressure to the idle valve, the third fluid port being brought into the first fluid port for directing the line pressure to the idle valve and thereby causing the idle valve to interrupt the communication between the idle valve and the first fluid port of each of the shift valves whereby the shift valves are brought into their respective downshift positions.

6. An automatic power transmission as set forth in claim 4, in which said hydraulic control system further comprises a kick-down valve having a first fluid port communicating over the solenoid-operated control valve with the hysteresis valve, a second fluid port which is in constant communication with the throttle pressure urging the kick-down valve toward an open condidtion, and a third fluid port to communicate with the abovementioned first fluid port when the kick-down valve is in the open condition for delivering the hysteresis pressure from the third fluid port when the solenoid-operated control valve is open and concurrently the throttle pressure in the second fluid port is higher than a certain level, and a downshift valve having a first fluid port for being open to communicate with the source of the line pressure, a second fluid port for being open to communicate with the governor valve, a third fluid port which is in constant communication with the third fluid port of the kick-down valve and a fourth fluid port which is in constant communication with the first fluid ports of the shift valves through said second two-position valve, the downshift valve being in a position to boost the governor pressure to be delivered from the fourth fluid port thereof in the absence of the hysteresis pressure in the third fluid port and a position to directly pass the governor pressure through the second and fourth fluid ports of the downshift valve in the presence of the hysteresis pressure in the third fluid port thereof.

* * * * *